(12) United States Patent
Hofbauer

(10) Patent No.: US 7,509,917 B2
(45) Date of Patent: Mar. 31, 2009

(54) APPARATUS AND METHOD TO OPTIMIZE SAILING EFFICIENCY

(75) Inventor: Thomas J. Hofbauer, Fort Lauderdale, FL (US)

(73) Assignee: MagnaSail, LLC, Fort Lauderdale, FL (US)

( * ) Notice: Subject to any disclaimer, the term of this patent is extended or adjusted under 35 U.S.C. 154(b) by 0 days.

(21) Appl. No.: 11/716,349

(22) Filed: Mar. 9, 2007

(65) Prior Publication Data

US 2008/0216728 A1  Sep. 11, 2008

(51) Int. Cl.
*B63B 3/38*  (2006.01)
(52) U.S. Cl. .................................. 114/140; 114/132
(58) Field of Classification Search ............ 114/140
See application file for complete search history.

(56) References Cited

U.S. PATENT DOCUMENTS

| | | | | |
|---|---|---|---|---|
| 2,858,788 | A | * | 11/1958 | Lyman ................. 114/39.24 |
| 3,990,384 | A | * | 11/1976 | Reynolds, III ............ 114/126 |
| 4,074,646 | A | * | 2/1978 | Dorfman et al. ........... 114/140 |
| 4,860,680 | A | * | 8/1989 | Faulconer ................ 114/140 |
| 5,313,905 | A | | 5/1994 | Calderon |
| 5,533,462 | A | | 7/1996 | Parsons |
| 5,622,130 | A | * | 4/1997 | Calderon et al. ......... 114/39.21 |
| 6,032,603 | A | | 3/2000 | Olcott |
| 6,499,419 | B1 | | 12/2002 | Bussard |
| 6,719,079 | B2 | | 4/2004 | Jones |
| 6,789,489 | B1 | | 9/2004 | Phipps |
| 6,796,259 | B2 | | 9/2004 | Hood et al. |
| 6,805,068 | B1 | | 10/2004 | Tossavainen |

FOREIGN PATENT DOCUMENTS

| | | |
|---|---|---|
| AU | 85668/82 | 11/1983 |
| DE | 3713176 | 8/1988 |
| GB | 2114515 | 8/1983 |
| IT | 1151991 | 12/1986 |
| JP | 11-105794 A | 4/1999 |
| KR | 10-0632970 B1 | 10/2006 |
| WO | 89-09159 A1 | 10/1989 |
| ZA | 8500629 | 9/1985 |

* cited by examiner

*Primary Examiner*—Jesus D Sotelo
(74) *Attorney, Agent, or Firm*—Fish & Richardson P.C.

(57) ABSTRACT

This invention provides improvements in the efficiency of a sailing vessel through the use of flaps, hydrofoils, or members on the keel of a sailing vessel. One or more are positioned at the top, or root of the keel of the vessel, which primarily generate a force in the windward direction to provide a counter-leeward drift force. One or more are located at the bottom, or tip of the keel of the vessel, which primarily generate a force in the leeward direction to provide a counter-heeling moment. Among other benefits, operation of these flaps, hydrofoils, or members during sailing increases the vessel's efficiency, in particular its velocity made good. Further, since they are mounted on one appendage, sailing vessels of a rudder and keel design can be equipped with counter leeward-drift and counter-heeling attributes without the need for additional appendages.

10 Claims, 29 Drawing Sheets

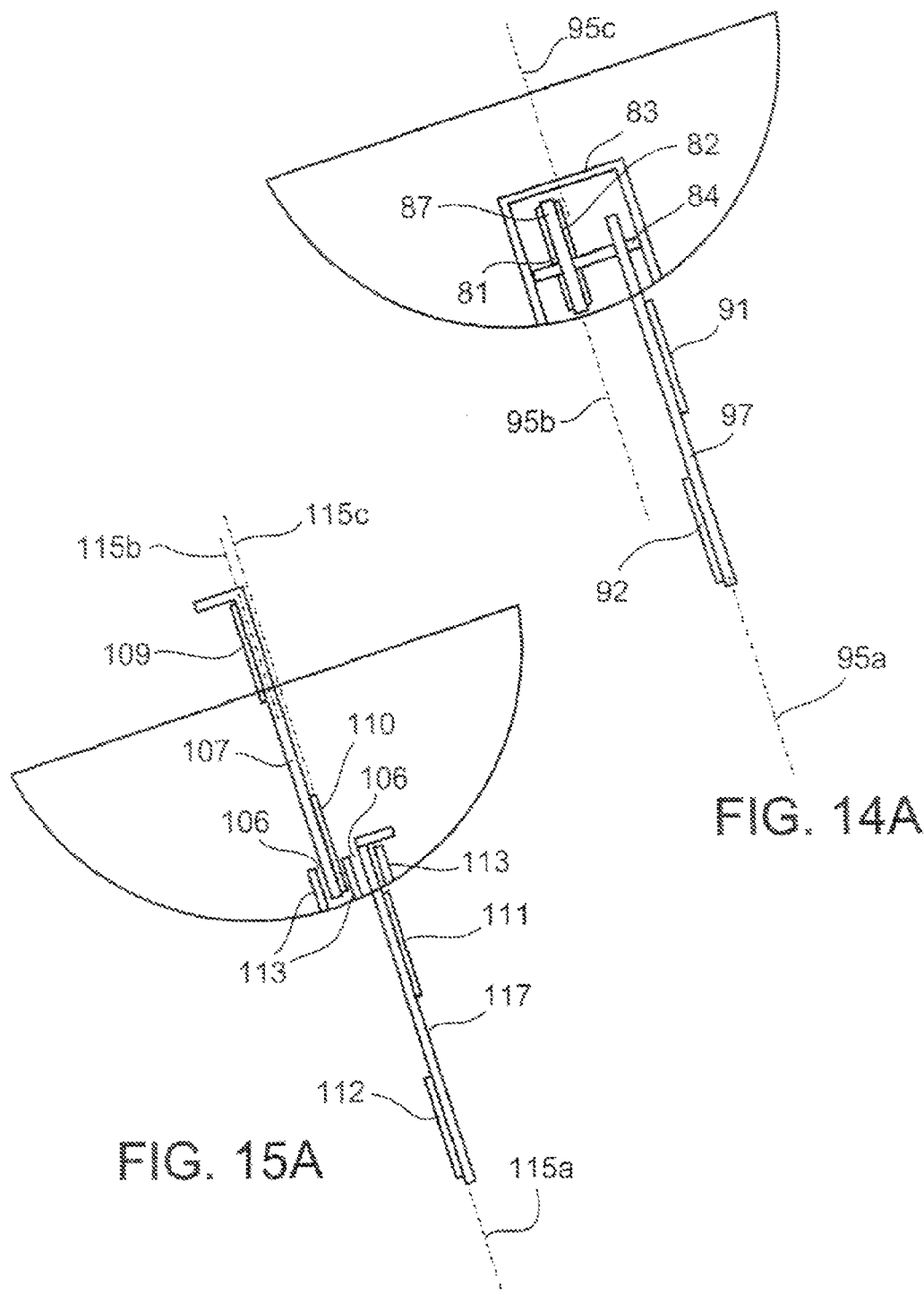

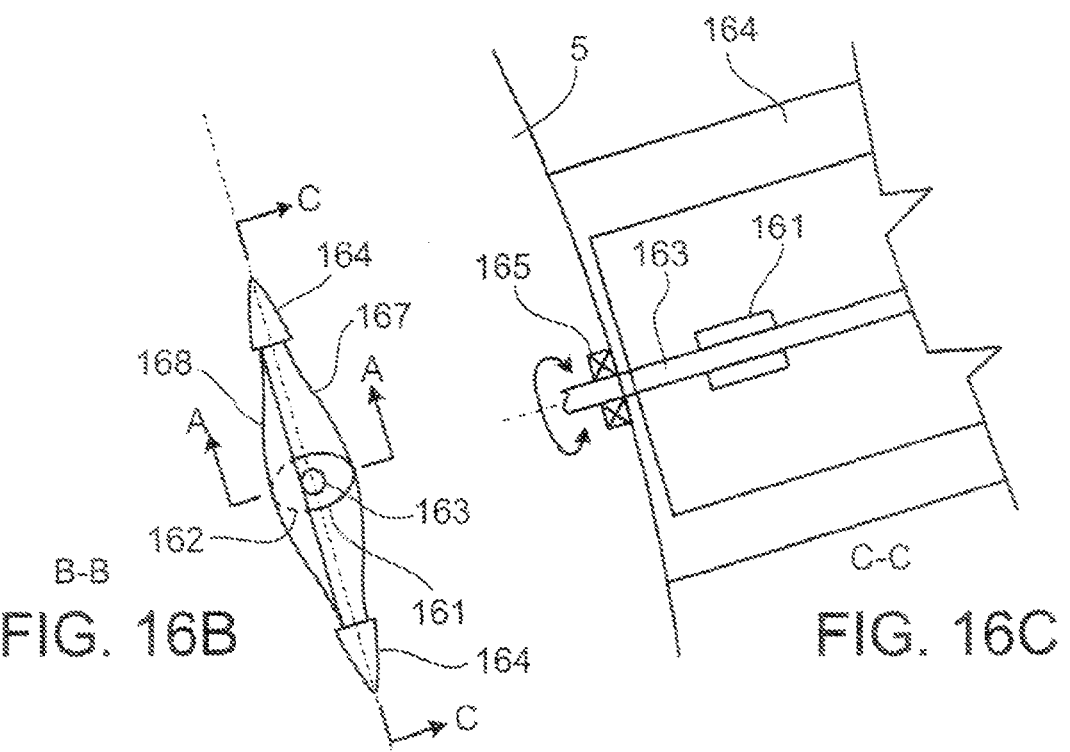
FIG. 16B
FIG. 16C
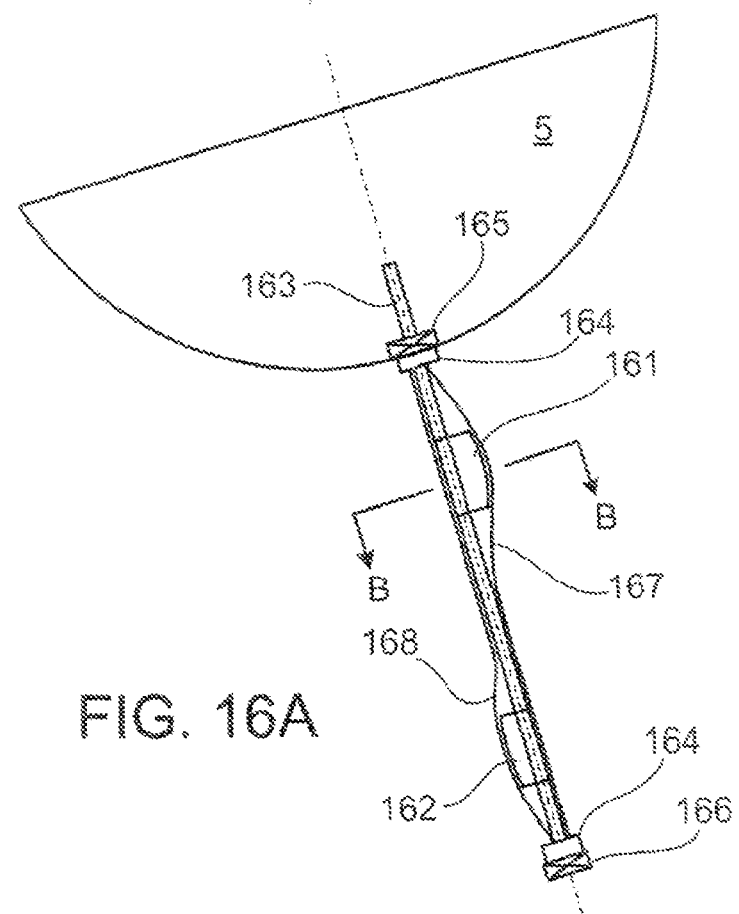
FIG. 16A

APPARATUS AND METHOD TO OPTIMIZE SAILING EFFICIENCY

FIELD OF THE INVENTION

This invention relates to sailing vessels. In particular this invention relates to appendages extending from a sailing vessel hull—keels, centerboards, dagger boards, and the like. More particularly, this invention relates to sailing vessel appendages that simultaneously control leeward drift forces, heeling forces, effective weight, and drag. Although adaptable to sailing vessels of all types, the invention is particularly suited for high performance sailing yachts.

BACKGROUND OF THE INVENTION

The time required to reach a windward mark on a passage of a sailing yacht is dependent upon the Velocity Made Good (VMG) which, among other things, is greatly influenced by four major factors: the amount of leeward drift of the vessel, the heeling angle of the vessel, the effective weight of the vessel, and the drag on the vessel.

Velocity Made Good (VMG) is defined as that component of a sailing vessel's velocity made good toward windward. It is that component of a vessel's velocity which is directly opposite to the direction of the true wind.

The aerodynamic and hydrodynamic fluid forces that act on a sailing vessel as it moves toward its windward mark or destination can be resolved into components that are parallel and perpendicular to the direction of undisturbed fluid flow. The component parallel to the direction of undisturbed fluid flow is called a driving force when acting in a forward direction or drag when opposing forward motion. The component perpendicular to the direction of undisturbed fluid flow is called lift. The lift force of the sails is perpendicular to the direction of the apparent wind and lift force of the hull is in a plane perpendicular to the course sailed (PPCS).

The leeward drift of a conventional keeled sailing vessel is a result of the lateral component of the wind force on the exposed surface area above the waterline (including sails, rigging, and hull) and the lateral component of the water forces acting on the surfaces below the waterline, including the hull, keel, and rudder. In order for a vessel to sail toward its windward mark, the keel and rudder must provide resistance to the leeward drift forces. Since a conventional keel is symmetrical, this can only be accomplished by establishing a leeward angle of attack which makes the vessel angle, or crab, toward its objective. The leeward angle $\lambda$ is defined as the angle between the course steered and the course, or track, sailed.

The minimum resistance offered by the water to forward motion of the canoe body and keel of a sailing vessel occurs when the vessel is pointed directly opposite to the incident fluid flow, that is, in the direction of the course sailed. Therefore, directing a vessel at a leeward angle to its track through the water increases the drag on its hull and keel. The increased drag reduces the forward velocity of the vessel. The decrease in the forward velocity, in turn, reduces the velocity made good, VMG.

The heeling angle of a sailing vessel is proportional to the lateral forces of the wind pressing upon its sails, rigging and hull as well as lateral water forces on its hull, keel and rudder. When a vessel is sailing upright, or perpendicular to the plane of the surface of the water, it captures the maximum available wind and therefore has the maximum amount of wind energy to convert into forward propelling energy. When a sailing vessel is heeling, the horizontal projection of the sail area is reduced in proportion to the increase in heeling angle. Thus, forward propelling energy is lost because less wind energy is captured by the sails. Unfortunately, what suffers most when the sails are inclined is the production of the upper areas of the sails since they are brought closer to the water surface where, due to wind shear, the wind velocity is lower. It is not uncommon for the wind velocity at deck altitude to be 25% less than velocity at the top of a 45 foot mast. Since the wind force is proportional to the square of the velocity, this translates to about a 43% reduction in wind force. Therefore, as a boat heels, the sails are withdrawn from the location where the wind force is significantly greater.

The aerodynamic and hydrodynamic forces that act on a sailing vessel can be considered to be perpendicular to the surfaces that generate them. When a vessel is sailing erect, therefore, the total sail forces are most effective because they are directed within the horizontal plane of travel. However, when a vessel heels, the total sail force is no longer directed in the horizontal plane of travel but is angled down by a degree equal to the heeling angle. Thus, the forward propelling force—that component of the total sail force that is parallel to the incident water flow and thus acts to drive a sailing vessel in the direction of travel—is also reduced.

The heeling angle also creates a vertical component of the wind force that, like gravitational weight such as ballast, acts in a downward direction. This downward component of the force is lost to forward propelling energy and without compensation would also contribute to the effective weight of the vessel and thereby increase the displacement, wetted surface, and associated drag. The lift force generated by the symmetrical keel of a conventional sailing vessel is in a plane perpendicular to the course sailed, PPCS, and is a function of the angle of attack of the keel to the incident water. Therefore when the helm compensates for an increased leeward drift force by increasing the leeward angle, the angle of attack of the keel is increased. The increased lift force so produced comprises a horizontal component that counters the leeward drift force of the sails and an upward vertical force component that counters the downward force exerted by the sails, thus returning the vessel to equilibrium and maintaining its original track. This is not without cost, however, because the higher angle of attack increases the induced drag on the vessel.

Other losses are introduced by heeling because the shape of the hull is usually optimized for minimum drag and/or wetted surface when the vessel is sailing upright or perpendicular to the plane of the water. For this reason, the drag is also increased by heeling, at an additional expense to the forward velocity of the vessel.

Further, the horizontal force that the keel provides to resist leeward drift is a function of the heeling angle of a vessel and, all other things being equal, is diminished as the cosine of the heeling angle diminishes with an increase in the heeling angle.

The weight, or more properly, the effective weight of a sailing vessel, at any given moment, determines the displacement and therefore the wetted surface and related drag on a sailing vessel. A decrease in the effective weight results in a decrease in the wetted surface and associated drag with an attendant increase in forward velocity. Less effective weight also improves the vessel's ability to reach a planing condition.

As stated above, a decrease in weight or effective weight is accompanied by a decrease in drag on a sailing vessel. A decrease in the effective weight can be achieved by a reduction in the heeling angle which will redirect the force exerted by the sails into a more horizontal direction. Accordingly, cascading benefits will accrue: a proportional component of the sail force will be converted from a vertically downward or effective weight force into forward driving force which increases the velocity of the vessel; a higher velocity permits a reduction in the leeward angle that must be sailed in order to reach a given mark; the reduced leeward angle decreases the drag associated with the angle of attack of the keel and the crabbing of the canoe body of the sailing vessel.

The overall efficiency of a sailing vessel can be substantially improved by a decrease in leeward drift, heeling angle, effective weight, or drag; provided, of course, that the improvement in any one of these characteristics is not obtained at an equivalent or greater expense of one or more of the other characteristics.

Early yacht designs incorporated fixed, symmetrical appendages known as conventional keels, which extended down from the hull in alignment with the vertical longitudinal midplane of the vessel. An essential function of the keel was to resist leeward drift caused by the lateral component of wind force on the vessel. This required a vessel to maintain a heading at a leeway angle to the course sailed.

Later designs for sailing vessels have utilized asymmetric hydrofoils intended to counter the forces that cause leeward drift. Although efficient in this regard, the horizontal and vertical components of the forces exerted by these hydrofoils, however, either increased the heeling force, or increased the effective weight.

U.S. Pat. No. 6,032,603 discloses such a prior art, asymmetric hydrofoil, keel design. FIG. 3 of that patent is reproduced as FIG. 1 here. The sailing vessel is shown on a starboard tack heeling at an angle of 20 degrees. The hydrofoil is mounted on the keel, with its cambered surface facing toward the windward side, to create a generally windward directed, counter-leeward drift force. This does give relief to the leeward drift forces acting on the vessel; that is, the counter leeward-drift force equals the lateral force, Q, generated by the hydrofoil, times the cosine of the heeling angle of the vessel. The hydrofoil also generates, however, a heeling moment which is equal to the force, Q, times its perpendicular distance from the line of that force to the (instant) axis of rotation of the sailing vessel.

Symmetric keels of traditional sailing vessels oppose leeward drift by sailing at a leeward angle to the track of a vessel but leeward drift can also be opposed by an asymmetric hydrofoil designed and located to provide counter-leeward drift forces. The latter is more efficient in two ways. First, for a given value of counter-leeward drift force, an asymmetric hydrofoil can move at a lower angle of attack thereby inducing less drag; and second, since the counter-leeward drift force generated by an asymmetric hydrofoil reduces the required leeward angle, it permits the vessel to point closer to its desired track. It is noteworthy that although an asymmetric hydrofoil does not require sailing at a leeward angle to produce a counter leeward drift force as does a symmetric keel shape, if necessary it can do so, which would increase its angle of attack and thus its lifting force and, like its symmetric cousin, but to a lesser extent, its drag will also increase.

FIG. 1 provides an example of an asymmetric hydrofoil mounted on the keel of a sailing vessel. The hydrofoil has a cambered surface facing generally toward the windward side of the vessel and a non-cambered surface facing generally toward the leeward side of the vessel. The velocity over the cambered surface is higher than the velocity over the non-cambered surface and according to Bernoulli's principal, an increase in velocity will be accompanied by a proportional decrease in pressure. Thus, in this case, differential between the lower pressure on the cambered side and the higher pressure on the non-cambered side of the hydrofoil produces a force Q toward the windward side of the vessel. Then, as shown, its horizontal component serves to oppose leeward drift forces acting on the vessel. It must be noted though, that force Q also acts at a perpendicular distance from the instant axis of rotation of the vessel and force Q multiplied by this distance exerts a heeling moment that adds to the existing heeling moments acting on the vessel.

When the wind presses upon the sails of a traditional sailing vessel, the vessel heels and the center of buoyancy moves from the midplane of the vessel to leeward. Since the weight and buoyancy forces are then no longer in vertical alignment, they form a counter-heeling couple, tending to right the vessel. When additional counter-heeling moments were required, designs called for additional weight or ballast to be added to the lower end or tip of the keel. Therefore, when a vessel heeled, the ballast acted on the moment arm, so provided, to exert an additional moment to counter the heeling moments leveraged by the wind on the vessel. The amount of ballast that is required to provide an adequate amount of counter-heeling moment can add significantly to the weight of the vessel. Still, such conventional designs afford only limited control of the righting moment and the heeling angle can only be further reduced by lateral motion of the crew or on-board moveable weight.

More recently, a canting keel has been introduced to provide a counter-heeling moment by suspending a ballast bulb beneath the hull on a laterally swinging or canting member that increases the anti-heeling lever arm of the ballast when rotated toward the windward side of a tacking sailing vessel. Such mechanisms do resist heeling moments but, like conventional ballast, because they function gravitationally, considerable weight must be incorporated in their design. Additionally, a keel canted to a severe angle can do little to resist leeward drift forces. Therefore, supplementary fore and aft appendages must be added to provide the necessary counter-leeward drift forces.

A subsequent development in the canting keel is the addition of a hinged hydrofoil or flap mounted on a canting keel or strut that connects the hull to the ballast. This hydrofoil, or flap, is intended to provide additional heeling resistance when it is necessary to increase the anti-heeling force because the ballast has been canted to its limit and operating conditions require additional anti-heeling force.

U.S. Pat. No. 5,622,130 discloses such a flap. FIG. 1 of that patent is reproduced as FIG. 2 here. As can be seen, the counter-heeling flap or hydrofoil 20 is mounted on the trailing edge of the keel or strut 14 on an axis along, or parallel to, the longitudinal dimension of the strut 14. When activated, unless the keel 14 is vertical, the force generated by the hydrofoil 20 will be at an angle to the horizontal. Since the flap would only be activated when the vessel was heeling, its hydrodynamic force would be at an angle to the horizontal. Therefore, as that force acts to resist heeling, it has components that exert both a horizontal force that increases the leeward drift of the vessel and a downward force that adds to the effective weight of the vessel. Compensation for the increase in these forces can be made by increasing the leeward angle and thus the angle of attack of the keel.

An example makes this clear. FIG. 3 is a stern view schematic of the prior art shown in FIG. 2 with the appendages 16 and 18 omitted for clarity. As shown in FIG. 3, the flap 20, mounted on a canting keel 14 of a sailing vessel, is at an angle of 42 degrees to the vertical because the vessel is heeling at an angle (Phi) of 20 degrees, with its keel canted at an angle (Kappa) of 22 degrees from the midplane of the vessel. When flap 20 is actuated to exert an additional counter-heeling force ($F_{CH}$), the horizontal, or drift component of this force ($F_D$), would equal $F_{CH}\times$ cosine 42 degrees, or 0.743 $F_{CH}$ acting in a leeward direction, thus increasing the drift of the vessel. The vertical or weight component of force $F_{CH}$, called $F_W$, would equal $F_{CH} \times$ sine 42 degrees, or 0.669 $F_{CH}$ acting in a downward direction, increasing the effective weight of the vessel.

Other early designs offer embodiments that were intended to counter the leeward drift forces and the heeling moments with appendages or foils that function hydrodynamically. Such foils, however, produce components that exert significant downward forces on the sailing vessel. These forces mimic the weight disadvantage of ballast, and tend to pin down or pull the vessel deeper into the water, increasing the displacement, the wetted surface, and the attendant drag, all of which tax the velocity of the vessel. In addition, depending upon the attitude, shape or efficiency of the hydrofoil, these forces may create significant additional heeling moments proportional to the amount of leeway that the vessel is making.

Australian Patent Application AU-A-85 668/82 exemplifies such a design. The embodiment shown in FIG. 3 of that patent is shown here as prior art FIG. 4. As seen in FIG. 4, the vessel is shown heeled 20 degrees on a starboard tack. Two fins, 5a and 5b, which are shaped and positioned to produce hydrodynamic forces in a generally downward direction, are shown. The fins are fixed to the tip of the keel and the surfaces on their undersides are angled at 20 degrees down from the horizontal when the keel is in the vertical position. According to FIG. 4, the force Q' on the windward side, named herein $Q'_W$, is equal to the force Q' on the leeward side, named herein $Q'_L$. If so, the windward fin 5b produces no counter-leeward drift lift while the leeward fin 5a produces a counter-leeward drift equal to $Q'_L$ Sin 40° for a net decrease in the leeward drift forces acting on the vessel. An additional advantage is obtained because the angle of the fins increases the effective span or draught of the keel as the vessel heels. However, FIG. 4 also shows that the vessel must bear the vertically downward or effective weight forces exerted by both hydrofoils. Together, these downward or effective weight forces are the sum of the vertical components of the forces exerted by the hydrofoils, that is: $Q'_W$ plus $Q'_L$ Cos 40°=1.766 Q'.

Still, other prior art keel designs that generate counter-heeling moments either have no compensation on the keel for the drift forces that are necessarily introduced by such counter-heeling designs, or additional appendages are added elsewhere on the hull to counter the drift forces. If such compensation is provided by a single counter-leeward drift appendage, not in line with the keel, it will likely establish a yawing moment that can reduce the efficiency of the vessel and compromise the rudder's ability to control the vessel. Two such appendages working to compensate for said counter-heeling device could be added to the hull to provide counter-leeway drift forces and yawing control but likely would add complexity to the system and drag to the vessel.

The above-mentioned considerations associated with keels, canting keels, associated hydrofoils and the like apply to the design of any class of sailing vessel. The need exists for an improved design that reduces heeling, leeward drift, weight, and drag in such a manner that an improvement in one does not significantly degrade another.

This need is particularly acute in the design of high performance sailing yachts specifically designed for the America's Cup Race. Improved designs for America's Cup Class Yachts must conform to the specifications required by the America's Cup Class Rule Version 5.0

In consideration of designs disclosed herein that are intended to qualify for America's Cup Class Rule Version 5.0, three requirements, which have related significance, are noted. First, Rule 17.10 states: "The maximum number of movable appendages shall be two . . . ." Second, Rule 17.10(a) further limits the movement of these appendages "to rotation only." Third, The Deed of Gift, written in 1887, that established America's Cup Races, contained a few select rules that must be followed to this day, including the following: "Center-board or sliding keel vessels shall always be allowed to compete in any race for this Cup, and no restrictions nor limitations whatever shall be placed upon the use of such center-board or sliding keel, nor shall the center-board or sliding keel be considered a part of the vessel for any purposes of measurement."

Four formulae of America's Cup Class (ACC) Rule, Version 5.0 that govern the design requirements for sailing vessels competing in The America's Cup are of particular importance. These formulae place interacting restrictions on the variables: Rated Length in meters (L), Measured Length in meters (LM), Displacement in cubic meters (DSP), Rated Sail Area in square meters (S), a Weight Penalty, by definition in meters (WP), Weight in kilograms (W), and a Freeboard Penalty in meters (FP).

They are bound in the primary formula of Section B, 5:

$$[L+1.25\times(S)^{-2}-9.8\times(DSP)^{-3}]/0.686 <= 24.000 \text{ metres} \qquad (a)$$

and defining formulae, respectively, of Section B, 6.1; Section B, 8.1 and Section C, 12.2:

$$L=LM\times[1+2,000\times(LM-22.1)^4]+FP+WP, \qquad (b)$$

$$DSP=W/1025, \text{ where } 1{,}025 \text{ kgs/m}^3 \text{ is the density of sea water} \qquad (c)$$

$$WP=4\times[(\text{yacht's weight in kgs})^{-3}-28.845] \qquad (d)$$

Formula (a) shows that the factors L and/or S can be increased when DSP, which is equivalent to weight, increases. However, formula (d) shows that for any vessel exceeding 24,000 kilograms a weight penalty (WP) is imposed and according to formula (b) the weight penalty WP will dictate either a reduction in the measured length LM or an increase in the value of the rated length L. Referring back to formula (a), if L is increased, S must then be reduced to maintain the formula limit of 24 meters. It might be noted that an increase in the weight W also increases displacement DSP but this does little to counteract the disadvantage imposed by the weight penalty WP.

The effect of how a weight change manifests itself on the relative values of L and DSP in formula (a) can be shown in the following example, wherein the weight of a vessel W=27,000 kilograms:

It is evident from formula (b) that any change in WP is comparable to a change in L. Also, to be on an equal footing in formula (a), a change in L, hence WP, must be compared to a change in the factor "9.8 $(DSP)^{-3}$". When the weight of the vessel changes, as in this example, from 24,000 kgs to 27,000 kgs, the components WP and $\Delta$ 9.8 $(DSP)^{-3}$ compare as follows:

1. $WP = 4[(27{,}000)^{-3} - (24{,}000)^{-3}]4[30 - 28.845] = 4.62$ meters

2. $\Delta 9.8(DSP)^{-3} = 9.8(27{,}000/1025)^{-3} - 9.8(24{,}000/1025)^{-3}$
   $= 9.8(2.97 - 2.86) = 1.08$ meters 3. $WP - \Delta 9.8(DSP)^{-3} = 4.62 - 1.08 = 3.54$ meters (11.6 feet)

Therefore, assuming that the Freeboard Penalty (FP) remains unchanged, the Measured Length LM would have to be decreased sufficient to reduce the value of rated length L by 3.54 meters in order to compensate for the Weight Penalty WP in this example.

It can be seen that, all other things being the same, for a vessel of a given rated length L and weighing more than 24,000 kg, a decrease in the weight, and therefore a decrease in the weight penalty, (WP), will allow an increase in the measured length (LM) and thus an increase the maximum attainable velocity of such a high performance racing yacht. An alternative would be to not change LM, which would then reduce the value of the rated Length L. This would then permit an increase in the sail area. Therefore, it is desirable to enable designers of sailing vessels in this category to increase counter-heeling moments without adding additional ballast and without suffering additional drift forces.

Accordingly, the present invention is directed toward overcoming the aforementioned problems associated with keel arrangements and designs, thus creating a more efficient sailing vessel in any class or category. The present invention is further directed toward improved designs, embodiments, and systems that enable the improvement of any one, or any combination, of the above cited performance characteristics. The present invention is still further directed to overcoming the aforementioned problems associated with keel arrangements and designs while adhering to the design rules required for boats to participate in the America's Cup Race.

SUMMARY OF THE INVENTION

It is therefore an object of the present invention to provide a drift control and a heel control system that can simultaneously improve leeward drift, heeling, effective weight and associated drag, or any combination thereof, to enable an overall improvement in the efficiency of sailing vessels.

It is a further object of this invention to provide a drift control and a heel control system that enables the selection of any one, or any combination thereof of the improvements disclosed herein, in order to satisfy designers' objectives in the creation of efficient sailing vessels in any class or category.

It is an object of this invention to provide designs that incorporate both counter-leeward drift (CLD) and counter-heeling (CH) flaps or hydrofoils on the keels of sailing vessels.

It is an object of this invention to reduce the drag on a sailing vessel.

It is an object of the present invention to provide an improved sailing vessel keel capable of countering leeward drift forces and simultaneously countering heeling moments produced by lateral wind and water forces acting on sailing vessels.

It is a further object of this invention to provide an improved sailing vessel keel that provides counter-leeward drift forces and counter-heel forces while further minimizing the downward forces that increase the effective weight of the vessel.

It is a further object of this invention to provide an improved keel that reduces the net leeward drift forces and simultaneously reduces the net heeling moments produced by lateral forces, with minimal or no increase in the downward forces that increase the effective weight of sailing vessels.

It is a further object of the invention to provide a keel capable of not only eliminating any net downward resulting dynamic forces but also capable of yielding a positive or net upward resultant force while providing both counter-heeling moments and counter-leeward drift forces.

It is a further object of the invention to provide a keel with a counter-heeling capacity capable of converting some or all of the downward component of the wind force on the vessel's sails into a resultant increase in forward propelling force with an accompanying reduction in the vessel's effective weight.

It is a further object of the invention to provide a keel with a counter-heeling capacity not only capable of reducing the heeling angle of a sailing vessel, but also able to effect negative heeling when desired by the helm to counteract various downward forces acting on a sailing vessel.

It is a further object of this invention to provide a keel that can produce dynamic forces that reduce the required gravitational weight force of the ballast.

It is an object of the present invention to provide an improved sailing vessel keel capable of countering leeward drift forces with little increase or even a decrease in the net heeling moments, downward forces, effective weight forces, drag forces or any combination thereof.

It is an object of the present invention to provide an improved sailing vessel keel capable of countering heeling moments with little increase or even a decrease in the net leeward drift forces, downward, or effective weight forces, drag forces or any combination thereof.

It is an object of this invention to provide an improved sailing vessel keel capable of countering, downward or effective weight forces with little increase or even a decrease in the net leeward drift forces, heeling moments, drag forces or any combination thereof.

It is a further object of this invention to enable the downward or effective weight to be increased when it is desirable, for example, to reduce pitching or to increase the effective waterline length.

A still further object of the present invention is to provide a keel that acts hydrodynamically rather than gravitationally in reducing the heeling angle of a sailing vessel thus enabling a reduction or even the elimination of gravitational ballast of a vessel.

It is a further object of the present invention to provide a keel that, while controlling leeward drift forces, acts hydrodynamically and gravitationally in reducing the heeling angle of a sailing vessel thus enabling a reduction in the required gravitational ballast of a vessel.

It is a further object of the present invention to reduce the amount of ballast weight required to counter heeling of a sailing vessel in order to increase the vessel's potential for hydroplaning and to improve its downwind performance without introducing additional leeward drift forces.

It is a further object of the present invention to provide flaps, hydrofoils, or members that counter the heeling moments of a sailing vessel thereby reducing the required ballast and the downward effective weight component of the sails, without introducing additional leeward drift forces, with a resultant reduction in displacement, wetted surface of the hull and associated drag.

It is a further object of the present invention to provide flaps, hydrofoils, or members that reduce the heeling angle of a sailing vessel, thereby increasing the forward propelling force component of the sails for an overall improvement in the forward velocity and sailing efficiency of the vessel.

It is also an object of this invention to enable designs that can reduce the heeling moments on a sailing vessel without increasing the leeward drift forces acting on the vessel.

It is also an object of this invention to enable designs that can reduce the leeward drift forces acting on a sailing vessel without increasing the downward force or effective weight of a vessel.

It is also an object of this invention to enable designs that can reduce the heeling moment on a sailing vessel without increasing the downward forces or effective weight of the vessel.

It is also an object of this invention to enable designs that can reduce the weight of a sailing vessel.

It is also an object of this invention to enable designs that can reduce the downward forces or effective weight of a sailing vessel without increasing the leeward drift forces acting on a vessel.

It is also an object of this invention to enable designs that can reduce the downward forces or effective weight of a sailing vessel without increasing the heeling moment of a vessel.

It is also an object of this invention to enable designs that can reduce the downward forces or effective weight of a sailing vessel without decreasing the weight of the vessel.

It is also an object of the invention to provide counter-leeward drift and counter-heeling flaps, hydrofoils, or members each of which perform their function with a minimum yawing moment on the vessel.

It is an object of the invention to provide counter-leeward drift and counter-heeling flaps, hydrofoils, or members on a single appendage (e.g. keel) such that sailing vessels of a rudder and keel design are provided with counter leeward-drift and counter-heeling attributes without the need for additional appendages.

It is an object of the invention to have heel control and drift control systems that can act independently or interactively, including, but not limited to any of the following: Systems that can be coupled to yield optimum or predetermined sailing characteristics. Systems that can be controlled by related mechanical, electro-mechanical or like assemblage and/or governed by the helm or in combination with an interrelated, or predetermined program. Systems that can also incorporate servo controls to make sensitive, self regulated, automatic performance corrections and systems that can be controlled in response to positioning, apparent wind velocity and direction, vessel velocity, heading and track data received from on board instrumentation, GPS or the like and attitude data obtained from gyroscopic, gravitational, magnetic or like instrumentation.

The objects of the present invention will be generally achieved by providing a sailing yacht with an adjustable hydrodynamic heel control system that acts independent of, or in conjunction with, an adjustable hydrodynamic drift control system to simultaneously counter both heel and drift forces.

Further objects of the present invention will generally be achieved by providing a sailing yacht with a keel-mounted, variable, controllable, counter-leeward drift hydrofoil and a keel-mounted, variable, controllable, counter-heeling hydrofoil.

Still further objects of the present invention will generally be achieved by providing a sailing yacht with a keel-mounted, variable, controllable, counter-leeward drift hydrofoil and a keel-mounted, variable, controllable, counter-heeling hydrofoil that are independent but can act in conjunction with prior-art drift or heel control systems such as fixed ballast or canting keel designs.

Still further objects of the present invention will generally be achieved by providing a sailing yacht with a keel-mounted, single rotating member that provides primarily counter-leeward drift forces by a hydrofoil-shaped section of the member positioned at an upper and forward facing position on the keel, while simultaneously providing primarily counter-heeling forces by a second hydrofoil-shaped section of the member positioned at a lower and rearward-facing position on the keel, the entire member acting as one unit but performing two functions. An alternative configuration that will function in essentially the same way would face the upper, counter-leeward drift hydrofoil toward the rear or trailing edge of the keel with the lower, counter-heeling hydrofoil facing toward the forward or leading edge of the keel.

Still further objectives of the present invention will generally be achieved by strategically locating counter-heeling and counter-drift hydrofoils on the vessel that provide dynamic lift to counter both the heeling moments and drift forces.

Further objectives of the present invention will generally be achieved by providing systems and controls that enable variable independent or connected control of the counter-drift, counter-heel and associated embodiments disclosed herein.

Further objectives of the present invention will generally be achieved by providing the counter-leeward drift and counter-heeling flaps or hydrofoils closely vertically in line with each other.

Objects of the present invention will be achieved by a sailing vessel having a hull, an appendage extending from the hull and having a midplane, a first flap attached to the appendage and rotatable about a first axis that is disposed within or substantially parallel to the midplane and is also disposed at an angle of less than 90 degrees from a vertical plane perpendicular to the midplane, and a second flap attached to the appendage and rotatable about a second axis that is disposed within or substantially parallel to the midplane and is also disposed at an angle of less than 90 degrees from a vertical plane perpendicular to the midplane.

Further objects will be achieved where at least one of the first axis or the second axis is substantially parallel to a vertical plane perpendicular to the midplane.

Further objects will be achieved where the first axis and the second axis are substantially parallel to a vertical plane perpendicular to the midplane and substantially vertically aligned.

Further objects will be achieved where at least one of the first axis or the second axis is adjustable to an angle of less than 90 degrees from a vertical plane perpendicular to the midplane.

Further objects will be achieved where at least one of the first flap or the second flap is attached to the appendage by a hinge.

Further objects will be achieved where one of the first flap or the second flap is attached to the appendage at a minimum distance from a design longitudinal axis of the hull and the other is attached to the appendage at a maximum distance from the design longitudinal axis of the hull.

Further objects will be achieved where the first flap is disposed proximate to the root end of the appendage and extends substantially toward the trailing edge of the appendage; and wherein the second flap is disposed at the tip end of the appendage and extends substantially toward the trailing edge of the appendage.

Further objects will be achieved where the first flap is disposed proximate to the root end of the appendage and extends substantially toward the leading edge of the appendage; and where the second flap is disposed at the tip end of the appendage and extends substantially toward the leading edge of the appendage.

Further objects will be achieved where the first flap is disposed proximate to a root end of the appendage and extends substantially toward the leading edge of the appendage; and wherein the second flap is disposed at a tip end of the appendage and extends substantially toward the trailing edge of the appendage.

Further objects will be achieved where the first flap is disposed proximate to a root end of the appendage and extends substantially toward the trailing edge of the appendage; and where the second flap is disposed at a tip end of the appendage and extends substantially toward the leading edge of the appendage.

Objects of the present invention will be achieved by a sailing vessel having: a hull; an appendage extending from the hull and having a leading edge, a trailing edge, two surfaces, and a midplane; a first hydrofoil member; and a second hydrofoil member; and a single, rotatable member having an axis disposed substantially parallel to the midplane; where the first hydrofoil member and the second hydrofoil member are incorporated in and integral with, the single, rotatable member.

Further objects will be achieved where the first hydrofoil member is disposed proximate to the root end of the appendage and extends from the rotatable member substantially toward the leading edge of the appendage; and where the second hydrofoil member is disposed at the tip end of the appendage and extends from the rotatable member substantially toward the trailing edge of the appendage.

Further objects will be achieved where the first hydrofoil member is disposed proximate to the root end of the appendage and extends from the rotatable member substantially toward the trailing edge of the appendage; and where the second hydrofoil member is disposed at the tip end of the appendage and extends from the rotatable member substantially toward the leading edge of the appendage.

Further objects will be achieved where the first hydrofoil member and the second hydrofoil member are configured to move toward opposite surfaces of the appendage when the rotatable member is rotated.

Objects of the present invention will be achieved by a sailing vessel having: a hull; an appendage extending from the hull and having a leading edge, a trailing edge, two surfaces, and a midplane; a first hydrofoil, with at least one cambered side, slidably attached to the appendage; and a second hydrofoil, with at least one cambered side, slidably attached to the appendage.

Further objects will be achieved where the cambered surface of at least one of the first hydrofoil and the second hydrofoil is disposed at an angle to the midplane of the appendage.

Further objects will be achieved where the first hydrofoil or the second hydrofoil slide in a track that is substantially parallel to the leading edge or the trailing edge of the appendage.

Further objects will be achieved where the surfaces flare outward from the midplane of the appendage proximate to the root end of the appendage such that each hydrofoil may be parked on the flared section when moved to root end of the appendage.

Objects of the present invention will be achieved by a sailing vessel having: a hull; an appendage extending from the hull and having a leading edge, a trailing edge, two sides, and a midplane; and a plurality of deformable members; where at least one deformable member is deposed on each of the two sides.

Further objects will be achieved by including, on each of the two sides: a first deformable member proximate to the root end of the appendage; and a second deformable member proximate to the tip end of the appendage.

Further objects will be achieved by including a first deformable member, disposed on a first side of the appendage and comprising a flexible surface; a second deformable member, disposed on a second side of the appendage and comprising a flexible surface; an upper cam configured to deform a portion of the first deformable member at a first rotational position and deform a portion of the second deformable member at a second rotational position; and a lower cam configured to deform a portion of the first deformable member at a first rotational position and deform a portion of the second deformable member at a second rotational position.

Objects of the present invention will be achieved by a sailing vessel having: a hull having a midplane that includes a design longitudinal axis of the hull; an appendage extending from the hull and having a root end, a tip end, and first and second surfaces; a first fixed member mounted on the appendage proximate to the root end and extending from the first surface; and a second fixed member mounted on the appendage proximate to the tip end and extending from the second surface.

Further objects will be achieved by including a plurality of the appendages; and a slot, through which at least one of the appendages can be inserted, where the slot is disposed in a plane at an angle of less than 90 degrees from the midplane of the hull.

Further objects will be achieved by including a plurality of the appendages; a slot, adapted to hold at least two appendages; and an axis around which each appendage pivots; where the axis is disposed within a vertical plane and/or a horizontal plane at an angle of 90 degrees or less from the midplane of the hull.

Objects of the present invention will be achieved by a sailing vessel having: a hull having a midplane and a design longitudinal axis; an appendage having a root end and a tip end; a first reversible member (1) having a cambered side and a substantially flat side, (2) mounted on the appendage, and (3) having an axis substantially parallel to the design longitudinal axis of the hull; and a second reversible member (1) having a cambered side and a substantially flat side, (2) mounted on the appendage, and (3) having an axis substantially parallel to the design longitudinal axis of the hull; where the first reversible member is disposed proximate to the root end of the appendage and the second reversible member is disposed proximate to the tip end of the appendage.

Objects of the present invention will be achieved by a sailing vessel having a hull; an appendage extending from the hull; means for generating counter-heeling forces; means for generating counter-leeward drift forces.

Objects of the present invention will be achieved by a sailing vessel having: a hull; an appendage extending from the hull; means for hydrodynamically generating counter-heeling forces; means for hydrodynamically generating counter-leeward drift forces.

Further objects will be achieved by including a control system capable of (1) determining apparent wind direction and velocity; (2) determining the sailing vessel's position, velocity, heading, track, pitch, yaw, and roll; (3) calculating any adjustments necessary to optimize time to a desired mark; (4) adjusting the flaps, hydrofoils, or members to substantially achieve the optimization.

Objects of the present invention will be achieved by steps for maximizing the efficiency of a sailing vessel, having a hull, an appendage extending from the hull, a first flap or member attached to the appendage and a second flap or member attached to the appendage, including: (1) determining a mark; (2) pointing the vessel to a heading necessary to reach the mark; (3) adjusting a first flap, hydrofoil, or member attached to the appendage to account for leeward drift forces; and (4) adjusting a second flap, hydrofoil, or member attached to the appendage to account for heeling forces; and (5) readjusting controls for optimized sailing efficiency to reach the mark.

Further objects will be achieved where the flaps or members are adjusted by rotating a single unit that is integrally connected to two oppositely acting flaps or members in order to simultaneously account for leeward drift and heeling forces.

Objects of the present invention will be achieved by steps for maximizing the efficiency of a sailing vessel, having a hull, an appendage extending from the hull, a first adjustable hydrodynamic member attached to the appendage, and a second adjustable hydrodynamic member attached to the appendage, including: (1) determining a mark; (2) determining apparent wind direction and velocity; (3) determining the sailing vessel's position, velocity, heading, track, pitch, yaw, and roll; (4) pointing the hull at a heading necessary to reach the mark; (5) adjusting a first hydrodynamic member attached to the appendage to account for leeward drift forces; (6) adjusting a second hydrodynamic member attached to the appendage to account for heeling forces; and (7) readjusting heading for optimized sailing efficiency to reach the mark.

BRIEF DESCRIPTION OF THE DRAWINGS

Further objects and advantages of the present invention will become apparent from the following description and claims and from the accompanying drawings, which are not necessarily drawn to scale, especially where necessary to emphasize certain features discussed herein, and wherein:

FIG. 7b is a simplified diagram showing the angles and relative dimensions of FIG. 7a.

FIG. 13 is a chart comparing angle Beta β of FIG. 12 vs. EWf, CHf and CDf of the vessel depicted in FIG. 12a.

FIG. 14a is a cross-sectional stern view of still another embodiment of the present invention, depicting a sailing vessel on a starboard tack having a port tack centerboard 87 retracted and a starboard tack centerboard 97 shown rotated down into active position with an upper CLD hydrofoil 91 on the windward side and a lower CH hydrofoil 92 on the leeward side.

FIG. 15a is a cross-sectional stern view of still another embodiment of the present invention, depicting a sailing vessel on a starboard tack having a port tack daggerboard 107 retracted and a starboard tack daggerboard 117 shown inserted into active position with an upper CLD hydrofoil 111 on the windward side and a lower CH hydrofoil 112 on the leeward side.

FIG. 16a is a cross-sectional stern view of still another embodiment of the present invention, depicting a keel having a frame 164 with sides 167 and 168 that can be deformed in the upper section, near the root, by a CLD cam 161 and in the lower section, near the tip, by a CH cam 162 when the camshaft 163, which is controlled from above, is rotated.

FIG. 16b shows a top view, taken as section B-B designated in FIG. 16a.

FIG. 16c shows a side or profile view, taken as section C-C designated in FIG. 16b.

BRIEF DESCRIPTION OF THE PREFERRED EMBODIMENTS

Figure 1:
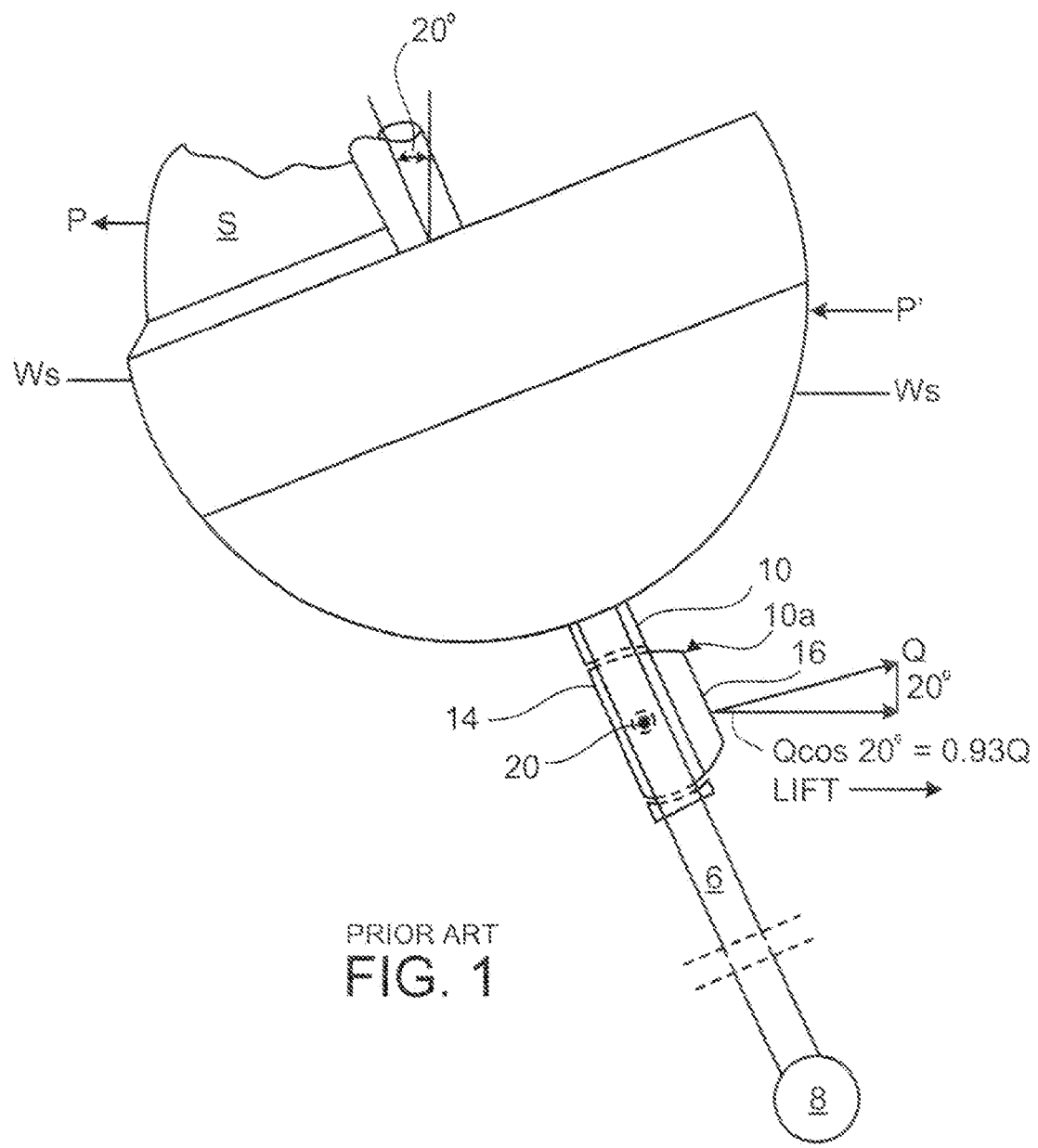
FIG. 1 is a cross sectional view of a sailing yacht on a starboard tack and heeling at an angle of 20 degrees showing a prior art, counter-leeward drift design, which corresponds to FIG. 3 of U.S. Pat. No. 6,032,603.
Figure 2:
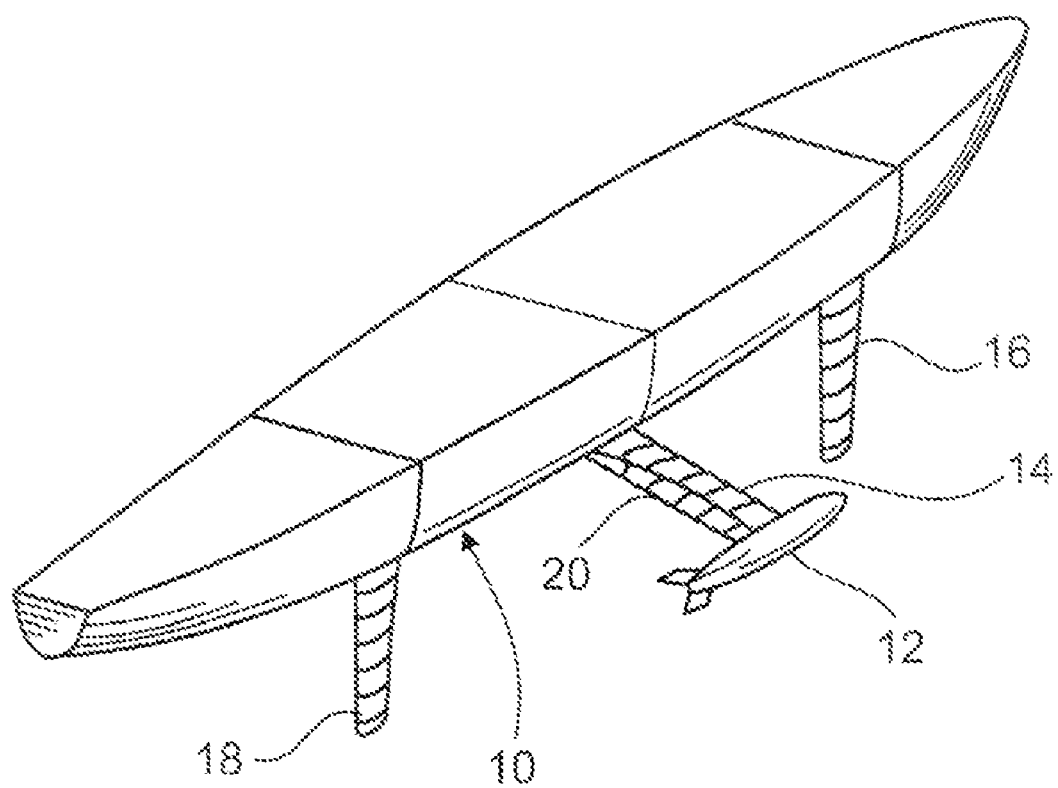
FIG. 2 is an isometric view of a sailing yacht showing a prior art canting keel design, which corresponds to FIG. 1 of U.S. Pat. No. 5,622,130.
Figure 3:
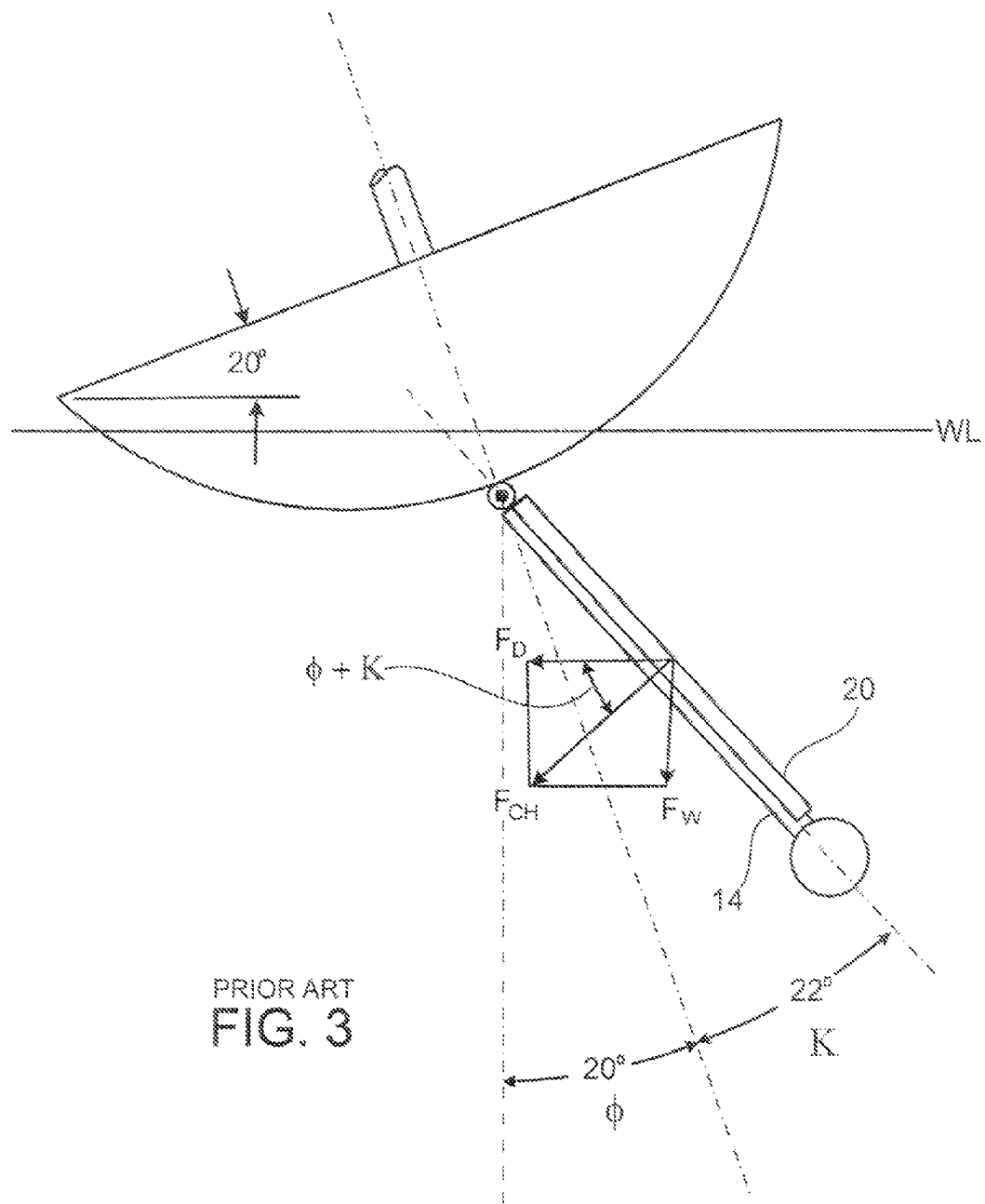
FIG. 3 is a cross sectional view of the sailing yacht of FIG. 2 above, depicting a prior-art canting-keel design on a starboard tack and with vessel heeling at an angle of 20 degrees and with the keel canted 22 degrees from the midplane of the vessel.

Turning now more particularly to the drawings, wherein like numbers refer to like elements, characteristics of the present invention are shown in FIGS. 5-18, with particular emphasis on the twin hydrofoil keel mounted combination of a counter-leeward drift hydrofoil acting in concert with a counter-heeling hydrofoil.

It is understood and defined as used herein that when a flap is hinge-mounted on the keel or similar appendage of a sailing vessel, the flap and the neighboring keel section act in conjunction with each other as a hydrofoil. When the flap is rotated, the overall camber of the hydrofoil changes, thereby changing its hydrodynamic characteristics. Therefore, the forces that are cited herein, in connection with a hinged-flap, are to be considered as the forces that act on the flap as part of the hydrofoil combination of the flap and related keel section.

The effectiveness of hydrofoils in the production of lift becomes apparent when we consider that the forces generated by airfoils as well as hydrofoils are a product of four multipliers: the square of the velocity, the area and lift coefficient of the foil and the density of the fluid, air or water, Recognizing the huge payloads that aircraft are capable of lifting, primarily because of the velocity ingredient, we must consider the great advantage that the hydrofoil has due to the fact that the density of water is about 850 times greater than air.

It is to be further understood that, as used herein:

The term "appendage" means a keel, a centerboard, a dagger board, or a similar protrusion extending from the hull of a sailing vessel and into the water.

The term "hull" means a vessel's shell or body, exclusive of appendages, which provides buoyancy and structure upon which to mount deck, cabin, sails, rigging, and the like. This term is meant to include a monohull of conventional sailing vessels and a single hull of the so-called multihull boats such as catamarans and trimarans, where the multiple hulls are often singularly referred to as pontoons.

The term "center of gravity" (CG) means the geometric center of weight of the boat and every item in it.

The term "vertical center of gravity" (VCG) means the height at which the center of gravity is located.

The term "center of buoyancy" (CB) means the center of gravity of the water displaced by the boat.

The term "vertical center of buoyancy" (VCB) means the height at which the center of buoyancy is located.

The term "waterline plane of the hull" means the two dimensional area within a line defined by the intersection of the hull and the surface of the water within which a vessel floats.

The "design waterline plane of the hull" means the plane within which the designer intended the vessel to float at zero degrees heel.

The "load waterline plane of the hull" means the plane within which the completed vessel actually floats at zero degrees heel. For purposes herein this will be considered to be the same as the "design waterline plane of the hull".

The "heeled or instant waterline plane" means the two dimensional area within a line defined by the intersection of the hull and the surface of the water when the vessel is heeling at any given angle.

The term "design longitudinal axis of rotation, or rolling" (DLAR) means a line extending fore and aft of the hull or pontoon of a sailing vessel upon which the vessel initiates rotation (or rolling) from an initial position of zero degrees heeling. For purposes herein, this will be assumed to be close to the waterline plane and bisect or be about halfway between equal areas of the design waterline plane of the hull.

The term "instant longitudinal axis of rotation" (ILAR) means a line extending fore and aft of the hull or pontoon of a sailing vessel upon which the vessel rotates (or rolls) at any given instant, position or heel angle. This is usually vertically close to the waterline plane and horizontally located to enable equal volumes of emergence and immersion on opposite sides of the hull as the boat heels or rotates. The exact location depends on various factors, but primarily the shape and weight of the hull. For purposes herein, this axis will be assumed to bisect or be about halfway between equal areas, to port and starboard, of the heeled waterline plane of the hull. At the position of zero degrees heeling, the ILAR is equal to the DLAR and as the heeled waterline plane moves, relative to the hull with increased heeling, the ILAR will move accordingly.

The term "midplane" means a bisecting, fore and aft, centered plane of symmetry. The midplane of the hull, or hull midplane, bisects the hull of a sailing vessel in the longitudinal direction and is in a vertical attitude at a heeling angle of zero degrees. Similarly, the midplane of an appendage, or appendage midplane, bisects an appendage of a sailing vessel in the longitudinal direction from the leading edge to the trailing edge of the appendage. The plane of a conventional keel is typically in the same plane as is the midplane of the hull.

Figure 6A:
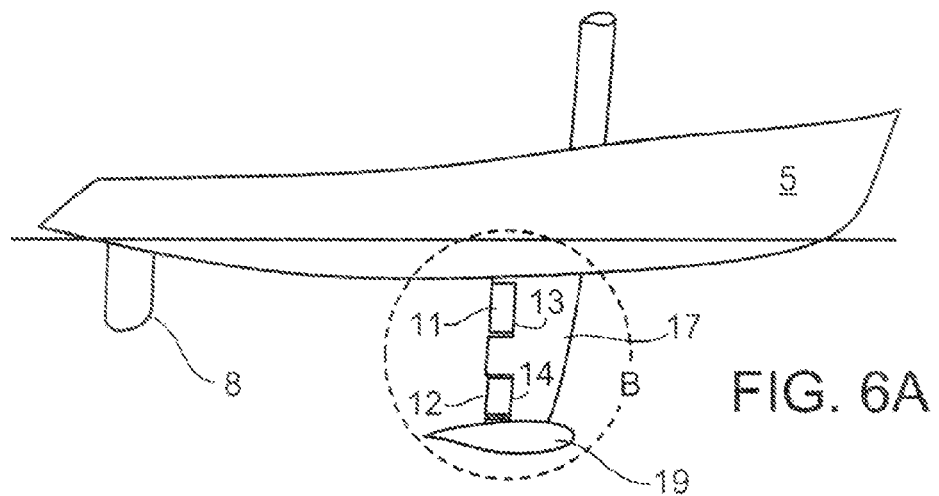
FIG. 6a is a profile view of an embodiment of the present invention depicted in FIG. 5 showing the counter-leeward drift flap 11 above the counter-heeling flap 12.
Figure 6B:
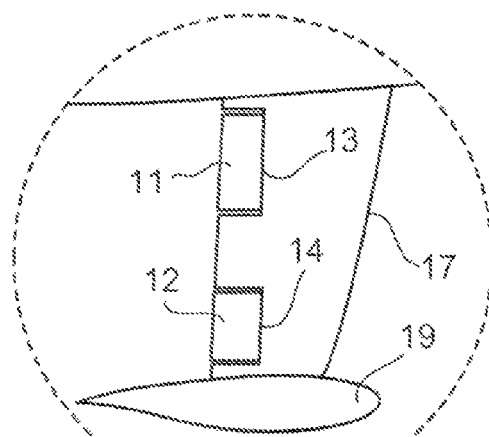
FIG. 6b is a detailed profile view of FIG. 6a depicting the keel with two vertically hinged flaps.
Figure 6C:
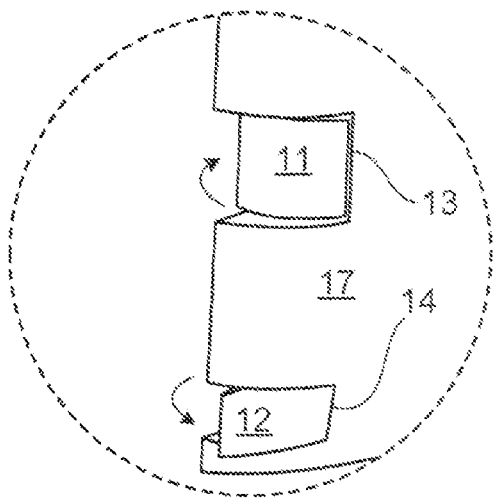
FIG. 6c is an isometric view of the embodiment shown in FIGS. 6a and 6b providing additional detail of the hinged flaps depicted in FIGS. 5 through 6b.
Figure 6D:
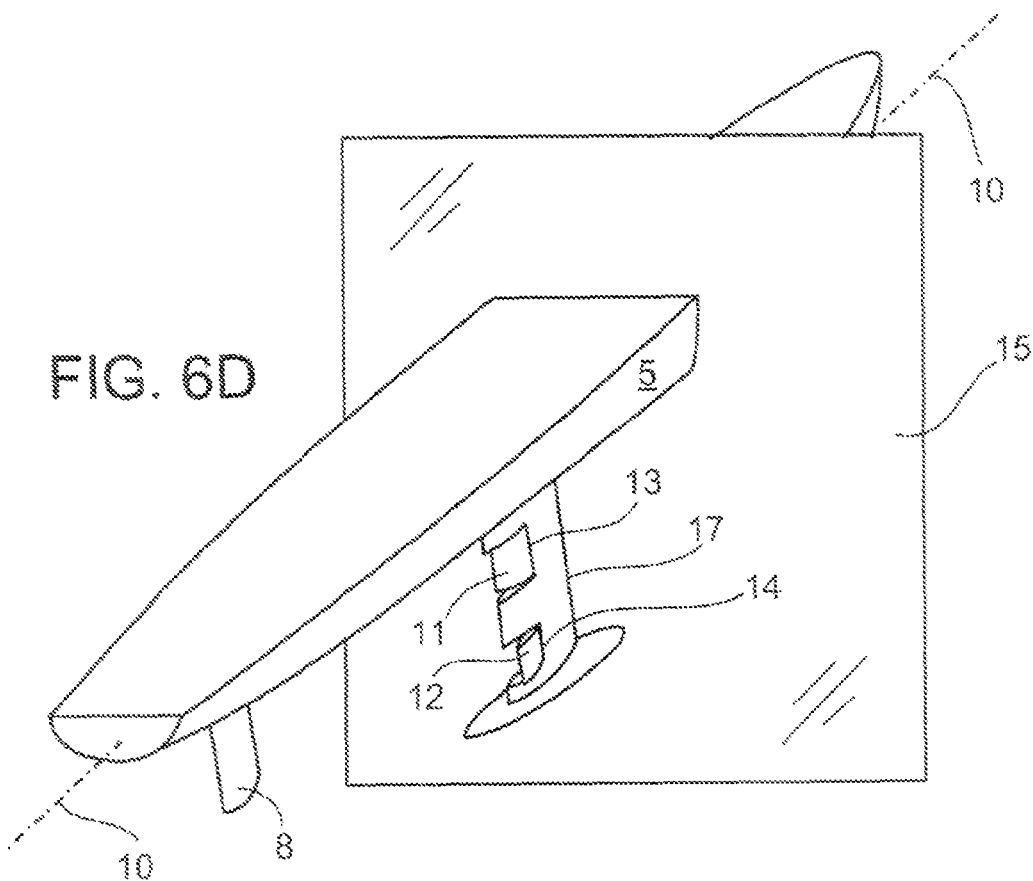
FIG. 6d is an isometric view of the embodiment shown in FIGS. 5-6c depicting the design longitudinal axis of rotation 10 of the hull and a plane 15 perpendicular to said design longitudinal axis of rotation.
Figure 6E:
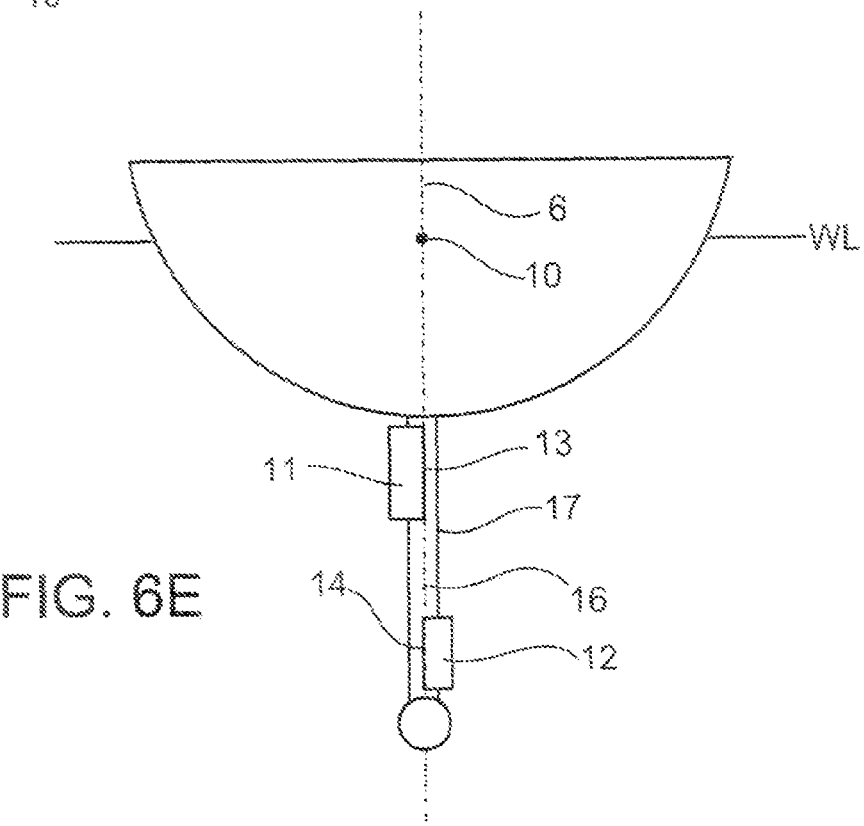
FIG. 6e is a cross-sectional stern view of the vessel shown in FIG. 6d showing the midplane 6 of the hull, the midplane 16 of the keel appendage, and the design longitudinal axis of rotation 10 of the hull.

An example of a midplane of a hull appears in FIG. 6e as reference number 6. Also shown in this figure is an example of a midplane of an appendage or keel, which appears as reference number 16. It can be seen that in this case the two planes are in alignment. Similarly, examples of appendage (e.g., keel, centerboard, or dagger board) midplanes appear in FIGS. 6e, 14a and 15a as reference numbers 16, 95a and 115a respectfully.

FIGS. 5 through 7f depict a sailing vessel shown with hull or body 5, rudder 8, keel 17, and ballast bulb 19. Specific attention is directed to two control flaps mounted on the keel, i.e., an upper, counter-leeward drift flap 11 and a lower, counter-heeling flap 12. For the sake of clarity, all of the drawings herein are not necessarily to scale and may be exaggerated to distinctly present the various elements and angular locations.

Figure 5:
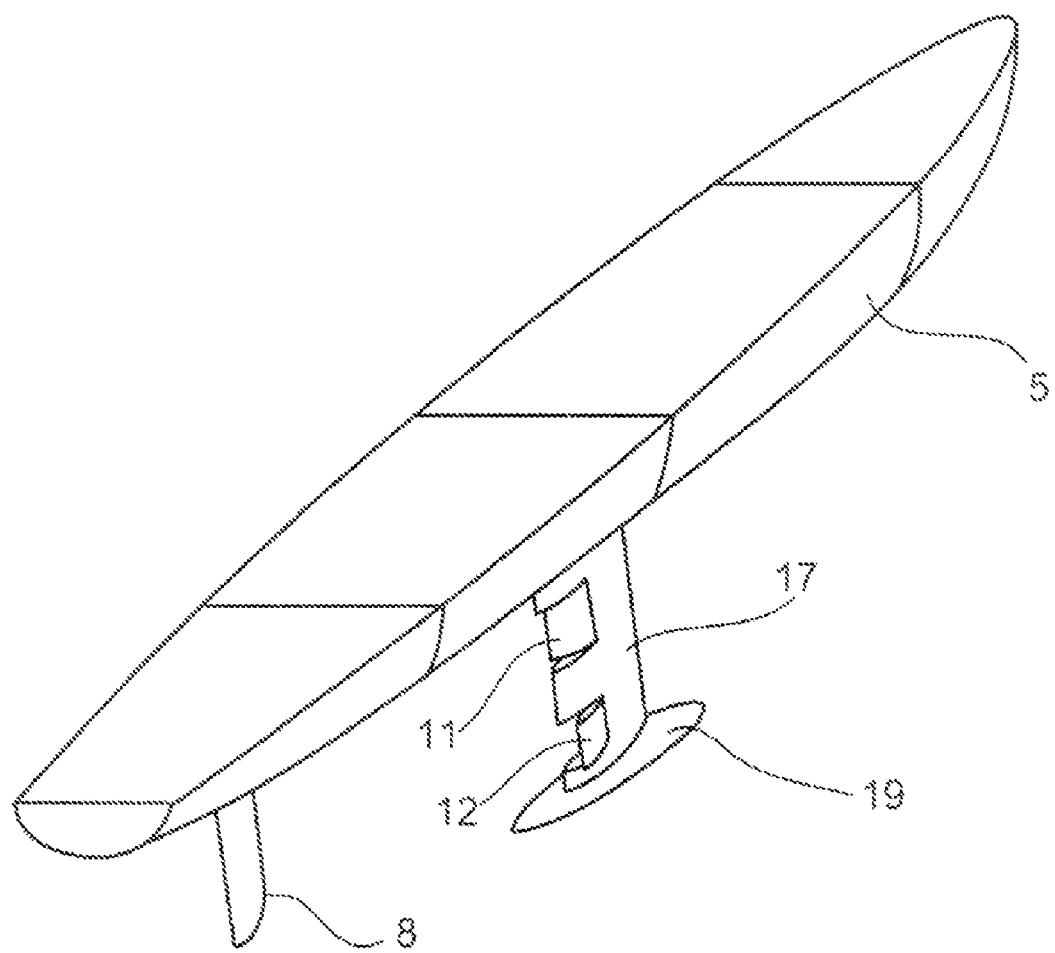
FIG. 5 is an isometric view of a fixed keel sailing vessel with a counter-leeward drift (CLD) flap and a counter-heeling (CH) flap constructed in accordance with an embodiment of the present invention.

FIG. 5 shows the hull 5 of a typical, but modified, according to the present invention, sailing yacht. Its keel 17 is rigidly attached at its root or base to the bottom of the hull 5, its midplane being in vertical alignment with the midplane of the hull. It also has a ballast bulb 19 attached to its lower or tip end. The counter-leeward drift flap 11 is attached to the upper or root portion and trailing edge of the keel 17, close to the hull 5. The counter-heeling flap 12 is attached at the trailing edge and at the lower end, or tip, of the keel 17, just above the ballast bulb 19. Although shown at the trailing edge of the keel, either or both of these hydrofoils or flaps, 11 and 12, can be attached to the leading edge of the keel 17 where, similar to leading-edge flaps on aircraft, they can perform the same function. The two aforementioned flaps, 11 and 12, are designed and located such that the center of effort of the counter-heeling flap 12 is at a considerably greater distance from the design longitudinal axis of rotation, or rolling, taken to be located at point R in FIG. 7a, of the vessel than is the center of effort of the counter leeward-drift flap 11. This distance is intended to provide a much longer moment arm for the counter heeling flap 12 than the moment arm of the counter leeward-drift flap 11. This allows the counter-heeling flap 12 to be much more effective in its intended function. As the skilled artisan would readily appreciate, the differential of these moment arms can be increased or decreased as can be the size, shape or locations of these foils to achieve the desired results.

FIGS. 6a, 6b, 6c, 6d and 6e more clearly show the elements of FIG. 5. Specifically, these figures show detailed views of the counter-leeward drift flap 11 and the counter-heeling flap 12 shown in FIG. 5. The size and shape of the counter-leeward drift flap 11 and the counter-heeling flap 12 can be adapted to meet the objectives of any particular keel design. Additionally, in the embodiment shown in FIGS. 5, 6a, 6b, 6c, 6d and 6e, for each flap or hydrofoil, the angle of deflection can be independently varied during sailing, to increase or decrease the hydrodynamic force exerted by the associated hydrofoil on the vessel as required in order to maximize sailing efficiency. For some designs, for example to simplify or unify controls, the flaps may be coupled to act in accordance with a relationship designed into the coupling mechanism. Hinges 13 and 14 allow for flap movement. Control systems for various hydrofoil movements are known in the art. The present invention envisages any such control system. Such systems could include mechanical and/or electro-mechanical linkages powered by a crank, lever, hydraulic system, servomotor or the like.

Ideally, the CLD flap or hydrofoil will be located high on the keel appendage, as close to the root as efficiency will allow. This will position its center of effective effort close to the design longitudinal axis of rotation (FIGS. 6d and 6e, reference 10) which will minimize its contribution to the heeling moments on the vessel. Complimenting this concept, the CH flap or hydrofoil will be located as close to the lower or tip end of the keel or appendage as efficiency will allow. This will position its center of effort at the maximum effective distance from the design longitudinal axis of rotation which will maximize its contribution to the counter-heeling moments on the vessel. Reference is made to FIG. 6e wherein the hinge 13 of CLD flap 11 and the hinge 14 of CH flap 12 are shown to be located essentially within the midplane 16 of the keel or appendage. Now referring to FIG. 10 wherein the positioning of the hinges is further defined, the CLD flap is referenced as 41 mounted on hinge 43 and the CH flap is referenced as 42 mounted on hinge 44. While still located essentially within the midplane of the keel, hinges 43 and 44 are shown at respective angles $\delta_1$ and $\delta_2$ which are oriented at less than ninety (90) degrees, fore or aft, to a lateral plane (FIG. 6d, reference 15) perpendicular to the design longitudinal axis of rotation of the vessel. Lateral plane 15 in FIG. 6d may also be defined as the vertical plane that is perpendicular to the midplane 16 of appendage or keel 17.

The complimentary function of the two hydrofoils or flaps will simultaneously enable a net reduction in both the leeward drift and the heeling of virtually any sailing vessel so equipped. Sailing efficiency may be thus easily maximized by the simple adjustment of the flap or hydrofoil controls.

Figure 7A:
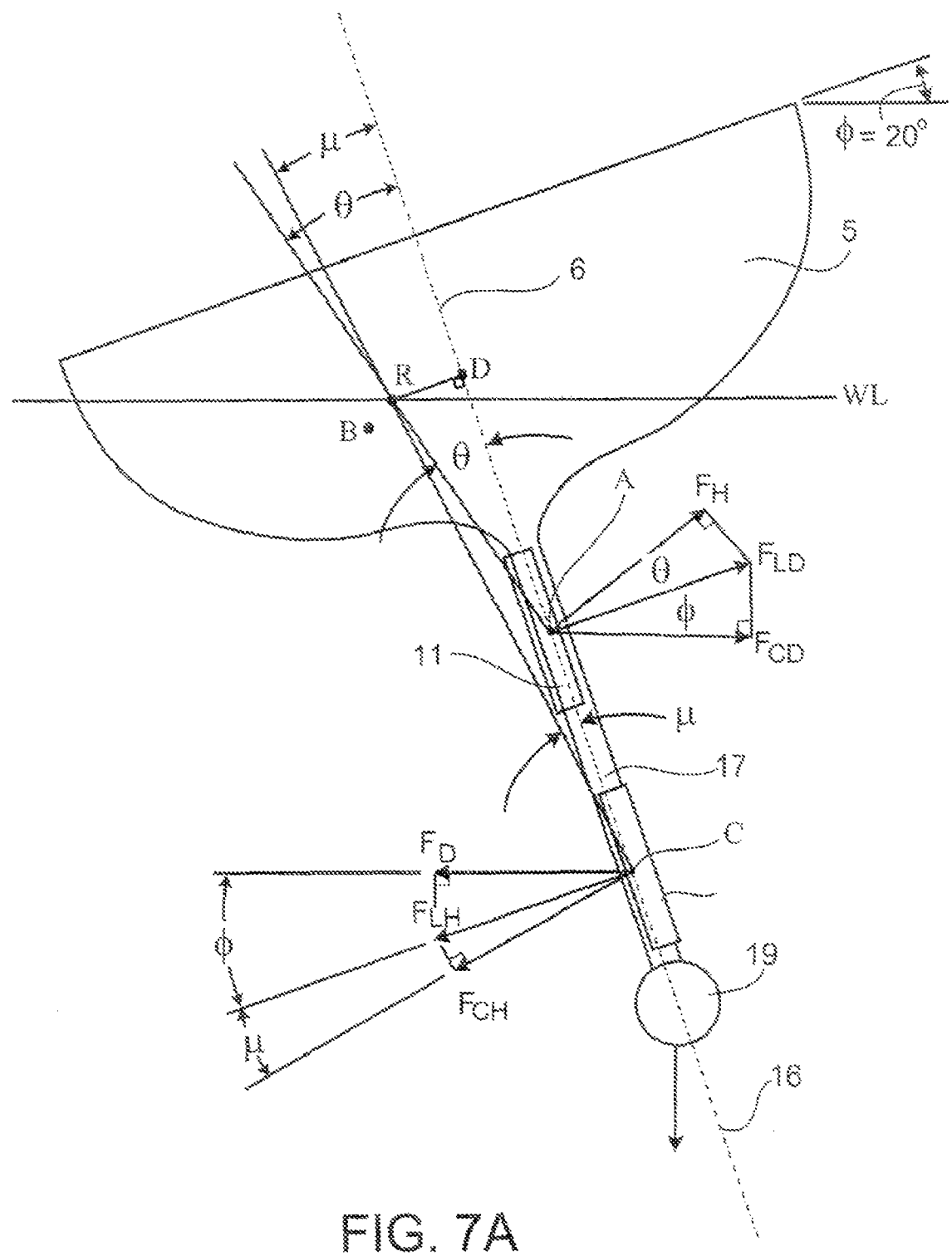
FIG. 7a is a cross-sectional, stern view, perpendicular to the course sailed, PPCS, of a sailing vessel equipped with an upper, counter-leeward drift flap 11 and a lower, counter-heeling flap 12 of an embodiment of the present invention shown in FIGS. 5 through 6e.
Figure 7B:
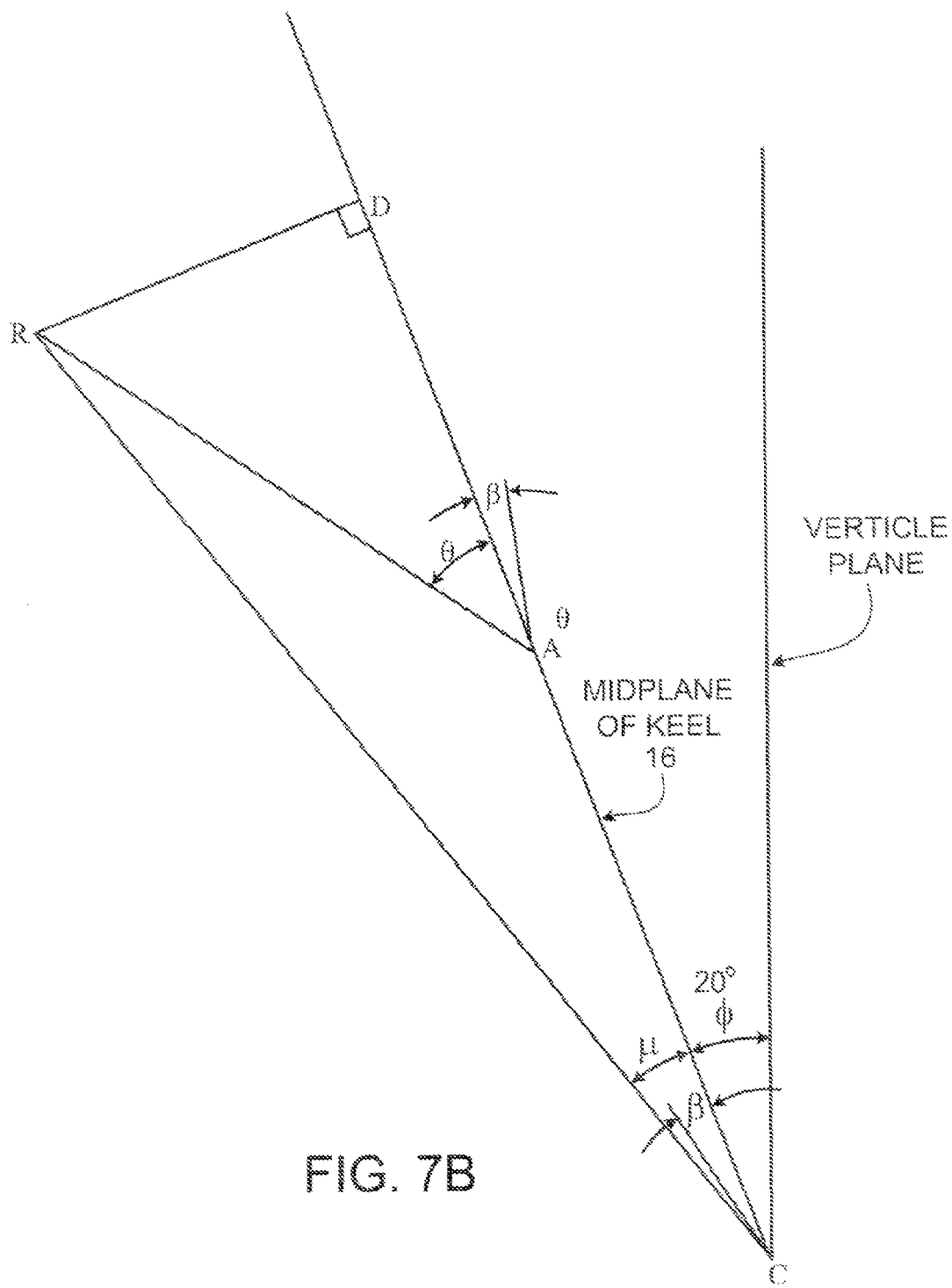

FIG. 7a shows a stern view, in a plane perpendicular to the course sailed (PPCS), of the sailing vessel, depicted in FIGS. 5 through 6e, on a starboard tack, heeling at 20 degrees. Referring also to FIG. 7e, in this attitude, the counter-leeward drift flap 11 is shown rotated toward the leeward side in order to generate a hydrodynamic force $F_{CLF}$ generally toward the windward side of the vessel This force acts at the center of effort A of the CLD hydrofoil which is the combination of flap 11 and its complementary section of keel 17. $F_{LD}$ is the component of the hydrodynamic force $F_{CLF}$ of the CLD hydrofoil, resolved into a plane perpendicular to the course sailed (PPCS). In turn, $F_{LD}$ has a horizontal component $F_{CD}$ which is equal to $F_{LD} \cos \phi$. (Refer to FIG. 7a), where $\phi$ is the heeling angle of the vessel. This is the counter-leeward drift force contributed by the CLD hydrofoil.

Another component of force $F_{LD}$ contributes to the heeling moments acting on the vessel. This component, $F_H$, also acts at the center of effort A of the CLD hydrofoil within a plane perpendicular to the course sailed (PPCS). $F_H$ is equal to $F_{LD} \cos \theta$, where $\theta$ is the angle between RA and the midplane of the keel. RA is the perpendicular distance between the line of the force $F_H$ and the instant longitudinal axis of rotation, which is taken to be at point R in the figure.

If the shape of a hull was perfectly cylindrical, that is, shaped like a log, the perfect symmetry of its circular cross-section would cause the axis of rotation, or rolling, to reside at the intersection of the midplane and a projected line of the buoyancy force, regardless of the angle of heel. This would allow the vessel to immerse a volume on one side of the vessel equal to the volume being emerged on the opposite side of the vessel as the vessel rotates on this axis at any heeling angle. However, for other hulls, for example wine glass and elliptical shaped cross-sections, the symmetry of the submerged cross-section is lost upon heeling and, as the area of the instant waterline plane moves away from the midplane with rotation of the hull, the instant axis of rotation will move as well. The movement of the axis will closely follow a position that continues to allow the area of the instant waterline plane to be longitudinally bisected by this axis, thus assuring that the volume of water displaced by immersion on one side of the axis is replaced by an equal volume of water due to emergence on the opposite side of the axis. The buoyant force necessary to support the weight of the vessel thus remains constant. It may also be noted that the variation of cross-section along the length of the hull will also have an effect on the longitudinal trim of the vessel.

The component $F_H$ multiplied by its perpendicular distance RA to the instant longitudinal axis of rotation, R, is a heeling moment, $F_H \times RA$, exerted by the CLD hydrofoil on the vessel.

Figure 7C:
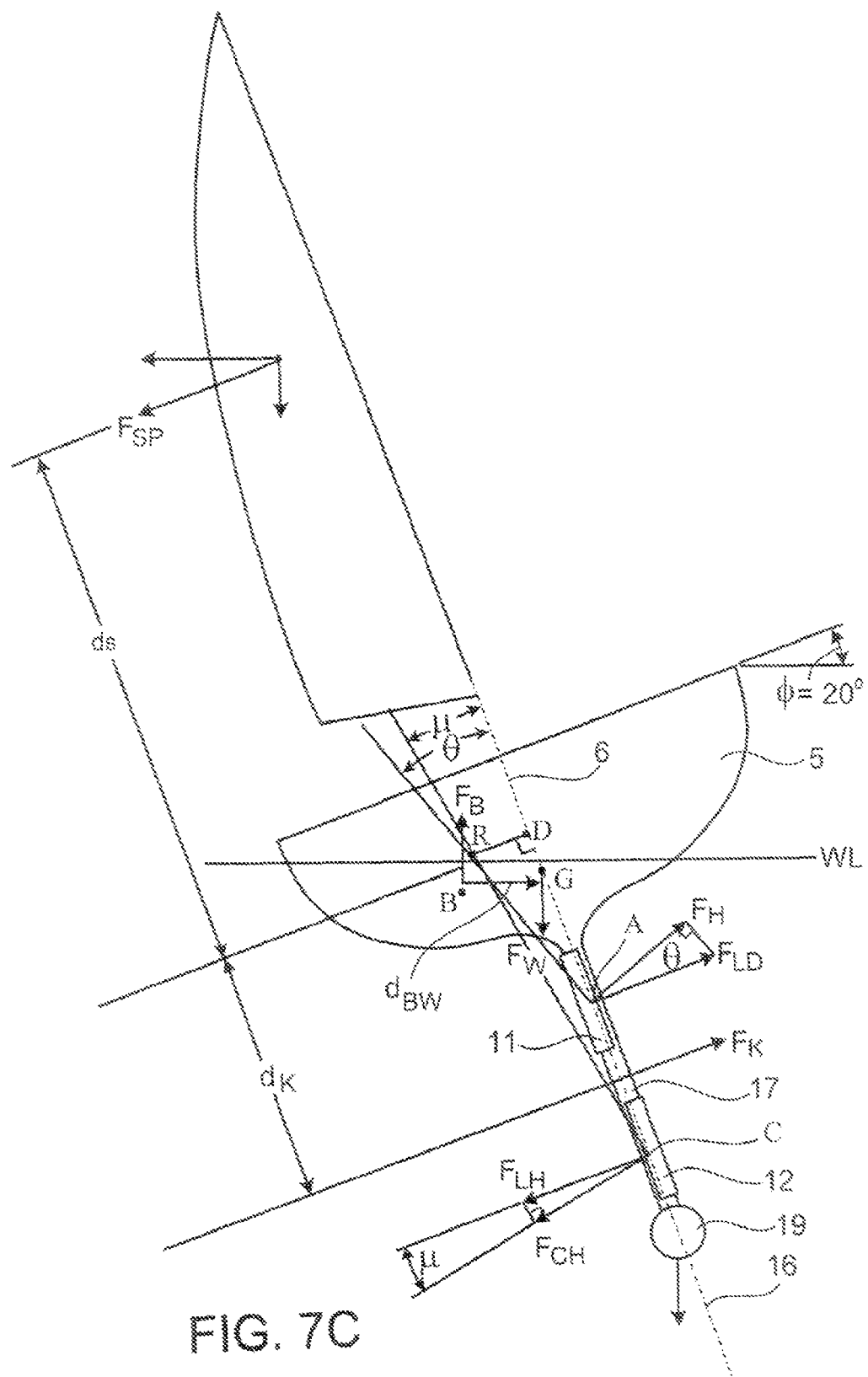
FIG. 7c is a graphic representation of the angles and dimensions of vessel of FIG. 7a including sail area.
Figure 7D:
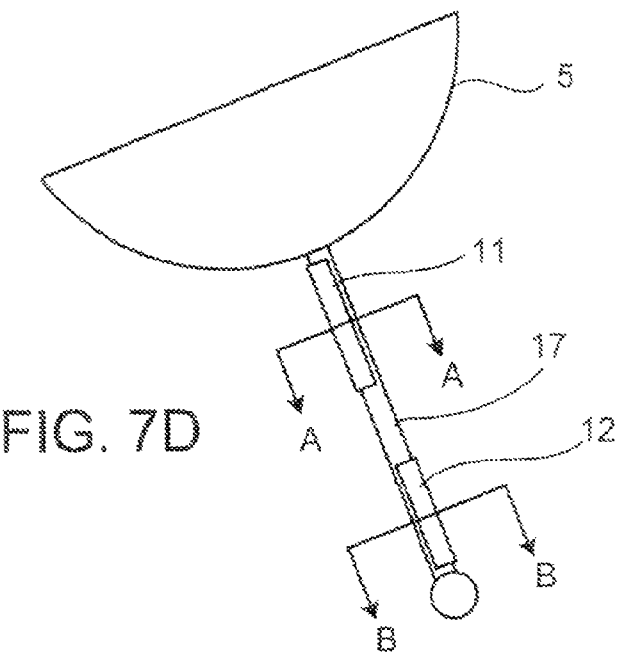
FIG. 7d is a simplified drawing of the vessel shown in FIG. 7a, also showing cross-section designations, A-A and B-B, for FIGS. 7e and 7f.
Figure 7E:
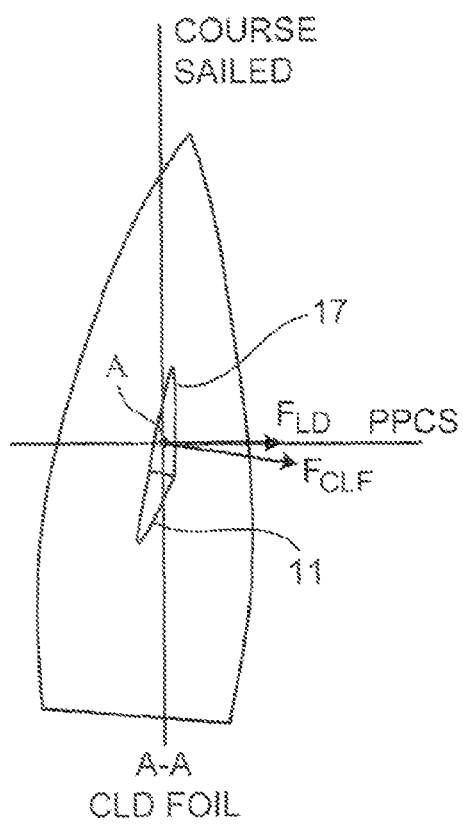
FIG. 7e is a top view of the cross-section A-A of FIG. 7d, showing the counter-leeward drift (CLD) hydrofoil with its flap 11 rotated toward leeward.
Figure 7F:
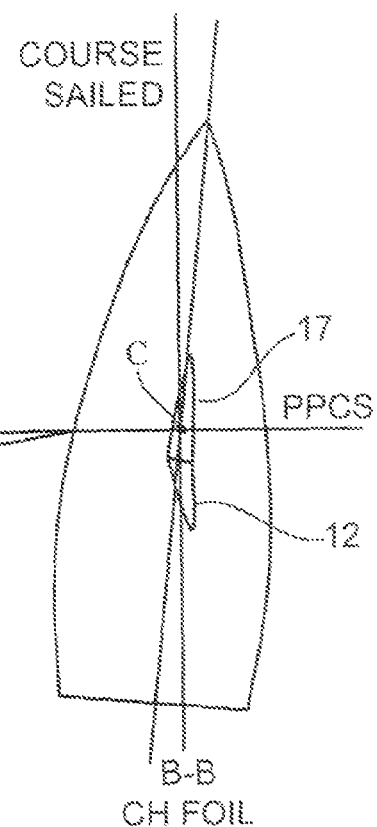
FIG. 7f is a top view of the cross-section B-B of FIG. 7d, showing the counter-heeling (CH) hydrofoil with its flap 12 rotated toward windward.

The moment, $F_H \times RA$, and the counter-leeward drift force, $F_{LD} \cos \phi$, both of which are generated by the CLD hydrofoil when flap 11 is actuated, have counterparts that are generated by the CH hydrofoil when flap 12 is actuated. These are treated as follows:

Referring to FIG. 7f, the counter-heeling flap 12 is shown rotated toward the windward side to generate a hydrodynamic force $F_{CHF}$, directed generally toward the leeward side of the vessel. This force acts at the center of effort C of the CH hydrofoil which is the combination of flap 12 and its complementary section of keel 17. $F_{LH}$ is the component of the hydrodynamic force, $F_{CHF}$ of the CH hydrofoil, resolved into a plane perpendicular to the course sailed (PPCS). Referring to FIG. 7a, $F_{LH}$, in turn, has a horizontal component $F_D$, which is equal to $F_{LH} \cos \phi$, where $\phi$ is the heeling angle of the vessel. $F_D$ also acts at the center of effort C of the hydrofoil 12 in the plane perpendicular to the course sailed (PPCS). This is the leeward drift force contributed by the CH hydrofoil.

The force $F_{LH}$ also has a component, in the plane perpendicular to the course sailed that acts at the center of effort C of hydrofoil 12 in a direction perpendicular to the instant longitudinal axis of rotation R of the vessel. This component, $F_{CH}$, is equal to $F_{LH} \cos \mu$, where $\mu$ is the angle between RC and the midplane of the keel. RC is the perpendicular distance between the line of force $F_{CH}$, and the instant longitudinal axis of rotation R of the vessel. The force $F_{CH}$ multiplied by its perpendicular distance RC to the instant longitudinal axis of rotation R of the vessel represents the counter-heeling moment, $F_{CH} \times RC$, provided to the vessel by the CH hydrofoil.

An analysis of the effective weight forces, drift forces and heeling moments more clearly shows how the efficiency of a sailing vessel can be improved by this embodiment of the present invention.

The net change in effective weight force contributed to the vessel by the CLD and CH hydrofoils when flaps 11 and 12 are activated (ΔEWF 11/12), as depicted in FIG. 7a can be calculated as follows:

$$\Delta EWF\ 11/12 = F_{LD} \sin \phi - F_{LH} \sin \phi \qquad \text{Eq. 1W-1}$$

where a negative value of ΔEWF 11/12 indicates an increase in effective weight

It can be seen that when $F_{LD} = F_{LH}$, then: ΔEWF 11/12=0

As required, the net effective weight can easily be reduced by the helm or an associated automatic control system by rotating hydrofoil 11 an additional amount toward leeward to increase $F_{LD}$. As will be seen hereinafter, this will also increase the net counter-leeward drift force and the net heeling moment on the vessel.

The drift forces contributed by the CLD and CH hydrofoils when flaps 11 and 12 are activated, ΔLDF 11/12, can be summarized as follows:

Delta Leeward Drift Force (ΔLDF 11/12)=$F_{CD} - F_D$ $$\Delta LDF\ 11/12 = F_{LD} \cosine \phi - F_{LH} \cosine \phi \qquad \text{Eq. 1D-1}$$

Where:

A positive value of ΔLDF 11/12 indicates an increase in counter-drift forces.

$F_{LD}$ is a component of the hydrodynamic force of the CLD foil, of which flap 11 is an element, resolved into a plane perpendicular to the course sailed, PPCS.

$F_{LH}$ is a component of the hydrodynamic force of the CH foil, of which flap 12 is an element, resolved into a plane perpendicular to the course sailed, PPCS.

$F_{CD}$ is the horizontal counter-leeward drift force component of $F_{LD}$, also acting in the plane perpendicular to the course sailed, PPCS.

$F_D$ is the horizontal leeward drift force component of $F_{LH}$ also acting in the plane perpendicular to the course sailed (PPCS).

Phi ($\phi$) is the heeling angle of the vessel.

The heeling moments contributed by the CLD and CH hydrofoils when flaps 11 and 12 are activated, $\Delta$ CHM 11/12, can be summarized as follows:

Heeling Moment generated by the CLD hydrofoil when flap 11 is actuated (HM11):

$$HM\,11 = F_H \times RA = F_{LD}\,\text{cosine}\,\theta \times RA$$

Where:
R is the instant longitudinal axis of rotation of the vessel.
A is the center of effort of the upper hydrofoil 11.
RA is the lever arm distance between points R and A.
Theta ($\theta$) is the angle between RA and the midplane of the keel 17.
$F_{LD}$ is a component of the hydrodynamic force of the CLD foil, of which flap 11 is an element, resolved into a plane perpendicular to the course sailed, PPCS.
$F_H$ is that component of force $F_{LD}$ directed at right angles to lever arm RA also acting in the plane perpendicular to the course sailed (PPCS).

Counter-heeling moment generated by the CH hydrofoil when flap 12 is actuated CHM 12:

$$CHM\,12 = F_{CH} \times RC = F_{LH}\,\text{cosine}\,\mu \times RC$$

Where:
R is the instant longitudinal axis of rotation of the vessel
C is the center of effort of the CH hydrofoil
RC is the lever arm distance between points R and C
Mu ($\mu$) is the angle between RC and the midplane of the keel 17.
$F_{LH}$ is a component of the hydrodynamic force of the CH foil, of which flap 12 is an element, resolved into a plane perpendicular to the course sailed (PPCS).
$F_{CH}$ is that component of force $F_{LH}$ directed at right angles to lever arm RC, also acting in the plane perpendicular to the course sailed (PPCS).

Delta ($\Delta$) of the Counter-heeling Moments of CLD and CH when flaps 11 and 12 are actuated ($\Delta$CHM 11/12):

$$\Delta CHM\,11/12 = \text{Counter-heeling Moment}(CHM\,12) - \text{Heeling Moment}(HM\,11)$$

$$\Delta CHM\,11/12 = F_{CH} \times RC - F_H \times RA$$

$$\Delta CHM\,11/12 = F_{LH}\,\text{cosine}\,\mu \times RC - F_{LD}\,\text{cosine}\,\theta \times RA \qquad \text{Eq. 1H-1}$$

Where a positive value of $\Delta$CHM 11/12 indicates a net increase in counter-heeling moments A further resolution of $\Delta$CHM 11/12 can now be obtained as follows: Referring to FIG. 7b, which is a graphic representation of the angles and dimensions of FIG. 7a, it can be seen that:
cosine $\mu$ = DC/RC
cosine $\theta$ = DA/RA
Then:

$$\Delta CHM\,11/12 = F_{LH}\,\text{cosine}\,\mu \times RC - F_{LD}\,\text{cosine}\,\theta \times RA \qquad \text{Eq. 1H-2}$$

$$= F_{LH} \times DC/RC \times RC - F_{LD} \times DA/RA \times RA$$

$$\Delta CHM\,11/12 = F_{LH} \times DC - F_{LD} \times DA$$

In addition to the above, the following relationship offers a convenient comparison of the controlling counter-heeling moments generated by the CLD and CH hydrofoils when activated by rotation of flaps 11 and 12: A Counter-heeling to Heeling Improvement Ratio (CHIR) contributed by the hydrofoils can be stated as:

$$CHIR\,12/11 = \text{Foil}\,12\,(CHM)/\text{Foil}\,11\,(HM)$$

$$CHIR\,12/11 = F_{LH} \times DC/F_{LD} \times DA$$

$$CHIR\,12/11 = F_{LH}/F_{LD} \times DC/DA \qquad \text{Eq. 1H-3}$$

It can be seen from the above relationship that a designer has a great deal of leverage in countering the heeling forces that act on a sailing vessel by dimensioning DC longer than DA. This embodiment of the present invention also affords the helm significant control of the heeling forces and drift forces, as conditions may dictate. By varying the angle of deflection of flaps 11 and 12, the forces $F_{LH}$ and $F_{LD}$ can be changed to increase or decrease the heeling moment or drift force in response to the needs of the helm. It should be noted that, depending upon the shape of the hull, the ratio of DC to DA will change to some extent as the vessel heels. For any design, the ratio can be determined as soon as the shape of the hull is fixed. Equation 1H-3 also shows that, if desired, in operation this deviation would be readily trimmed out with corrections to $F_{LH}$ and/or $F_{LD}$ made by the helm or by an associated control system. Therefore, for simplification and explanatory purposes herein, this ratio will be assumed to remain constant.

An example using typical parameters readily demonstrates the improvement in effective weight, drift and heeling characteristics made possible by this embodiment of the present invention.

Given the vessel of FIG. 7a, heeling at an angle of 20 degrees, designed with a ratio of DC to DA of 3:1 and making way to windward with flaps 11 and 12 angled such that the CLD hydrofoil generates two times the force of the CH hydrofoil:

The net change in effective weight force ($\Delta$EWF11/12), contributed by the hydrofoils, as depicted in FIG. 7a for this example, can be calculated as follows:

$$\Delta EWF\,11/12 = F_{LD}\sin\phi - F_{LH}\,\text{sine}\,\phi \qquad \text{Eq. 1W-1}$$

where a negative value of $\Delta$EWF 11/12 indicates an increase in effective weight
and given: $F_{LD} = 2\,F_{LH}$
then:

$$\Delta EWF\,11/12 = 2\,F_{LH}\,\text{sine}\,\phi - F_{LH}\,\text{sine}\,\phi = F_{LH}\,\text{sine}\,\phi$$

Thus, for this example, there is a net reduction in effective weight, equal to $F_{LH}$ sine $\phi$.

The drift forces contributed by the two hydrofoils in this example can be obtained by a summarization of the horizontal forces.

Referring to Equation 1D-1 above, the net change in drift forces, $\Delta$LDF 11/12, can be determined as follows:
given: $F_{LD} = 2 \times F_{LH}$ $$\Delta LDF\,11/12 = F_{LD}\text{cosine}\,\phi - F_{LH}\text{cosine}\,\phi \qquad \text{Eq. 1D-1}$$

$$= 2F_{LH}\text{cosine}\,\phi - F_{LH}\text{cosine}\,\phi$$

Therefore: $\Delta$LDF 11/12 = $F_{LH}$ cosine $\phi$

Thus, for this example there is a net reduction in leeward drift forces, equal to $F_{LH}$ cosine $\phi$.

Reference is made to the fact that, unlike heeling, the drift forces affecting the vessel are not a function of moment arms.

Now referring to Equation 1H-2 above, the counter-heeling improvement of foils 11 and 12, $\Delta$CHM 11/12, can be determined as follows:
From:

$$\Delta CHM\ 11/12 = F_{LH} \times DC - F_{LD} \times DA \qquad \text{Eq. 1H-2}$$

and given: $DC = 3 \times DA$
and: $F_{LD} = 2 \times F_{LH}$
Then:

$$\Delta CHM\ 11/12 = F_{LH} \times DC - 2 \times F_{LH} \times DC/3$$

$$\Delta CHM\ 11/12 = \tfrac{1}{3} F_{LH} \times DC$$

Again, in this example, a positive value of $\Delta CHM$ 11/12 indicates a net reduction in heeling moments acting on a sailing vessel, equal to $\tfrac{1}{3} F_{LH} \times DC$.

The above example demonstrates that designs of the present invention, as exemplified by FIG. 7a, can produce a positive counter-leeward drift force while simultaneously producing a positive counter-heeling moment and a net reduction in effective weight.

Further, the resultant counter-heeling moments generated by embodiments of the present invention are able to work independently or in conjunction with counter-heeling moments produced by conventional, new, prior art and other designs including, but not limited to, such that utilize ballast and/or moments produced by the weight of the vessel when the axis of rotation shifts due to heeling.

FIG. 7c shows a typical configuration wherein this embodiment of the present invention joins the ballast on a conventional sailing vessel To portray a simplified analysis of the heeling moments generated by the CLD and CH hydrofoils, in this figure only the forces that relate to heeling are shown and the instant longitudinal axis of rotation is shown to pass through point R. Again, the elements depicted in this figure are not necessarily drawn to scale. A summation of the moments ($\Sigma M$), when the vessel is in equilibrium, can then be made as follows:

$$\Sigma M = F_{SP} \times d_S + F_K \times d_K + F_H \times RA - F_{CH} \times RC - F_W \times d_{BW} = 0 \qquad \text{Eq. 1H-4}$$

Where:

$F_H$ RA, $F_{CH}$ and RC have been previously defined.

$F_{SP}$ is a component of the aerodynamic force generated by the wind on the sails resolved into a plane perpendicular to the course sailed, PPCS.

$d_S$ is the perpendicular distance from the line of action of $F_{SP}$ and the instant longitudinal axis of rotation R of the vessel.

$F_K$ comprises the residual forces acting on the keel, including rudder, hull and like forces but excluding the forces associated with the CLD and CH hydrofoils which are shown separately.

$d_K$ is the perpendicular distance from the line of action of $F_K$ and the instant longitudinal axis of rotation R of the vessel.

$F_W$ is the weight, including ballast 19, of the vessel assumed to be concentrated at the center of gravity (G) of the vessel.

$d_{BW}$ is the perpendicular distance between the lines of action of the weight.

force $F_W$ and the buoyancy force $F_B$.

$F_B$ is the buoyancy force acting on the vessel, equal and opposite to $F_W$.

When added, as shown in FIG. 7c, to a conventional ballasted sailing vessel, this embodiment of the present invention will assist the counter-heeling capabilities of the vessel, such that the vessel will heel less and/or ballast weight can be reduced with a significant improvement in the sailing efficiency of the vessel.

It also can be seen from FIG. 7c that the dimensions $d_{BW}$ is equal to zero when the vessel is not heeling. Therefore, the CLD and CH hydrofoils, flaps, or members of the present invention can provide a resultant counter-heeling moment, even when the vessel is sailing erect. This enables the ideal possibility of tacking a sailing vessel to windward, with heeling moments acting but being counter-acted without heeling the sailing vessel, The design criteria for this invention, including moment arms, hydrofoils, flaps, or members, shapes and sizes, mounting arrangements, control systems and the like can be varied in many combinations at the discretion of designers to simultaneously and significantly improve the heeling and the drift characteristics of sailing vessels. Also, controls for these embodiments, provided for the helmsman, will permit immediate adjustments as demand requires during their operation. By increasing or decreasing the angle of rotation of either the CLD or CH flap, the helmsman can vary the lift force generated by either or both hydrofoils to suit the immediate conditions.

A general description of the operation of the embodiments of the present invention, as depicted in FIG. 7a where the two flaps or hydrofoils are both trailing and rotatable follows. In all cases, the upper hydrofoil is the counter-leeward drift hydrofoil and the lower hydrofoil is the counter-heeling hydrofoil. The former performs its named function by being rotated toward leeward to generate a hydrodynamic force toward windward; this force acts primarily to counter leeward drift forces. At the same time, the latter performs its named function by being rotated toward the windward side of the vessel to generate a hydrodynamic force toward leeward; this force acts primarily to counter heeling moments on the sailing vessel. In these embodiments, each of the flaps can be rotated independently to provide more or less lift. Also, at the designer's discretion, the flaps can be coupled by design to rotate according to a prescribed algorithm. The algorithm can include inputs from the helm, apparent wind speed and wind direction, heeling angle, position (GPS), heading, drift, track, weather, destination and other relative factors, as desired.

Figure 8A:
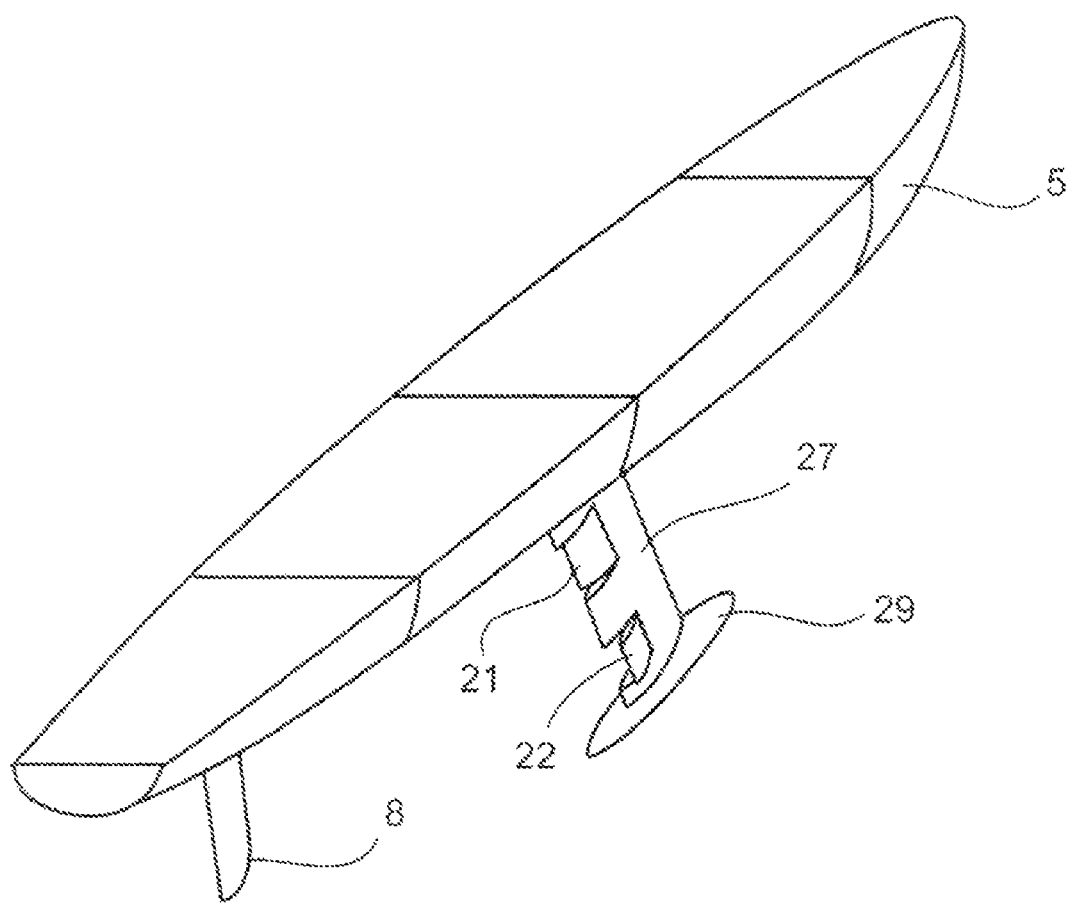
FIG. 8a is an isometric view of another embodiment of the present invention showing counter-leeward drift and counter-heeling flaps on a canting keel sailing vessel.
Figure 8B:
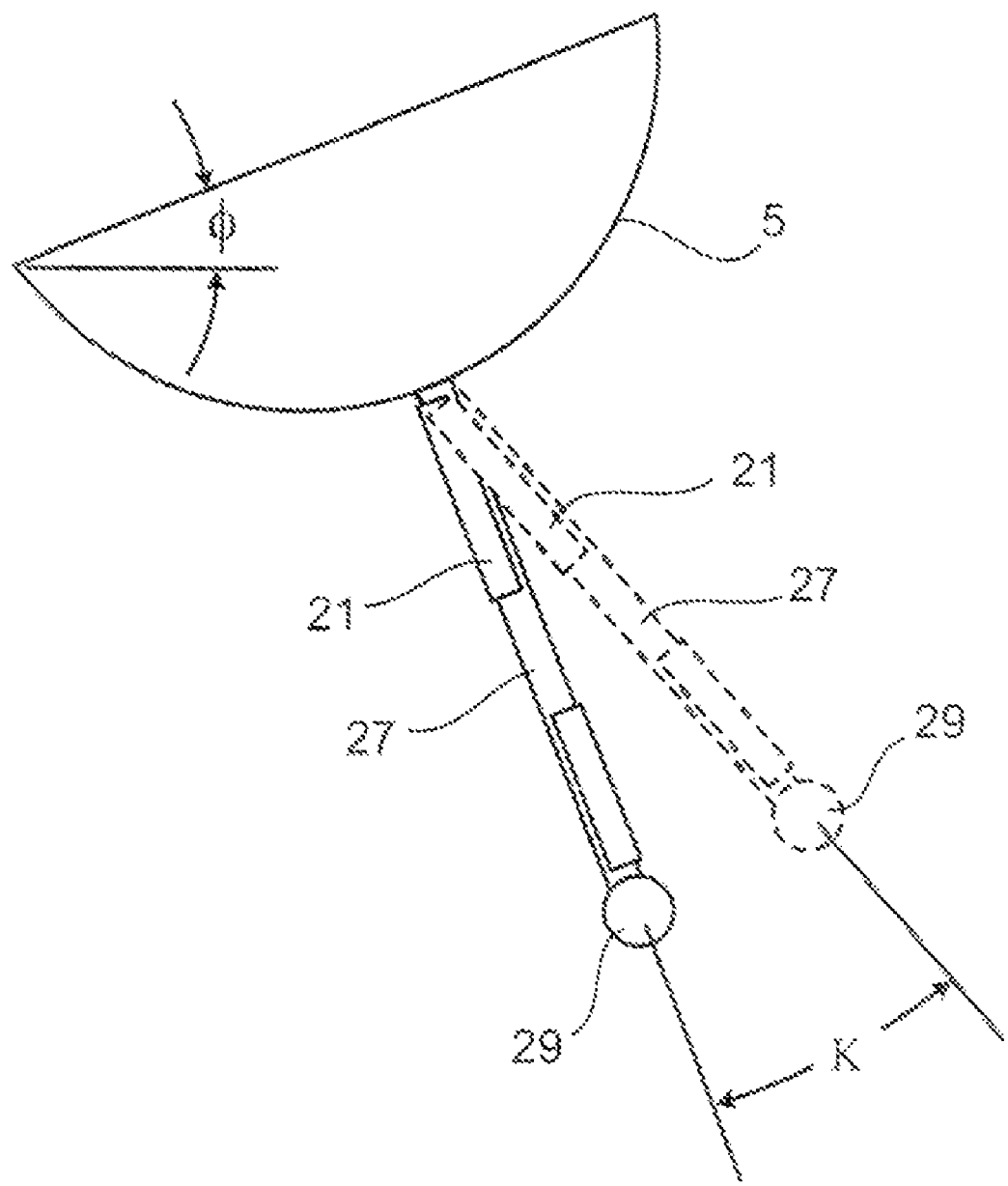
FIG. 8b is a cross-sectional, stern view of the embodiment of the present invention depicted in FIG. 8a, with counter-leeward drift flap 21 and counter-heeling flap 22 affixed to the keel which is shown in both the canted and uncanted positions.

Most important, the twin hydrofoil, keel of the present invention can be used by sailing vessels of virtually every design category. For example, FIGS. 8a and 8b show a sailing vessel as described above but with a canting keel 27, rather than a fixed keel. In this case, counter-leeward drift flap 21 and counter-heeling flap 22, similar to previously described flaps 11 and 12, are mounted on the canting keel 27. As shown in FIG. 8a, both of these flaps are mounted on the keel, reducing or precluding a requirement for additional separate appendages or devices to counter leeward drift forces or heeling moments.

Figure 4:
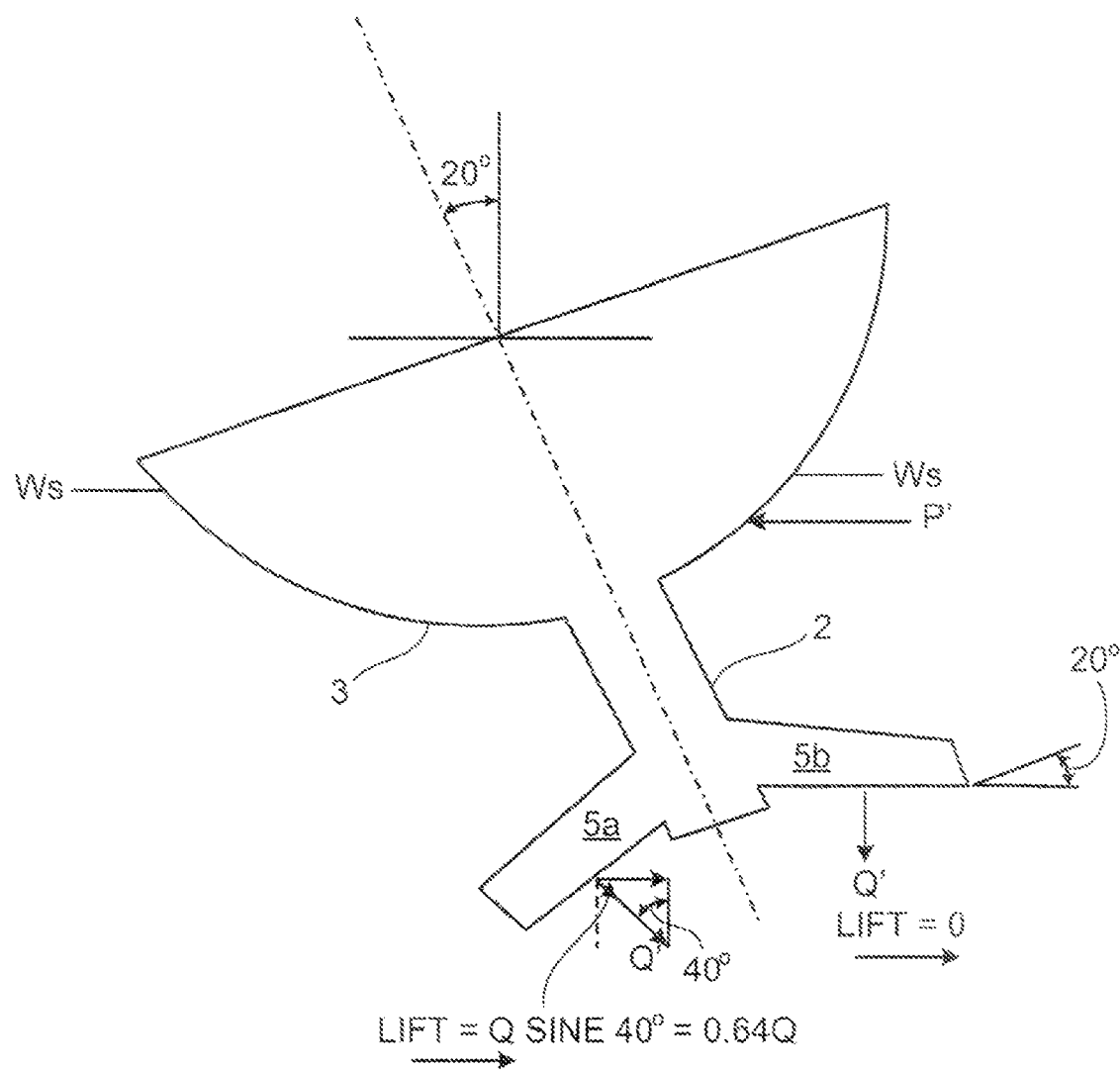
FIG. 4 is a cross sectional view of a sailing yacht on a starboard tack and heeling at an angle of 20 degrees, showing a prior-art winged keel design, which corresponds to FIG. 3 in Australian Patent Application AU-A-85 668/82.

As another example where this embodiment of the present invention is envisaged to be applied, refer to the vessel depicted in FIG. 4 of this application. In such case, a CLD flap can be mounted on the upper portion of the keel 2 and a CH flap can be mounted on the lower portion of the keel 2, either above or below the fins 5a and 5b. The forces generated by the CLD and CH flaps would function to complement the action of fins 5a and 5b.

America's Cup Class (ACC) Rule, Version 5.0, Rule 17.10 states that "The maximum number of movable appendages shall be two." Also, Rule 17.10 (a) states that "movement (of appendages) is limited to rotation only." In order to qualify under these rules, a sailing vessel configured with a rudder can only have one additional rotating appendage. The embodiment of the present invention shown in FIGS. 9a, 9b, 9c and 9d, is intended provide benefits of the present invention and to qualify a sailing vessel for America's Cup Class Rule. Like the designs shown in FIGS. 5 through 8b, the embodiment shown in FIGS. 9a through 9d simultaneously provides both counter-leeward drift forces and counter-heeling moments. As depicted in FIGS. 9a through 9d, only two rotating appendages are utilized on the vessel, a rudder 8 and the assembly 100. Like the winged keel of FIG. 4, with two wings or hydrofoils, configured together as a single unit, assembly 100 is also a single unit configured with two hydrofoils that enable both counter-leeward drift forces and counter heeling moments to be generated.

Figure 9A:
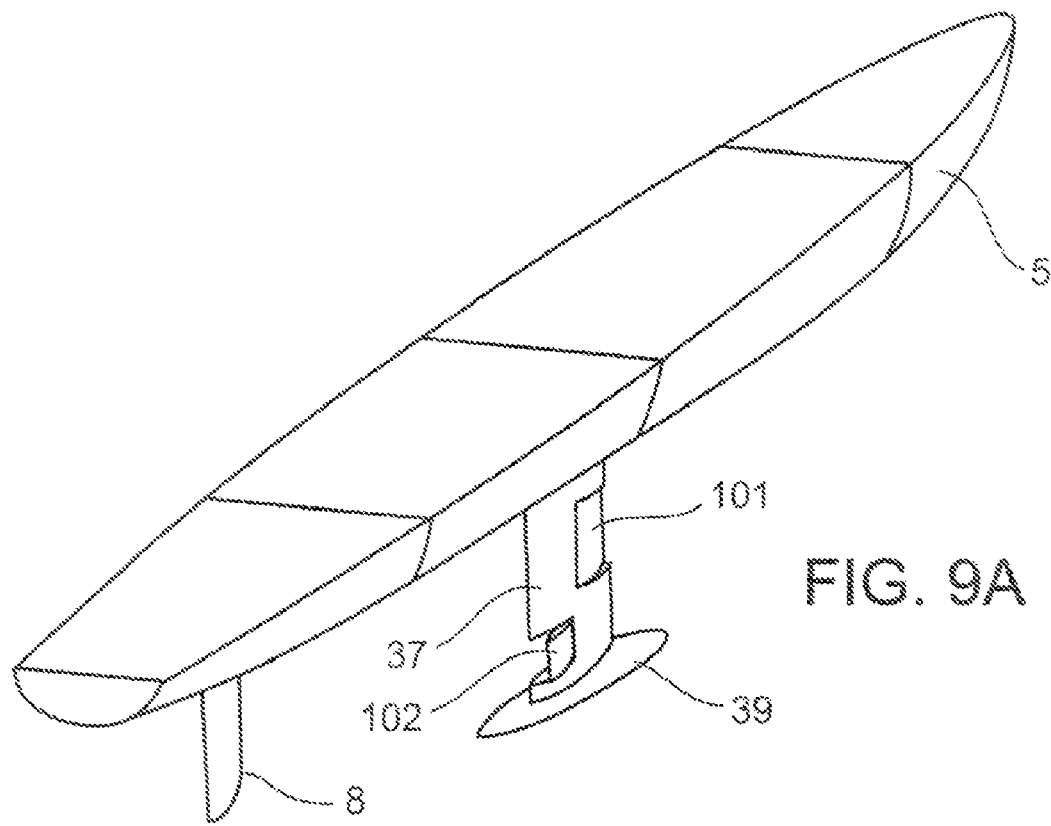
FIG. 9a is an isometric view of another embodiment of the counter-leeward drift and counter-heeling members for of the present invention.
Figure 9B:
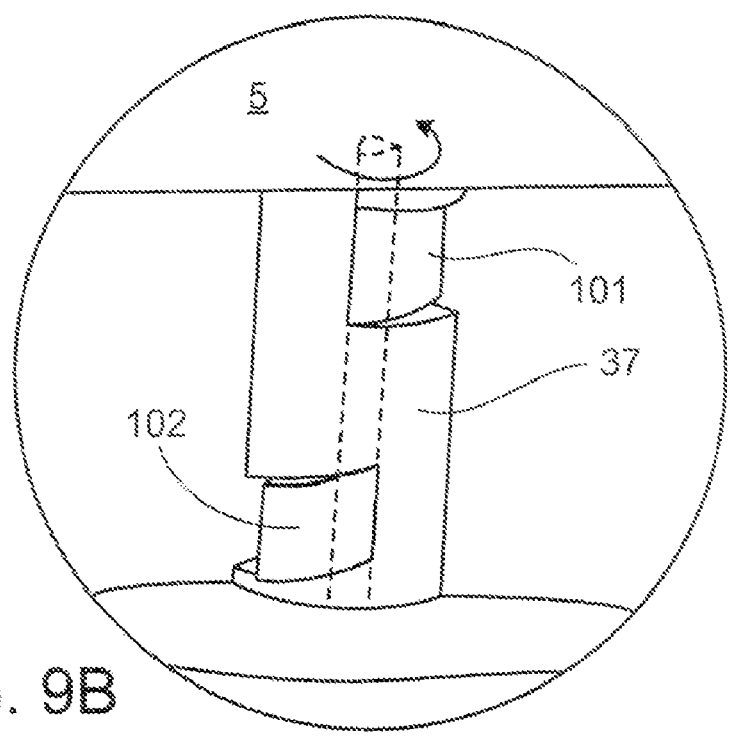
FIG. 9b illustrates the detail of the embodiment of the present invention shown in FIG. 9a showing both an upper, leading hydrofoil member 101 and a lower, trailing hydrofoil member 102 hydrofoil projecting from a common axis mounted within a keel.

FIG. 9a shows a sailing vessel similar in design to the sailing vessel of FIGS. 5 through 7, previously described; however, the counter-leeward drift hydrofoil member 101 and the counter-heeling hydrofoil member 102 are each an integral part of a composite assembly 100 and, in operation, are designed to rotate as a single unit. As seen in FIGS. 9a and 9b, the counter-leeward drift foil 101 is shown projecting from axel 103 toward the leading edge of the keel 37 rather than toward the trailing edge of the keel. Also, the counter heeling foil 102 is shown extending from axel 103 toward the trailing edge of the keel 37. FIG. 9b shows a detailed view of the assembly 100 installed in the keel 37 and rotated in a counter-clockwise direction when viewed from above. In this embodiment, the upper and forward section, 101, of assembly 100 is shaped like and is intended to function, in concert with its neighboring section of keel 37, like a hydrofoil. Since it is located near the top of the assembly, its primary function is intended to provide counter-leeward drift forces. The lower and trailing section 102 of assembly 100 is also shaped like and is intended to function, in concert with its neighboring section of the keel 37, as a hydrofoil. Since it is located near the lower extremity of the keel, its primary function is intended to provide counter heeling moments. If a designer wishes, he can project the upper foil toward the trailing edge and the lower hydrofoil toward the leading edge; they will still move toward opposite sides of the keel when assembly 100 is rotated and this will not change their function. Again, the upper foil is always the Counter-leeward Drift foil and the lower foil is always the Counter-heeling hydrofoil.

Figure 9C:
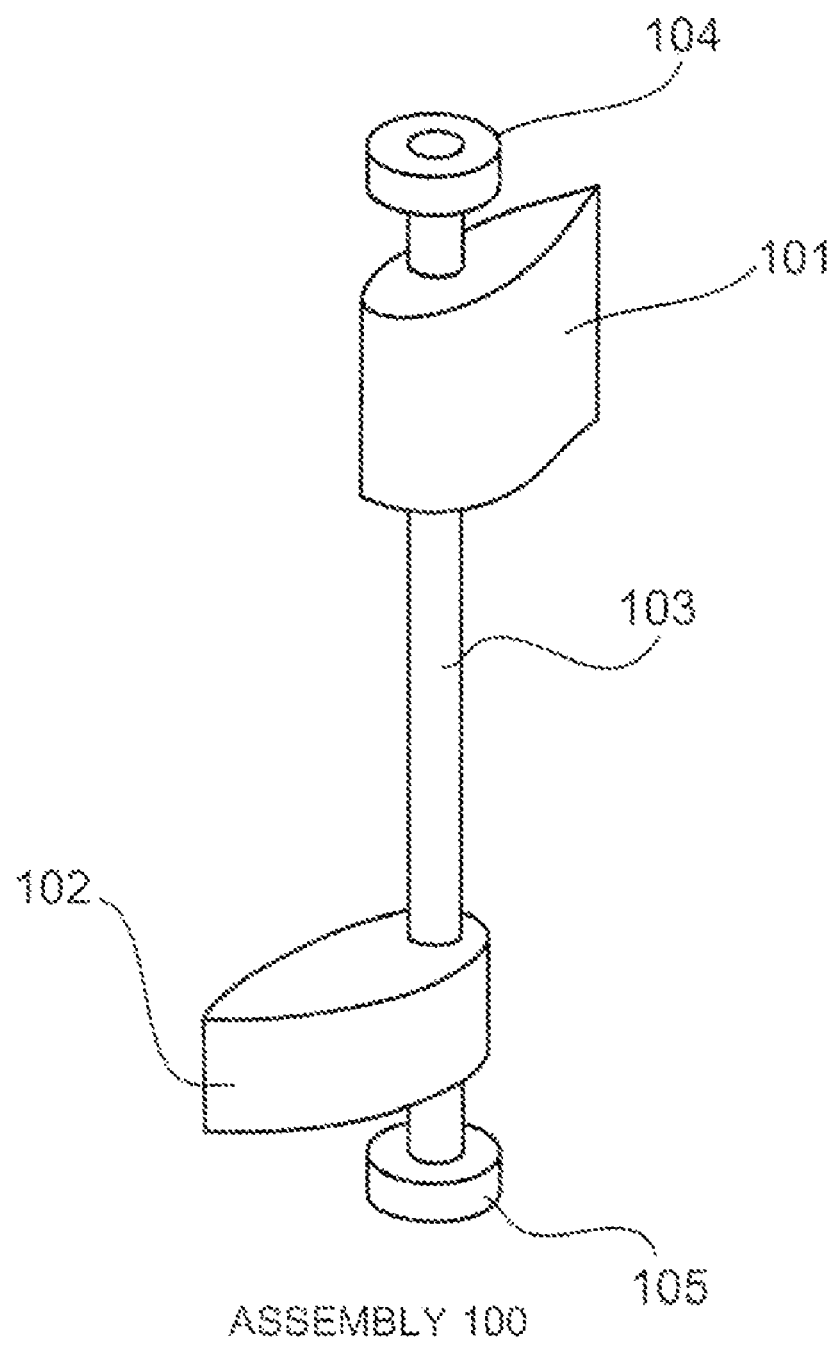
FIG. 9c shows an isometric view of the embodiment of the combined heel and drift control assembly shown in FIG. 9b, detailing the construction of the leading 101 and trailing 102 hydrofoil members incorporated on a common axis.
Figure 9D:
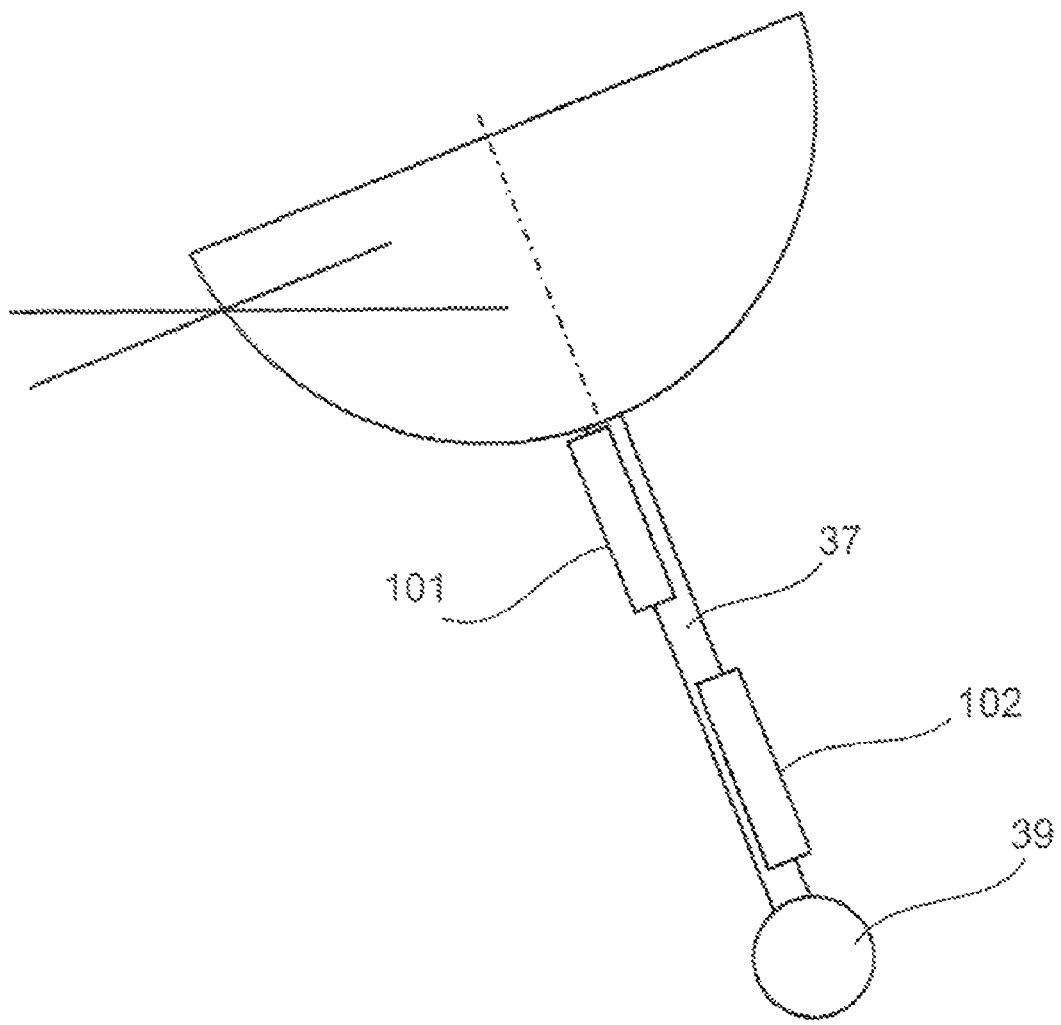
FIG. 9d is a cross-sectional, stern view of the embodiment depicted in FIG. 9a shown on a 20 degree starboard tack.

The components of assembly 100, depicted in FIGS. 9b and 9c, comprise its axel 103 and two hydrofoil members 101 and 102. The assembly 100 is mounted in an upper bearing 104, affixed to the canoe body 5, or proximate to the upper end of the keel 37 and a lower bearing 105 mounted proximate to the lower end of the keel 37 or on the upper surface of the ballast bulb 39. Positioned near the upper end of the axel is a counter-leeward drift hydrofoil member 101, which extends toward the leading edge of the keel 37. Positioned near the lower end of the axel is a counter-heeling hydrofoil member 102, which extends toward the trailing edge of the keel 37. The configuration is such that, as the assembly 100 rotates, the hydrofoil members 101 and 102 move to opposite sides of the keel. FIG. 9d shows a partial schematic, aft view of the vessel heeling at 20 degrees on a starboard tack. In this case, when Assembly 100 rotates counterclockwise, as viewed from above, the upper and forward, counter-leeward drift flap 101 rotates toward the leeward side of keel 37, generating a lift toward the windward side of the keel 37. At the same time, the lower and trailing, counter-heeling flap 102, which also extends from axel (shaft) 103 but to the trailing edge of the keel 37, rotates to the windward side of the keel 37, generating lift toward the leeward side of the keel 37. These two flaps, 101 and 102, are intended to function similarly to the flaps 11, 12, 21 and 22 of FIGS. 5 through 8b, such that their locations on a keel, or similar appendage, positions the lower CH flap at a significantly greater distance from the design longitudinal axis of rotation of the vessel than the upper CLD flap is positioned from the design longitudinal axis of rotation, thus enabling a sailing vessel to counter both leeward drift forces and heeling moments simultaneously. It should be noted here that the two hydrofoils, 101 and 102, do not have to be sized and shaped such that they each provide the same amount of lift. Rather, the lift characteristics can be varied or modified according to the objectives of the sailing vessel designer. In addition, because of this unique design, only one rotating member, Assembly 100, is utilized to create both counter-leeward drift forces and counter-heeling moments. This simplifies the controls and enables designs of high performance sailing vessels that incorporate a rudder and a counter-leeward drift/counter-heeling appendage, exemplified by this embodiment of the present invention, to qualify under ACC Version 5.0, Rules 17.10 and 17.10(a).

Figure 10:
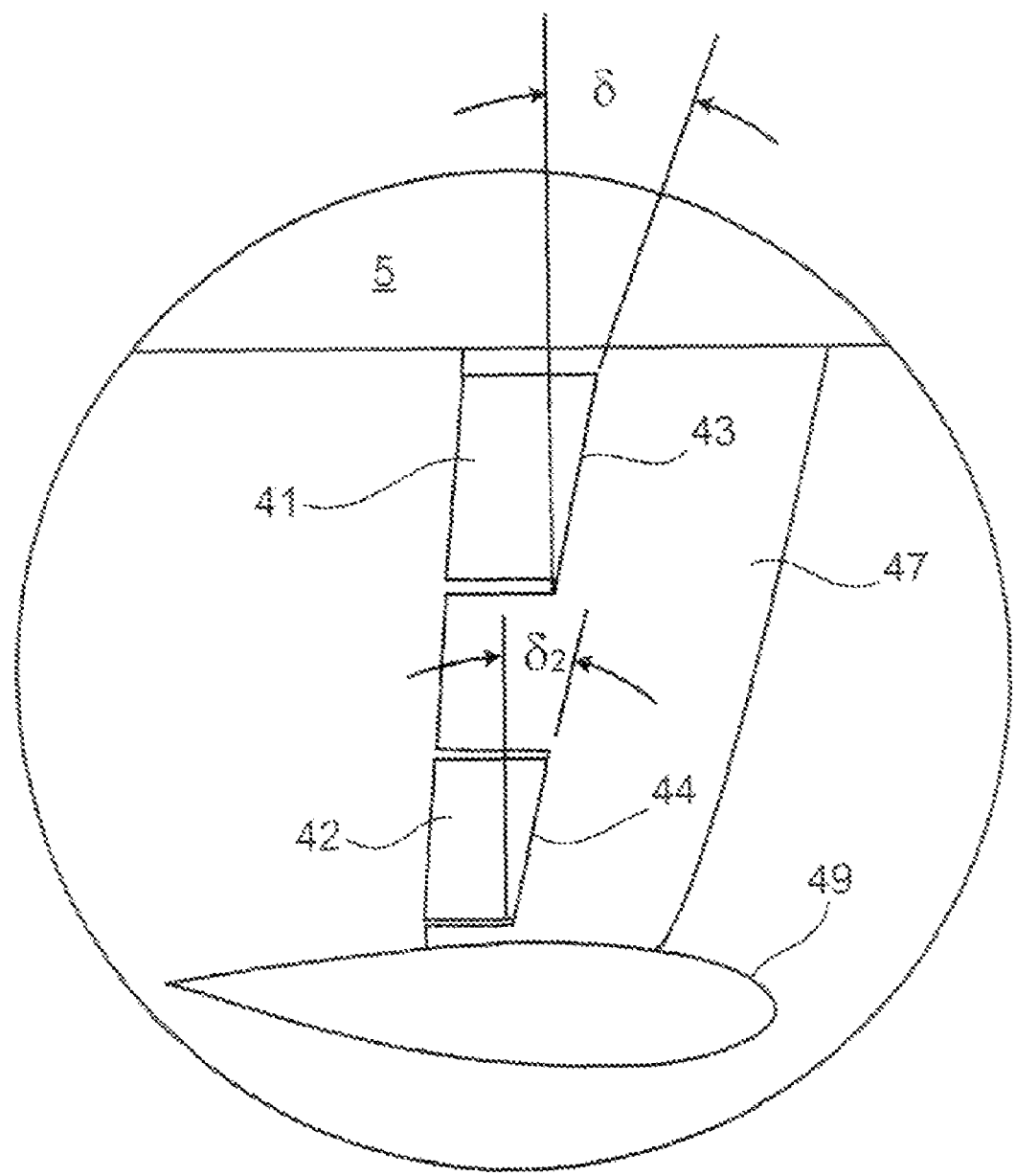
FIG. 10 is a profile view illustrating yet another embodiment of the counter-leeward drift 41 and counter-heeling 42 flaps of the present invention with non-vertical hinges.

FIG. 10 shows a keel appendage 47, which has two flap-type hydrofoils, 41 and 42, mounted on hinges 43 and 44 respectively. This is similar to keel appendage 17 of FIGS. 6a-6b with hydrofoils 11 and 12 mounted on hinges 13 and 14. The significant difference between these two appendages is in the angles of the hinges on each keel 17 or 47 that connect the flaps to the keel. It can be seen in FIGS. 6a, 6b, 6c, 6d and 6e that the axes of the mounting hinges 13 and 14 are essentially within the midplane of the keel and are positioned vertically or, in this case, reasonably parallel to a plane perpendicular to the design longitudinal axis of rotation (reference 15 in FIG. 6d). As shown in FIG. 10, however, the axis of hinges 43 and 44 are raked back from the vertical at an angle, Delta 1 ($\delta_1$) and Delta 2 ($\delta_2$), respectively. If a foil is so mounted, when it is rotated out of the plane of the keel, to either side, as opposed to a foil with a vertical hinge, which generates lift essentially normal to the plane of the keel, it will direct its hydrodynamic force not just out from the plane of the keel, but out and up, such that an upward force component will be generated. Therefore, the utilization of this concept enables the vessel designer to build in an increased amount of upward force for reduced effective weight when the hydrofoils are rotated. The more that the angles $\delta_1$ and $\delta_2$ are raked back from the vertical the greater that upward component will be. This component will be at the expense of the net counter-leeward drift and counter-heeling forces, but it enables the vessel designer to modify or balance these forces to achieve his desired sailing characteristics. It follows that the opposite effect can be achieved in either or both flaps by angling the hinge(s) on either or both flaps in the opposite direction, that is, a forward rake from the vertical. In this case, the force of the hydrofoil will be directed in a more downward direction. This will increase the effective weight force and benefit both the counter-leeward drift characteristics and the counter-heeling moments. The present invention envisages designs that may utilize either the same, different or variable values for the angles $\delta_1$ and $\delta_2$ and either may be in a forward or aft raked direction.

Ideally, the CLD flap or hydrofoil will be located high on the keel appendage, as close to the root as efficiency will allow. This will position its center of effective effort close to the design longitudinal axis of rotation (FIGS. 6d and 6e, reference 10) which will minimize its contribution to the heeling moments on the vessel. Complimenting this concept, the CH flap or hydrofoil will be located as close to the lower or tip end of the keel or appendage as efficiency will allow. This will position its center of effort at the maximum effective distance from the design longitudinal axis of rotation which will maximize its contribution to the counter-heeling moments on the vessel. Reference is made to FIG. 6d wherein the hinge 13 of CLD flap 11 and the hinge 14 of CH flap 12 are shown to be located essentially within the midplane (FIG. 6e, reference 16) of the keel or appendage. Now, again referring to FIG. 10, wherein the positioning of the hinges is further defined, the CLD flap is referenced as 41 mounted on hinge 43 and the CH flap is referenced as 42 mounted on hinge 44.

While still located essentially within the midplane of the keel, hinges 43 and 44 are shown at respective angles $\delta_1$ and $\delta_2$ which are oriented at less than ninety (90) degrees, fore or aft, to a lateral plane (FIG. 6d, reference 15) perpendicular to the design longitudinal axis of rotation of the vessel. Lateral plane 15 in FIG. 6d may also be defined as the vertical plane that is perpendicular to the midplane 16 of appendage or keel 17.

It should be noted that the present invention also envisages embodiments where (1) the flaps have hinges with fixed alignments and (2) the flaps have hinges where the alignment of the hinges is adjustable.

Figure 11A:
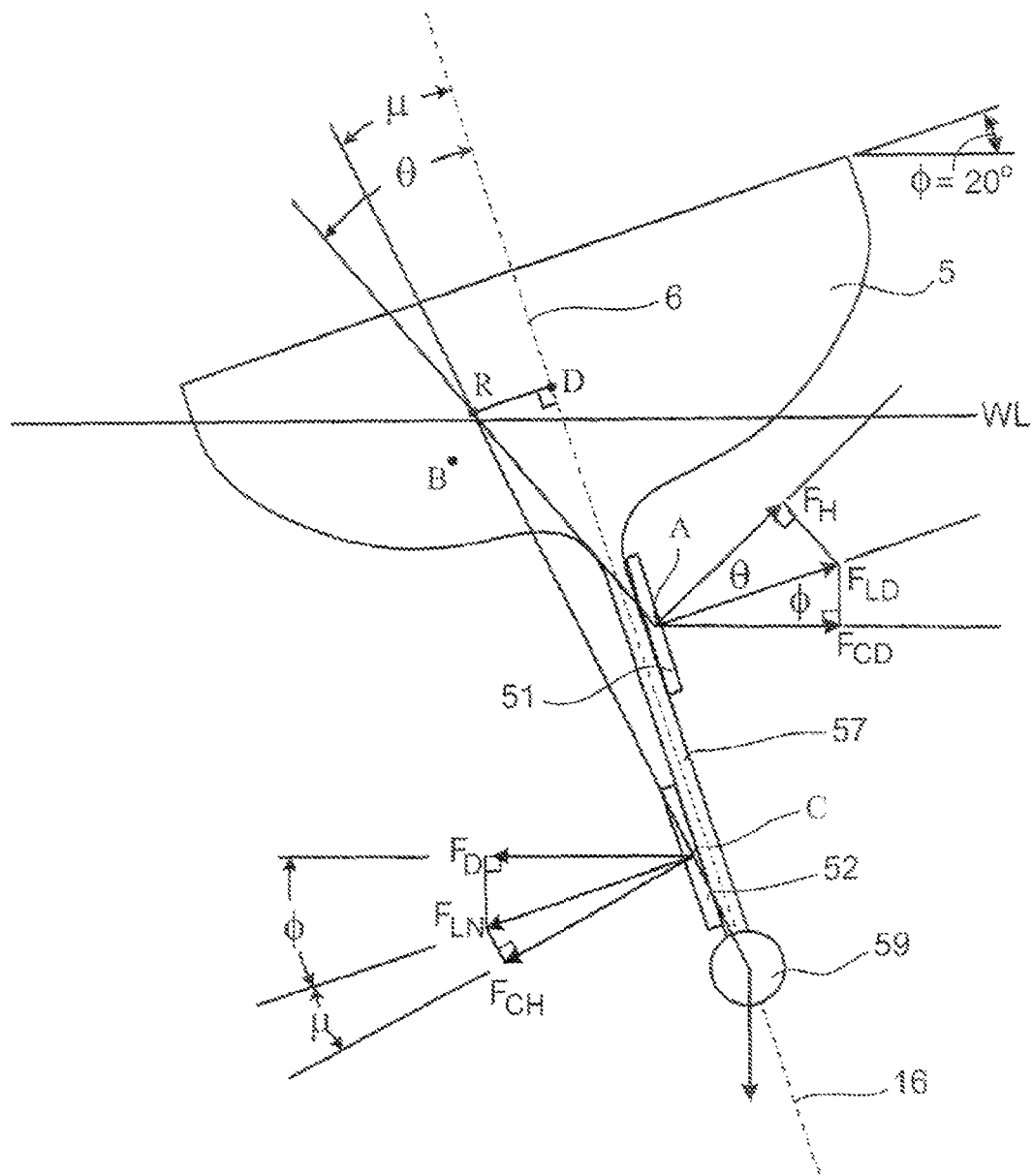
FIG. 11a is a cross-sectional stern view, perpendicular to the course sailed, PPCS, of still another embodiment of the present invention, depicting two vertically slidable hydrofoils 51 and 52.
Figure 11B:
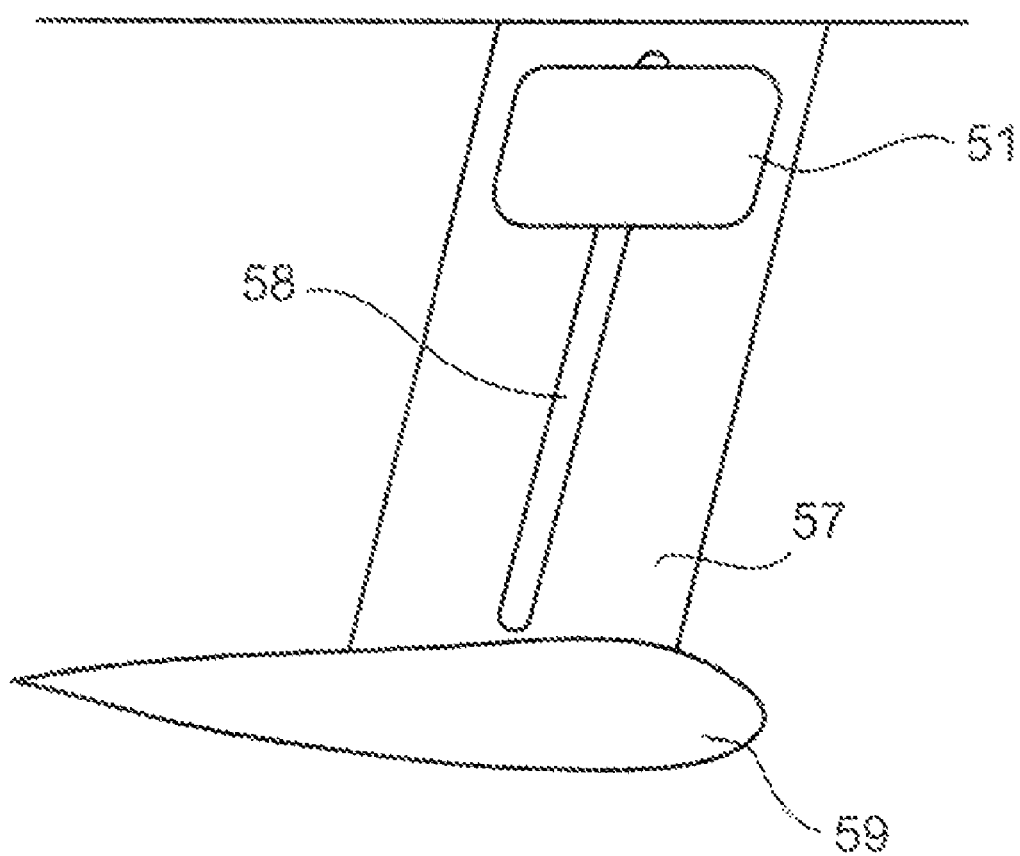
FIG. 11b is a profile view illustrating one of the slidable hydrofoils from the embodiment of FIG. 11a and an embodiment of the hydrofoil slide track or slot 58.

Another embodiment of the present invention is shown in FIG. 11a. FIG. 11a shows a stern view, in a plane perpendicular to the course sailed, of a sailing vessel heeling at 20 degrees on a starboard tack; that is the starboard side of the vessel is to windward. Attached to the keel 57 are two hydrofoils that are made as mirror images of each other, a starboard-side hydrofoil 51 and a port-side hydrofoil 52. As seen in FIG. 11b, the keel includes tracks 58, one on each side of the keel. These tracks may run (i) parallel to the keel leading edge, as shown (ii) parallel to the keel trailing edge or (iii) along any other substantially vertical line. The tracks permit the hydrofoils to be slid, by suitable means, to the top position on the keel 57 or to the bottom position on the keel 57, as desired by the helm. It is intended that that the hydrofoil on the leeward side be positioned at the lowest point on the keel with its cambered surface and thus its hydrodynamic force being directed generally in a leeward direction and the hydrofoil on the windward side be positioned at the highest point on the keel with its cambered surface and thus its hydrodynamic force being directed generally in a windward direction. When the tack of the vessel is reversed, the positions of the hydrofoils will also be reversed. When running before the wind they can be positioned opposite to each other at any convenient position on the keel.

In order to generate the maximum counter-heeling moment on the sailing vessel, the hydrofoil 52 on the leeward side of the keel 57 is moved to the bottom position near the tip of the keel, as shown in FIG. 11a, where it will generate a hydrodynamic force generally toward the leeward side of the sailing vessel. A component of that leeward force, resolved into a vertical plane, perpendicular to the course sailed (PPCS), is shown as lift force $F_{LH}$. In turn, $F_{LH}$ has a component $F_{CH}$, also acting in the plane perpendicular to the course sailed, that is equal to $F_{LH} \cos \mu$ that contributes to the counter-heeling moments acting on the vessel. $F_{CH}$ acts at the point of effective effort C in a direction perpendicular to the lever arm RC. Lever arm RC is the distance between the point of effective effort, C, and the instant longitudinal axis of rotation, taken to be at point R of the vessel. Angle $\mu$ is the angle included within RC and the midplane of the keel 57. Since $F_{CH}$ acts at right angles to RC, it exerts a counter-heeling moment of $F_{CH} \times RC$ or $F_{LH} \cos \mu \times RC$. At the same time, $F_D$, the horizontal component of $F_{LH}$, adds to the leeward drift forces acting on the sailing vessel. $F_D$ is equal to $F_{LH} \cos \phi$, where $\phi$ is the heeling angle.

Concurrently, on the windward side of the keel 57, the hydrofoil 51 is moved to the top position near the root of the keel, as shown in FIG. 11a, where it will generate a hydrodynamic force, generally toward the windward side of the sailing vessel. A component of that windward force, resolved into a vertical plane, perpendicular to the course sailed (PPCS), is shown as lift force $F_{LD}$. In turn, $F_{LD}$ has a horizontal component $F_{CD}$ which acts at the center of effort A and is equal to $F_{LD} \cos \phi$, also acting in a plane perpendicular to the course sailed (PPCS), and is the resulting counter-leeward drift force $F_{CD}$ exerted by CLD hydrofoil 51. This horizontal component, $F_{CD}$, will counter leeward drift forces acting on the vessel.

Another component of force $F_{LD}$ contributes to the heeling moments acting on the vessel. This force component, $F_H$ also acting in a plane perpendicular to the course sailed (PPCS), is equal to $F_{LD} \cos \theta$ and acts at the center of effort A in a direction perpendicular to the lever arm RA. Lever arm RA is the distance from the center of effort A to the instant longitudinal axis of rotation R of the vessel. Angle $\theta$ is the angle included between RA and the midplane of the keel 57. Since $F_H$ acts at right angles to RA, it exerts a heeling moment of $F_H \times RA$ or $F_{LD} \cos \theta \times RA$.

Referring to FIG. 11a, an analysis of the downward or effective weight forces, drift forces and heeling moments discussed above more clearly shows how the efficiency of a sailing vessel can be improved by this embodiment of the present invention.

The net change in effective weight force contributed by hydrofoils 51 and 52 ($\Delta$EWF 51/52) of the vessel as depicted in FIG. 11a can be calculated as follows:

$$\Delta EWF\ 51/52 = F_{LD} \sin\phi - F_{LH} \sin\phi \qquad \text{Eq. 2W-1}$$

where a negative value of $\Delta$EWF 51/52 indicates an increase in effective weight.

Since hydrofoils 51 and 52 are intended to be mirror images of each other, for purposes of this example, without considering leeward drift, it can be assumed that $F_{LD} = F_{LH}$.

then: $\Delta$EWF 51/52=0

While essentially no increase in effective weight force is incurred by this embodiment of the present invention, it is evident that a significant decrease in effective weight is obtained by a reduction of the heeling angle, provided by this embodiment of the present invention, which proportionally reduces the downward component of the wind force exerted by the sails on the vessel. On a sailing vessel not so equipped, it is necessary to direct the vessel at a greater leeward angle to counter the downward component of the wind force on the sails. This however, points the vessel at an increased angle from the course sailed and increases the drag on the vessel.

A summation of the drift forces contributed by hydrofoils, 51 and 52, as shown in FIG. 11a is as follows:

Delta Leeward Drift Force of foils 51 and 52 ($\Delta$LDF 51/52):

$$\Delta LDF\ 51/52 = F_{CD} - F_D$$

$$\Delta LDF\ 51/52 = F_{LD} \cosine\phi - F_{LH} \cosine\phi \qquad \text{Eq. 2D-1}$$

Where

A positive value of $\Delta$LDF 51/52 indicates a net increase in counter-leeward drift forces.

$F_{LD}$ is a lift component of the hydrodynamic force of foil 51, resolved into a plane perpendicular to the course sailed, PPCS.

$F_{LH}$ is a lift component of the hydrodynamic force of foil 52, resolved into a plane perpendicular to the course sailed, PPCS.

$F_{CD}$ is the horizontal counter-leeward drift force component of $F_{LD}$, also acting in the plane perpendicular to the course sailed, PPCS.

$F_D$ is the horizontal leeward drift force component of $F_{LH}$ also acting in the plane perpendicular to the course sailed, PPCS.

Phi ($\phi$) is the heeling angle of the vessel.

and given: $F_{LD} = F_{LH}$ then:

$\Delta LDF\ 51/52 = F_{LH} \text{cosine } \phi - F_{LH} \text{cosine } \phi = 0$ Thus, the leeward drift force that is added by the lower hydrofoil 52 is cancelled by the counter-leeward drift force generated by the upper hydrofoil 51.

A summation of the heeling moments contributed by hydrofoils, 51 and 52, is as follows:

Heeling Moment of Hydrofoil 51 (HM 51):

$HM\ 51 = F_H \times RA = F_{LD} \text{cosine } \theta \times RA$

Where:
R is the instant longitudinal axis of rotation of the vessel.
A is the center of effort of the upper hydrofoil 51.
RA is the lever arm distance between points A and R.
Theta ($\theta$) is the angle between RA and the midplane of the keel 57.
$F_{LD}$ is a lift component of the hydrodynamic force of foil 51, resolved into a plane perpendicular to the course sailed (PPSC).
$F_H$ is that component of force $F_{LD}$ directed at right angles to lever arm RA also acting in the plane perpendicular to the course sailed (PPSC).

The counter-heeling moment generated by hydrofoil 52 is:

Counter-heeling Moment of Hydrofoil 52 (CHM 52):

$CHM\ 52 = F_{CH} \times RC = F_{LH} \text{cosine } \mu \times RC$

Where:
R is the instant longitudinal axis of rotation of the vessel
C is the center of effort of the lower hydrofoil 52
RC is the lever arm distance between points R and C
Mu ($\mu$) is the angle between BC and the midplane of the keel 57.
$F_{LH}$ is a lift component of the hydrodynamic force of foil 52, resolved into a plane perpendicular to the course sailed (PPSC).
$F_{CH}$ is that component of force $F_{LH}$ directed at right angles to lever arm RC also acting in the plane perpendicular to the course sailed (PPSC).

Delta ($\Delta$) of the Counter-heeling Moments of Foils 51 and 52 ($\Delta$CHM 51/52):

$\Delta CHM\ 51/52 = CHM\ 52 - HM51$ $\Delta CHM\ 51/52 = F_{CH} \times RC - F_H \times RA$ $\Delta CHM\ 51/52 = F_{LH} \text{cosine } \mu \times RC - F_{LD} \text{cosine } \theta \times RA$     Eq. 2H-1

Where a positive value of $\Delta$CHM 51/52 indicates a net increase in counter-heeling moments A further resolution can now be obtained as follows:

Referring to FIG. 7b, which is a graphic representation of the angles and dimensions of FIGS. 7a, and 11a, it can be seen that:
cosine $\mu$ = DC/RC
cosine $\theta$ = DA/RA and since:

$\Delta CHM\ 51/52 = F_{LH} \text{cosine } \mu \times RC - F_{LD} \text{cosine } \theta \times RA$ $\Delta CHM\ 51/52 = F_{LH} \times DC/RC \times RC - F_{LD} \times DA/RA \times RA$ $\Delta CHM\ 51/52 = F_{LH} \times DC - F_{LD} \times DA$     Eq. 2H-2 and given: $F_{LH} = F_{LD}$ $\Delta CHM\ 51/52 = F_{LH}(DC - DA)$

It is well to note here that by increasing the ratio of DC to DA, a designer will be able to increase the counter heeling moments without affecting leeward drift or effective weight forces and also have the flexibility to compensate for any difference anticipated between $F_{LH}$ and $F_{LD}$ caused by sailing at a leeward angle.

In addition to the above, the following relationship offers a convenient comparison of the controlling counter-heeling factors offered by foils 52 and 51: A Counter-heeling to Heeling Improvement Ratio (CHIR 52/51) contributed by foils 52 and 51 can be stated as:

$CHIR52/51 = \text{Foil } 52(CHM)/\text{Foil } 51(HM)$ $CHIR52/51 = F_{LH} \times DC/F_{LD} \times DA$ $CHIR52/51 = F_{LH}/F_{LD} \times DC/DA$     Eq. 2H-3 and given: $F_{LH} = F_{LD}$ $CHIR52/51 = DC/DA$

As discussed earlier, prior art designs that are intended to counter heeling moments, do so, but at the expense of adding leeward drift forces. The embodiment of this invention shown in FIG. 11a creates a counter-heeling moment without an increase in leeward drift forces. As shown above, it can be seen that by designing the two hydrofoils as mirror images of each other, the horizontal components of their lifting forces are equal but opposite and therefore the additive drift force of the lower, counter heeling foil is cancelled by the opposing drift force of the upper, counter-leeward drift foil; also, since the hydrodynamic forces of the two hydrofoils are equal and the lever arm of the lower, counter-heeling hydrofoil is greater than the lever arm of the upper counter-leeward drift hydrofoil, there will be a positive net counter-heeling moment improvement produced by these two hydrofoils equal to the ratio of DC to DA.

Figure 11C:
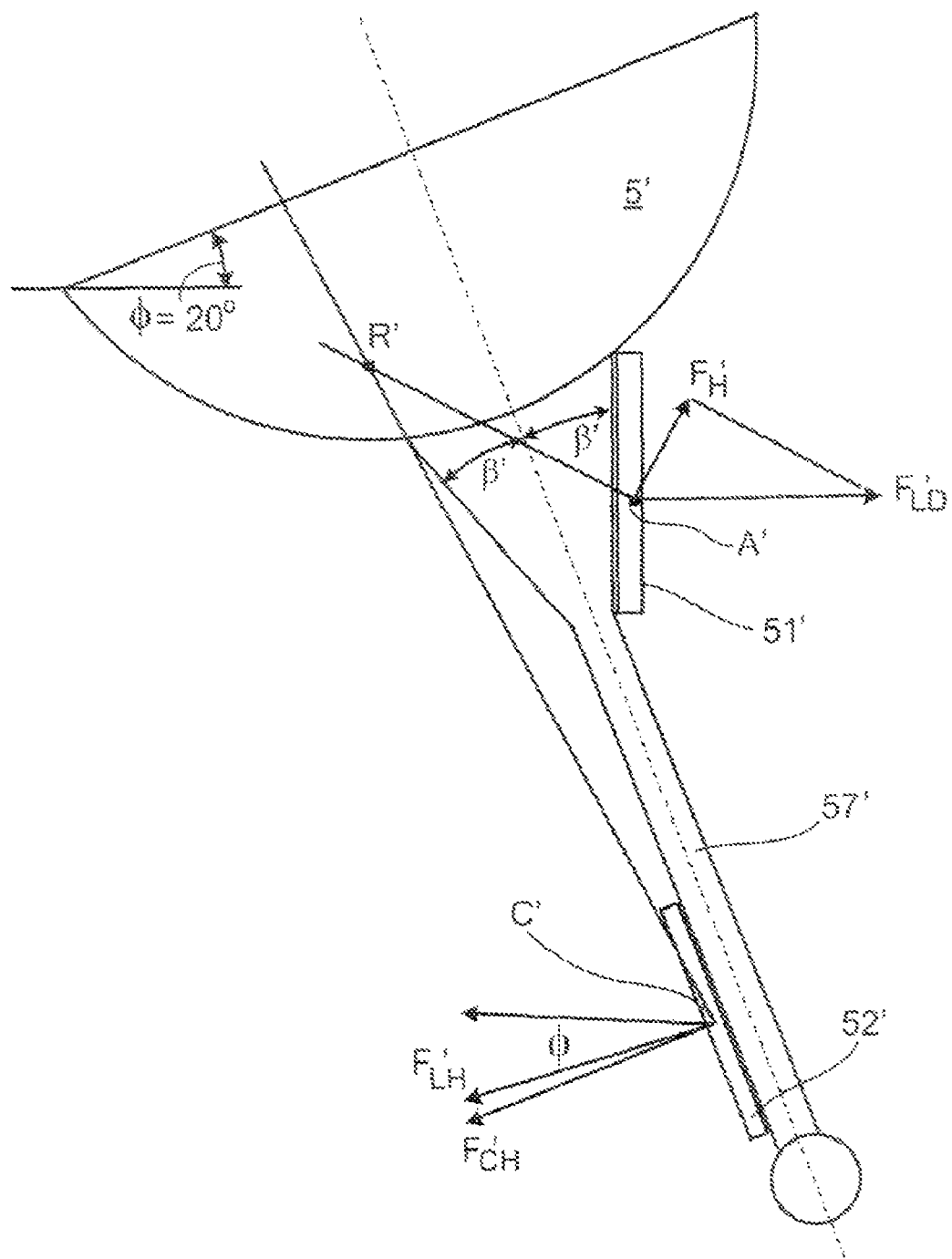
FIG. 11c is a cross-sectional stern view, perpendicular to the course sailed, PPCS, of still another embodiment of the present invention, depicting two vertically slidable hydrofoils mounted on angled tracks. The tracks are in a plane essentially parallel to the midplane of the keel through most of the lower portion of the keel, 57, but angle out from the midplane of the keel when they reach their uppermost positions.

FIG. 11c, which is a stern view, in a plane perpendicular to the course sailed (PPCS), depicts a variation in the lateral direction of the tracks of hydrofoils 51 and 52 which are shown here as 51' and 52' respectively.

In this variation the two tracks of hydrofoils 51' and 52' are in planes essentially vertical and parallel to the midplane of the keel 57' for most of their travel in the lower portion of the keel, 57', but angle away from the midplane of the keel 57' when they reach their uppermost positions where they function as CLD hydrofoils. This variation is intended to park each hydrofoil, when it is in the uppermost position, with its cambered surface facing somewhat down from parallel to the plane of the keel. This will then direct the hydrodynamic force of the upper, counter-leeward drift foil down, to a degree equal to the angle of $\beta'$ from a direction perpendicular to the midplane of the keel 57'. It can be seen by analyzing the force vectors of the upper hydrofoil that such a modification will not only increase the counter-leeward drift force when the vessel is heeling but will also reduce the heeling moment contributed by that foil.

Such an analysis will show a benefit to hydrofoil 51' and/or 52', when located in the uppermost CLD position, comparable to the benefit that the angle $\beta$ contributes to hydrofoil 61 and/or 62 respectively depicted in FIG. 12 and analyzed hereinafter.

Although the results obtained from utilizing the embodiment of the present invention described in FIG. 11a will satisfy a great many design objectives, a modification of that embodiment will permit designers to vary the relative effect that these hydrofoils have on each of the interrelated characteristics of counter-leeward drift force, counter-heeling moment and effective weight. Such a modification accomplishes this by changing the direction of the forces generated at the surfaces of the hydrofoils. This is depicted in FIG. 12a, and is presented below.

Figure 12A:
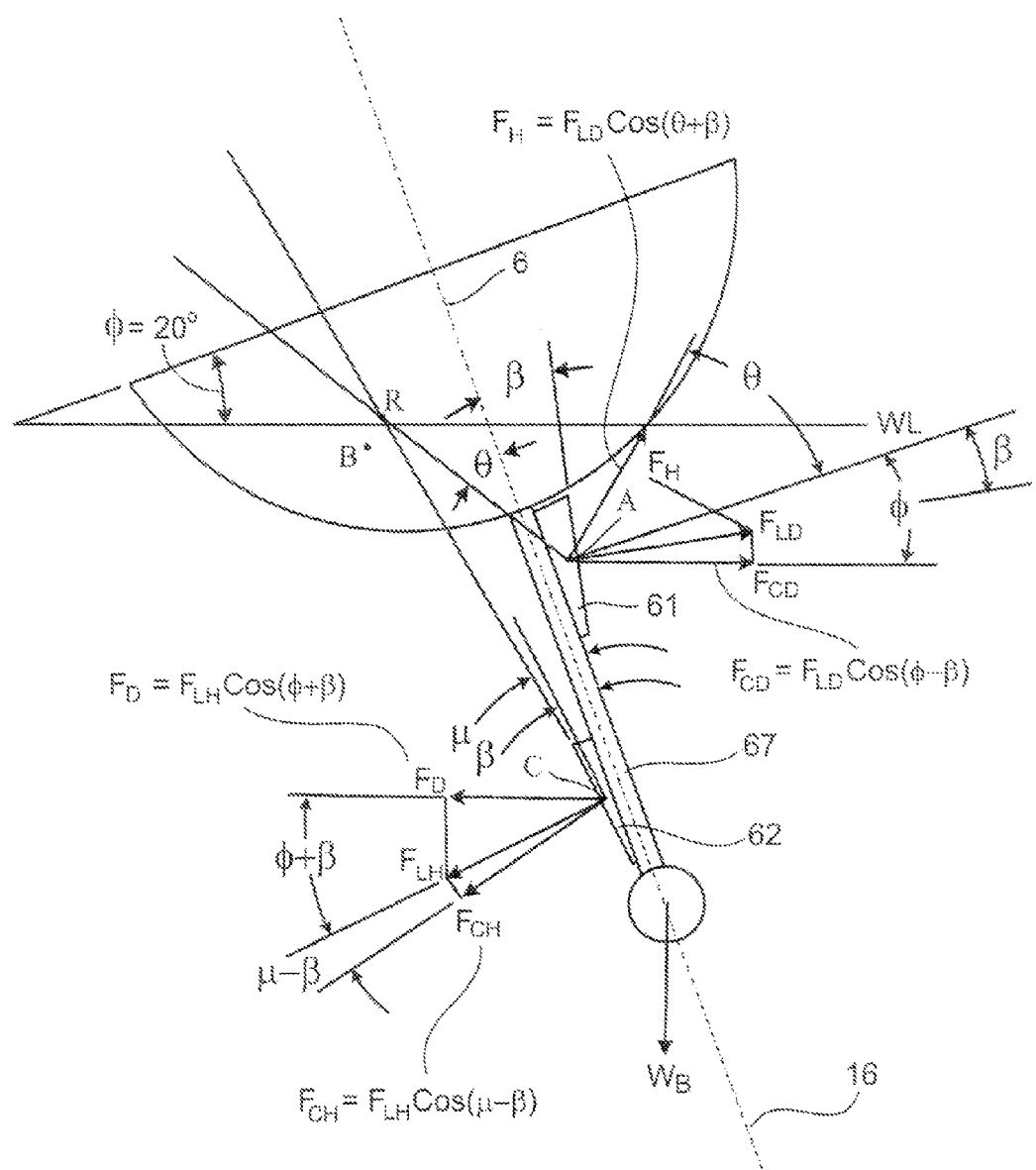
FIG. 12a is a cross-sectional stern view, perpendicular to the course sailed, PPCS, of another embodiment of the present invention, including two vertically slidable, angled cross-section hydrofoils 61 and 62.

An analysis treated hereinafter relating to FIG. 12a depicts sliding hydrofoils which are fashioned with their cambered surfaces positioned at an angle β to the midplane of the keel. It will be shown, for example in FIG. 13, that the counter-heeling, counter-leeward drift and effective weight characteristics can be modified to significantly improve the efficiency of a sailing vessel by changing the angle β. It is also apparent that designs of the embodiment depicted in FIG. 10 may utilize different values for each of angles $\delta_1$ and $\delta_2$ depending upon the objectives. However, if both of these angles were made comparable to the angle β of FIG. 12a, the results would be analogous.

FIG. 12a shows a stern view perpendicular to the course sailed of a sailing vessel heeling at 20 degrees on a starboard tack Attached to the keel 67 are two hydrofoils that are made as mirror images of each other, a starboard-side hydrofoil 61 and a port-side hydrofoil 62. Essentially, these hydrofoils are designed, mounted and function similar to the hydrofoils shown in FIG. 11a but with one significant distinction. Referring to FIG. 11a, it can be seen that the cambered surface of each hydrofoil, 51 and 52 is parallel to the midplane of the keel, whereas FIG. 12a shows that the plane of the cambered surface of the starboard side hydrofoil 61 is fixed at an angle β rotated clockwise from the midplane of the keel and the cambered surface of the port side hydrofoil 62 is fixed at an equal angle β rotated counter-clockwise from the midplane of the keel. This positioning, or angling, changes the direction of the forces generated by the hydrofoils relative to the degree that they are angled. It will be seen from the following analysis that a change in the direction of these forces can have a broad effect on the resultant heeling moments, leeward drift forces, and downward acting forces that affect the efficiency of a sailing vessel. Thus, by selecting an appropriate angle β, a designer will be able to change the relationship between these characteristics to obtain results that are closest to his design objectives.

An analysis of the effect that the angle β, shown in FIG. 12a, will have on the resultant downward force or effective weight, counter-leeward drift, and counter-heeling moment characteristics produced by the hydrofoils will demonstrate the interrelationship between these parameters. To simplify the following analysis and since the leeward angle sailed is minimized by the counter-leeward drift forces of the present invention, any effect that the leeward angle has on the hydrodynamic forces is not considered. Further, the analysis reveals how designers may favor specific functions by angling the hydrofoils to increase the efficiency of a sailing vessel or advance certain design objectives.

The net change in effective weight force contributed by hydrofoils 61 and 62 (ΔEWF 61/62) of the vessel as depicted in FIG. 12a can be calculated as follows:

$$\Delta EWF\ 61/62 = F_{LD}\sin(\phi-\beta) - F_{LH}\sin(\phi+\beta) \qquad \text{Eq. 3W-1}$$

Where a negative value of ΔEWF 61/62 indicates an increase in effective weight $F_{LD}$ is a lift component of the force of the windward hydrofoil 61 resolved into a plane that is perpendicular to the course sailed (PPCS).

$F_{LH}$ is a lift component of the force of the leeward hydrofoil 62 resolved into a vertical plane that is perpendicular to the course sailed (PPCS).

Phi (φ) is the heeling angle of the vessel.

Beta (β) is the angle that the cambered surface of either hydrofoil is rotated away from the midplane of the keel. As viewed from the stern, the cambered surface of the starboard side hydrofoil 61 is rotated clockwise from the midplane of the keel and the cambered surface of the port side hydrofoil 62 is rotated counter-clockwise from the midplane of the keel.

and given: $F_{LD} = F_{LH}$ then: $\Delta EWF\ 61/62 = F_{LH}[\sin(\phi-\beta) - \sin(\phi+\beta)]$ For convenience in graphically representing the characteristic of ΔEWF 61/62, the term $[\sin(\phi-\beta) - \sin(\phi+\beta)]$ can be called the effective weight factor (EWf 61/62). Then, as will also be presented in FIG. 13:

$$EWf61/62 = [\sin(\phi-\beta) - \sin(\phi+\beta)]$$

When a vessel is heeling on a starboard tack, as shown in FIG. 12a, the contributions to the drift forces contributed by hydrofoils 61 and 62 are determined as follows:

Delta Leeward Drift Force of foils 61 and 62 (ΔLDF 61/62):

$$\Delta LDF61/62 = F_{CD} - F_D$$

$$\Delta LDF61/62 = F_{LD}\cos(\phi-\beta) - F_{LH}\cos(\phi+\beta) \qquad \text{Eq. 3D-1}$$

Where:

A positive value of ΔLDF 61/62 indicates a net increase in counter-drift forces.

$F_{LD}$ is a lift component of the force of the windward hydrofoil 61 resolved into a plane that is perpendicular to the course sailed (PPCS).

$F_{LH}$ is a lift component of the force of the leeward hydrofoil 62 resolved into a plane that is perpendicular to the course sailed (PPCS).

$F_{CD}$ is the horizontal counter-leeward drift force component of $F_{LD}$, also acting in the plane perpendicular to the course sailed.

$F_D$ is the horizontal leeward drift force component of $F_{LH}$, also acting in the plane perpendicular to the course sailed.

Phi (φ) is the heeling angle of the vessel.

Beta (β) is the angle that cambered surface of either hydrofoil is rotated away from the midplane of the keel. As viewed from the stern, the cambered surface of the starboard side hydrofoil 61 is rotated clockwise from the midplane of the keel and the cambered surface of the port side hydrofoil 62 is rotated counter-clockwise from the midplane of the keel.

and since, by design: $F_{LD} = F_{LH}$ $$\Delta LDF61/62 = F_{LH}[\cos(\phi-\beta) - \cos(\phi+\beta)] \qquad \text{Eq. 3D-2}$$

For convenience in analysis, the quantity $[\cos(\phi-\beta) - \cos(\phi++\beta)]$ can be defined as the "Counter Leeward-drift factor" (CDf) and is further described below.

Figure 13:
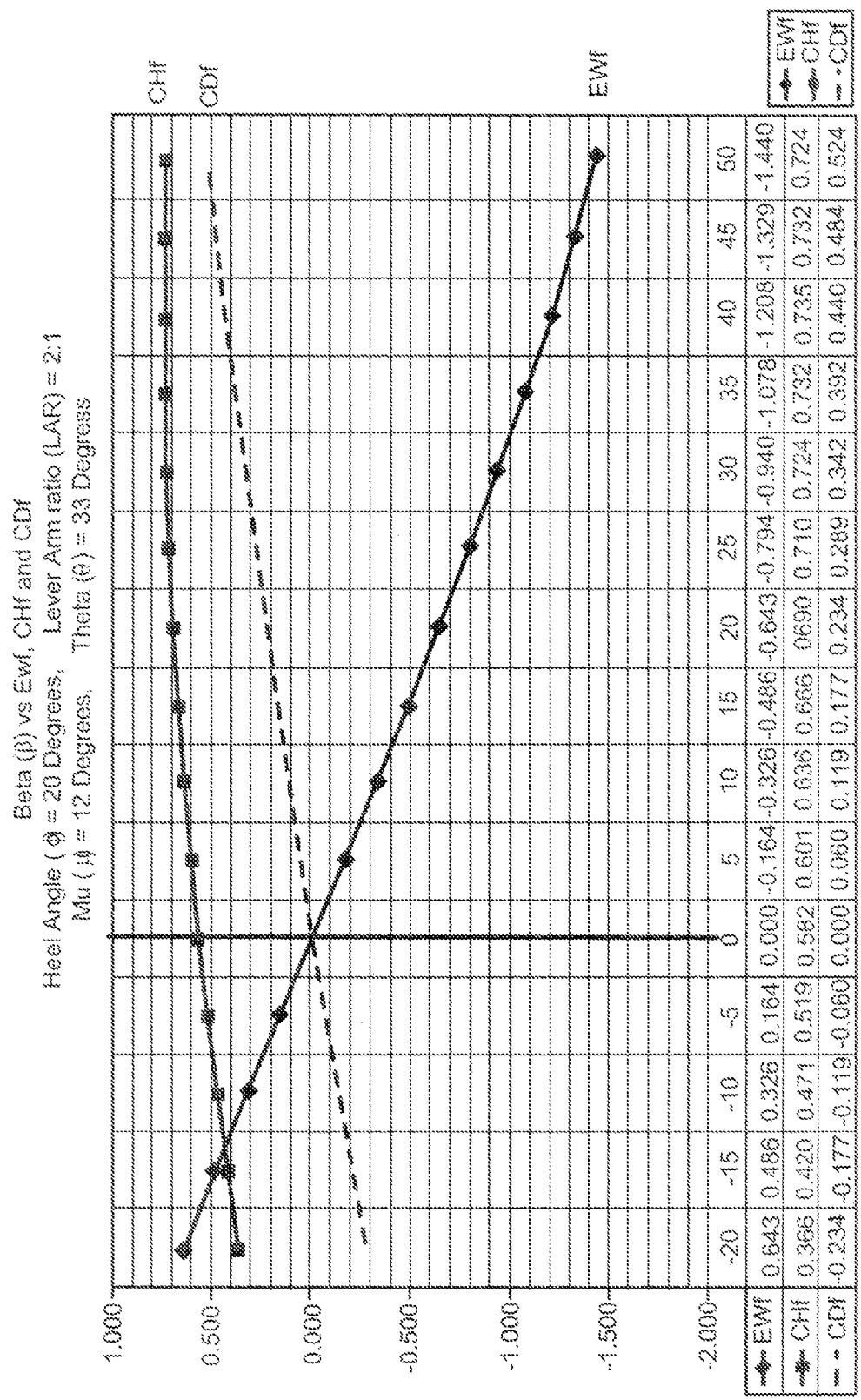

Thus, the net drift or counter-drift forces contributed by the two hydrofoils, 61 or 62, is a product of that component of the force of one hydrofoil, resolved into the plane perpendicular to the course sailed, times the Counter Leeward-drift factor, CDf. FIG. 13 shows how CDf varies relative to a change in β.

A summation of the heeling moments contributed by hydrofoils 61 and 62 shown in FIG. 12a can be calculated as follows:

The heeling moment generated by hydrofoil 61 is:

Heeling Moment of Hydrofoil 61 (HM 61):

$$HM61 = F_H \times RA = F_{LD}\cos(\theta+\beta) \times RA$$

Where:

R is the location of the instant longitudinal axis of rotation of the vessel.
A is the center of effort of the upper hydrofoil 61.
RA is the distance between points R and A.
Theta ($\theta$) is the angle between RA and the midplane of the keel 67.
Beta ($\beta$) is the angle that the cambered surface of hydrofoil 61 is rotated clockwise away from the midplane of the keel.
$F_{LD}$ is the lift component of the force of the windward hydrofoil 61 resolved into a plane that is perpendicular to the course sailed (PPCS).
$F_H$ is that component of lift force $F_{LD}$ that acts at right angles to lever arm RA also acting in the plane perpendicular to the course sailed (PPCS).
$F_{LD}=F_{LH}$
The counter-heeling moment generated by hydrofoil 62 is:
Counter-heeling Moment of Hydrofoil 62 (CHM 62):

$$CHM\ 62 = F_{CH} \times RC = F_{LH} \cosine(\mu-\beta) \times RC$$

Where:
R is the location of the instant longitudinal axis of rotation of the vessel.
C is the center of effort of the lower hydrofoil 62.
RC is the distance between points R and C.
Beta ($\beta$) is the angle that the cambered surface of hydrofoil 62 is rotated counter-clockwise away from the midplane of the keel 67.
Mu ($\mu$) is the angle between RC and the midplane of the keel 57. $F_{LH}$ is the lift component of the force of the leeward hydrofoil 62 resolved into a plane that is perpendicular to the course sailed (PPCS).
$F_{CH}$ is that component of lift force $F_{LH}$ that acts at right angles to lever arm RC also acting in the plane perpendicular to the course sailed (PPCS).
$F_{LD}=F_{LH}$
The change in Counter-Heeling Moment provided by hydrofoils 61 and 62 ($\Delta$CHM 61/62) is:

$$\Delta CHM\ 61/62 = CHM\ 62 - HM\ 61 \qquad \text{Eq. 3H-1}$$
$$= F_{CH} \times RC - F_H \times RA$$

$$\Delta CHM\ 61/62 = [$$
$$F_{LH}\cosine(\mu - \beta) \times RC] - [F_{LD}\cosine\ (\theta + \beta) \times RA]$$

Where a positive value of $\Delta$CHM 61/62 indicates a net increase in counter-heeling forces.

Given that the two hydrofoils, 61 and 62, are designed to generate essentially equal forces, making $F_{LH}=F_{LD}$, then:

$$\Delta CHM\ 61/62 = [F_{LH}\cosine(\mu-\beta) \times RC] - [F_{LH}\cosine(\theta+\beta) \times RA]$$

The following example shows how this relationship can be reduced further:

Given the sailing vessel of FIG. 12a which is shown heeling at an angle of 20 degrees and has the two hydrofoils positioned at design locations such that lever arm RC is two times as long as lever arm RA. That is, for this example, RA=RC/2.
Then $$\Delta CHM\ 61/62 = [F_{LH}\ \cosine\ (\mu - \beta) \times RC] - [F_{LH}\ \cosine\ (\theta + \beta) \times RC/2]$$

-continued
$$= F_{LH} \times RC \times [\cos(\mu - \beta) - 1/2\ \cosine\ (\theta + \beta)]$$

For purposes of this example, wherein RC=2 RA, the quantity [cosine($\mu-\beta$)–½ cosine($\phi+\beta$)] can be defined as the "Counter Heeling factor 2/1", (CHf 2:1). This will hold for any design of this embodiment of the present invention where RC=2 RA.

Thus, when RC=2 RA, the net heeling moment contributed by the two hydrofoils, 61 and 62, is a product of the component of the force of one hydrofoil resolved into the plane perpendicular to the course sailed, $F_{LH}$, times the lever arm RC of the lower hydrofoil times the Counter Heeling factor, CHf 2:1. FIG. 13 shows how CHf 2:1 of the vessel described in FIG. 12a varies relative to an angular change $\beta$ in the orientation of the surfaces of the hydrofoils. Also, to simplify the analysis for the purposes herein, an estimation of the approximate values of $\mu$ and $\theta$ for the vessel shown in FIG. 12a can be made at $\mu$ equals 12 degrees and $\theta$ equals 33 degrees.

Figure 12B:
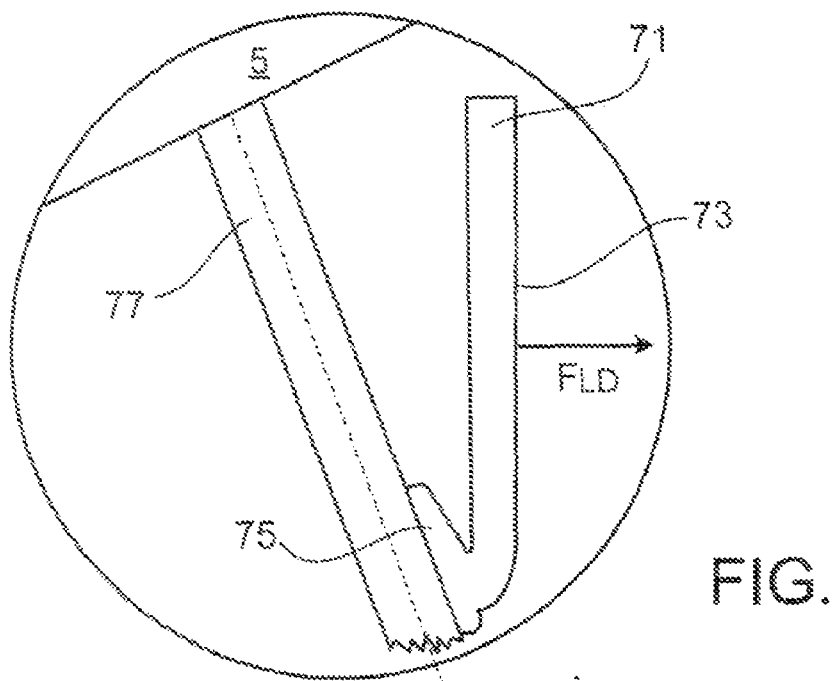
FIG. 12b is a cross-sectional stern view of an angled, open cross-section, sliding hydrofoil 71 embodiment, showing the detail near the hull of the sailing vessel.
Figure 12C:
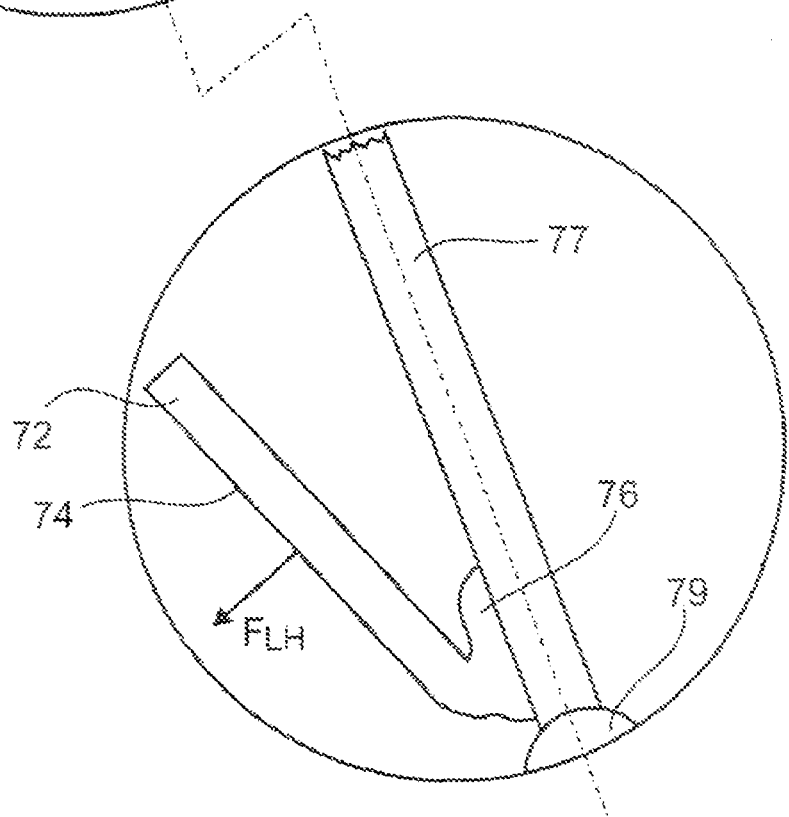
FIG. 12c is a cross-sectional stern view of an angled sliding hydrofoil 72 embodiment, showing the detail near the tip of the keel.

Although many sailing vessel designs would take advantage of the benefits and the simplicity of hydrofoils 61 and 62 with relatively low angles of beta, designs that incorporate larger angles could be made with an open hydrofoil profile by utilizing a configuration similar to that shown in FIGS. 12b and 12c. This would serve to reduce the drag that might be introduced by hydrofoils with a high beta angle and of a closed profile design.

FIG. 12b shows a sliding, open-hydrofoil design. This open-hydrofoil design presents a slimmer profile to the incident fluid flow to reduce drag. The figure shows the upper portion of keel 77 on a starboard tack, the starboard hydrofoil 71 positioned at the upper position on keel 77, the cambered surface 73 of starboard hydrofoil 71, the keyed, slidable foot 75 of starboard hydrofoil 71 and the lift force $F_{LD}$ of starboard foil 71.

FIG. 12c shows the lower portion of keel 77 on a starboard tack, the port side hydrofoil 72 positioned at the lower position on keel 77, the cambered surface 74 of port side hydrofoil 72, the keyed, slidable foot 76 of port side hydrofoil 72 and the lift force $F_{LH}$ of port side foil 72.

Referring now to FIG. 13, the effect of redirecting the hydrodynamic forces generated by hydrofoils 61 and 62 or 71 and 72 of FIGS. 12a to 12c is shown. The graph shows EWf, CDf and CHf plotted against values of the angle beta, $\beta$. A wide range of values is offered to allow designers to make comparisons and weigh alternatives. Ultimately, specific values of beta ($\beta$) will be chosen to obtain performance characteristics in tune with design objectives.

FIG. 13 shows the relationship between the Effective Weight factor, EWf, the Counter Drift factor, CDf and the Counter Heeling factor, CHf and how they vary with a change in the angle beta ($\beta$). By definition, when $\beta=0$, the surfaces of the hydrofoils are parallel to the midplane of the keel and then the values of EWf, CDf and CHf and are the same as the values for FIG. 11a. The addition of the angle $\beta$ provides designers with the ability to vary the interrelationships of effective weight, counter-drift and counter-heeling characteristics to optimize performance of sailing vessels according to their design objectives. As shown, values of $\beta$ above 0 degrees will add effective weight and increase both counter-leeward drift forces and counter-heeling moments. A reduction in the effective weight could also be achieved by the selection of an angle $\beta$ less than 0 degrees but this will reduce the counter-leeward drift forces and counter-heeling moments.

It is important to note that underlying the benefits portrayed in the curves as shown, is the fact that an improvement in one of these characteristics generally benefits one or more of the other characteristics. For example, a reduction in the heeling angle will accordingly reduce the downward force component of the sails, yielding a significant reduction in the effective weight of the sailing vessel. Accompanying this, the reduction in the downward force component translates into an increase in the forward driving force component on the vessel.

It becomes apparent that embodiments of the present invention can be applied to various appendages that extend from a sailing vessel hull, including fixed appendages such as conventional keels and winged keels and appendages affixed movably such as canting keels and rudders and the like. Also, specifically included are removable appendages such as centerboards and daggerboards Such an application is shown in the schematic diagram FIG. 14a, which is a stern view of a sailing vessel on a starboard tack. This figure depicts two centerboards 87 and 97 mounted side-by-side, within a trunk 83, on an axel 84 such that each centerboard can be pivoted downward into the active position when desired. Centerboard 97 is shown in the active position for a starboard tack. As configured, it has a CLD hydrofoil 91 mounted on its uppermost portion which will generate a force generally in the windward direction of the vessel. It also has a CH hydrofoil 92 mounted on its lowermost portion which will generate a force generally in the leeward direction of the vessel. In this starboard tack mode, centerboard 87, with CLD hydrofoil 81 and CH hydrofoil 82 attached, is shown retracted to the inactive position. Although centerboard 87 is shown mounted on the port side of the vessel and centerboard 97 on the starboard side, these positions could be reversed depending upon the objectives of the designer.

FIG. 15a, which is a schematic diagram of a stern view of a sailing vessel on a starboard tack, depicts two daggerboards 107 and 117 mounted side-by-side, within a trunk 113, having two slide slots 106, such that each daggerboard can be inserted and slid downward into the active position when desired. Daggerboard 117 is shown in the active position for a starboard tack. As configured, it has a CLD hydrofoil 111 mounted on its uppermost portion which will generate a force generally in the windward direction of the vessel. It also has a CH hydrofoil 112 mounted on its lowermost portion which will generate a force generally in the leeward direction of the vessel. In this starboard tack mode, daggerboard 107, with CLD hydrofoil 109 and CH hydrofoil 110 attached, is shown retracted to the inactive position. Although daggerboard 107 is shown mounted on the port side of the vessel and daggerboard 117 on the starboard side, these positions could be reversed depending upon the objectives of the designer.

Figure 14B:
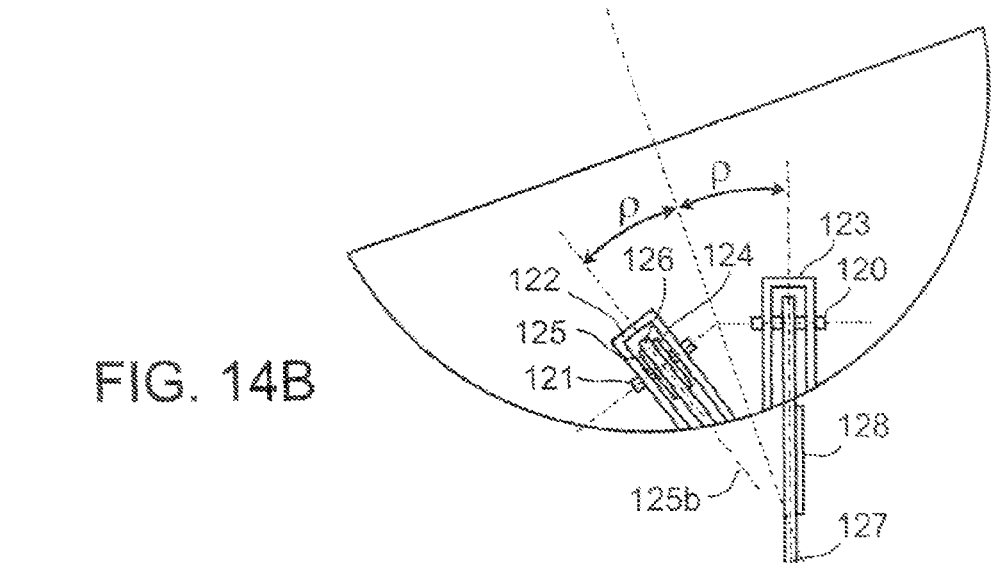
FIG. 14b is a cross-sectional stern view of still another embodiment of the present invention, depicting a sailing vessel on a starboard tack having a retracted port tack centerboard 126, angled counter-clockwise by an amount ρ from the midplane 125c of the hull, and a complimentary starboard tack centerboard 127, angled clockwise by an amount ρ from the midplane 125c of the hull and shown rotated down into active position with an upper CLD hydrofoil 128 on the windward side and a lower CH hydrofoil 129 on the leeward side.

Embodiments are also envisaged as shown in FIG. 14b, which is a stern view of a sailing vessel on a starboard tack, wherein the single axel 84 of FIG. 14a described above is replaced by two axels, a starboard axel 120 and a port axel 121. In this embodiment each axel would be disposed at an angle rho ($\rho$) from the horizontal or design waterline plane of the hull, such that, when the appropriate centerboard is rotated down to its active position when the vessel is heeling during a tack, it would be directed in a more vertical direction and penetrate more deeply into the water. For example, during a starboard tack of a vessel, as shown in FIG. 14b, the starboard centerboard 127 would be rotated on its axel 120 downwardly into the active position and, as shown, would be positioned in a more vertical attitude by an amount equal to the angle $\rho$. On a port tack, the port centerboard 126, mounted on its port axel 121, which is rotated by an amount $\rho$ in the opposite direction from the horizontal or design waterline plane of the hull, would also be positioned in a more vertical attitude by an amount equal to the angle $\rho$. This would direct the forces generated by the hydrofoils in a more horizontal direction and sink the centerboards deeper into the water. Also envisaged are such axels with axes that are adjustable, permitting an increase or decrease in the value of angle $\rho$.

Figure 15B:
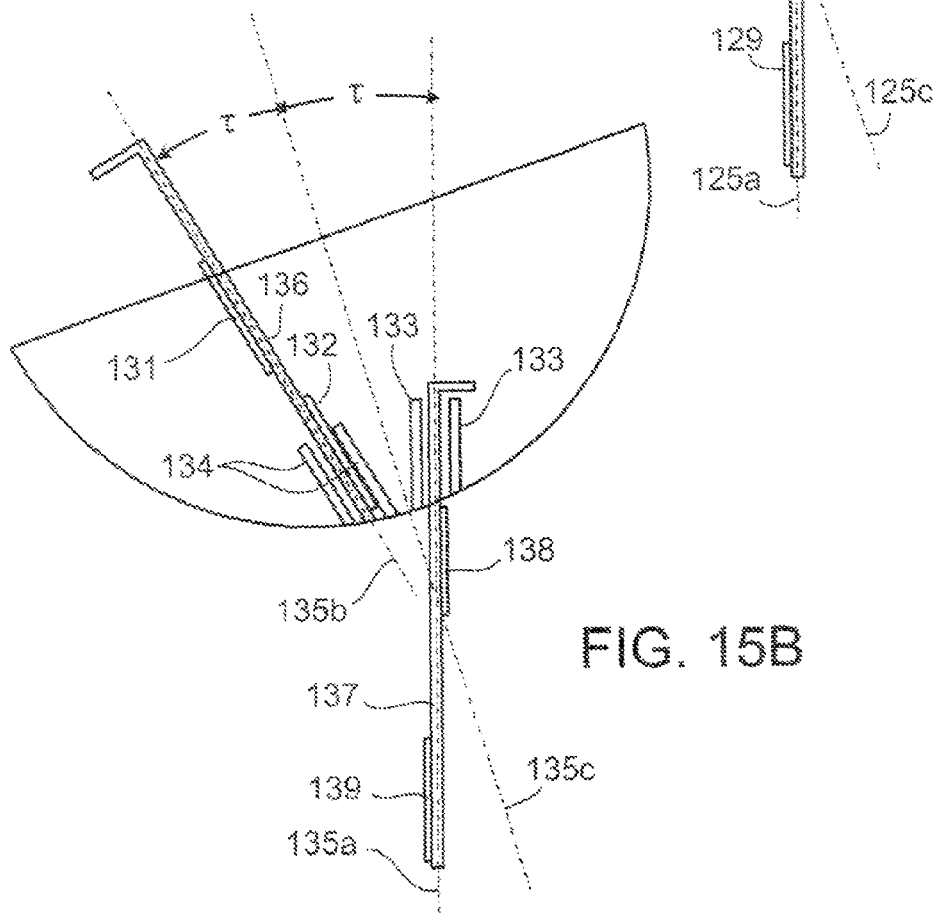
FIG. 15b is a cross-sectional stern view of still another embodiment of the present invention, depicting a sailing vessel on a starboard tack having a retracted port tack daggerboard 136, with the slot of its trunk 134 angled counter-clockwise by an amount tau τ from the midplane 135c of the vessel, and a complimentary starboard tack daggerboard 137, with the slot of its trunk 133 angled clockwise by an amount tau τ from the midplane 135c of the vessel, said starboard daggerboard shown inserted into active position with an upper CLD hydrofoil 138 on the windward side and a lower CH hydrofoil 139 on the leeward side.

Embodiments are also envisaged as shown in FIG. 15b, which is a stern view of a sailing vessel on a starboard tack, wherein the parallel slots 106 of FIG. 15a described above are replaced by two slots, a starboard slot within trunk 133 and a port slot within trunk 134.

In this embodiment each slot would be disposed at an angle tau ($\tau$) from the vertical axis of the vessel, such that, when the appropriate daggerboard is inserted downwardly into its active position when the vessel is heeling during a tack, it would be directed at a more vertical angle and would penetrate more deeply into the water. For example, during a starboard tack of a vessel, as shown in FIG. 15b, the starboard daggerboard 137 would be inserted downwardly into the slot of trunk 133, which is angled clockwise from the vertical midplane of the vessel. It would then reside in its active station and, as shown, would be positioned in a more vertical attitude by an amount equal to the angle $\tau$. On a port tack, the port daggerboard 136, would be inserted downwardly into the slot of trunk 134, which is angled counter-clockwise from the vertical midplane of the vessel. It would then reside in its active station and be positioned in a more vertical attitude by an amount equal to the angle $\tau$. This would direct the forces generated by the hydrofoils in a more horizontal direction and sink the daggerboards deeper into the water. Also envisaged are such trunks with slots that are adjustable, permitting an increase or decrease in the value of angle $\tau$ at the discretion of the helm.

Figures 14C, 15C:
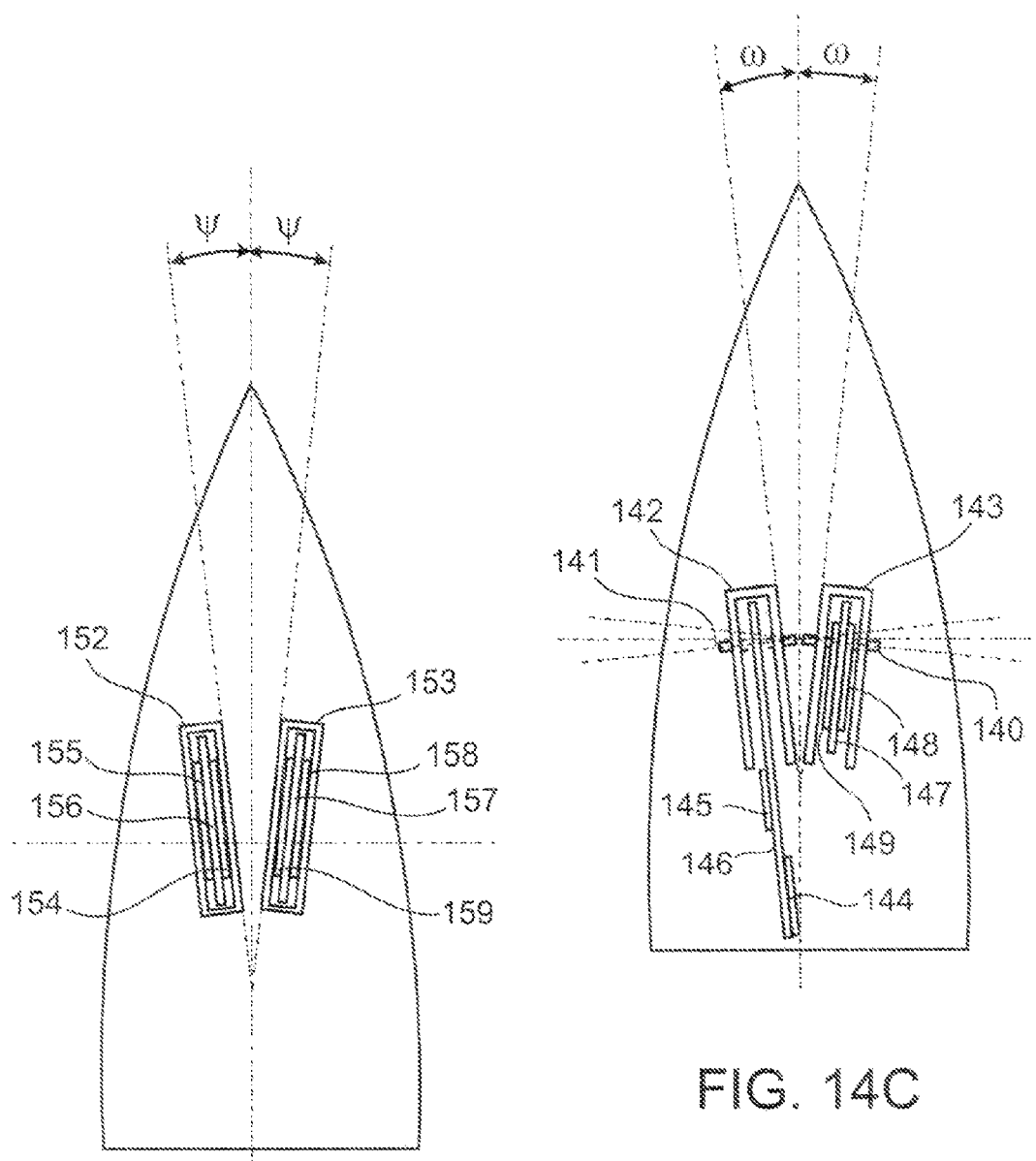
FIG. 14c is a plan view of still another embodiment of the present invention, depicting a sailing vessel on starboard tack, having a retracted port tack centerboard 146, with the slot of its trunk 142 rotated counter-clockwise to an angle ω from the design longitudinal axis of the hull of the vessel and a complimentary starboard tack centerboard 147 with the slot of its trunk 143 rotated clockwise to an angle ω from the design longitudinal axis of the hull of the vessel, said centerboard 147 shown rotated down into active position with an upper CLD hydrofoil 148 on the windward side and a lower CH hydrofoil 149 on the leeward side.
FIG. 15c is a plan view of still another embodiment of the present invention, depicting a sailing vessel on starboard tack, having a retracted port tack daggerboard 156, with the slot of its trunk 152 disposed at an angle psi ψ counter-clockwise from the design longitudinal axis of the hull of the vessel and a complimentary starboard tack daggerboard 157, with the slot of its trunk 153 disposed at an angle psi ψ clockwise from the design longitudinal axis of the hull of the vessel; said starboard daggerboard 157 inserted down into the active position with an upper CLD hydrofoil 158 on the windward side and a lower CH hydrofoil 159 on the leeward side

Referring now to FIG. 14c which is a plan view showing a sailing vessel with starboard centerboard 147 rotated down to the active position for a starboard tack and port centerboard 146 shown retracted to the inactive position. Centerboards 147 and 146 are mounted on axels 140 and 141 respectively that are affixed perpendicular to the sides of trunks 143 and 142, each side of which is configured, as shown, at an angle omega ($\omega$) from the design longitudinal axis of the vessel. On each tack of the vessel, the orientation of the centerboard at an angle $\omega$ to the design longitudinal axis of the vessel will increase the angle of attack relative to the incident fluid flow of the appropriate centerboard, enabling it to generate additional counter-leeward drift forces while permitting the hull of the vessel to point more directly toward the incident fluid flow or course sailed. Also envisaged are such axels with axes that are adjustable, permitting the value of angle $\omega$ to be increased or decreased at the discretion of the helm.

FIG. 15c is a plan view of a sailing vessel having two slots, each of which provide for a daggerboard to be inserted and slid downward into its active position on the appropriate tack. On a starboard tack, a starboard daggerboard 157, with CLD hydrofoil 158 and CH hydrofoil 159, is inserted down to the active position and port daggerboard 156, with CLD hydrofoil 155 and CH hydrofoil 154, is retracted to the inactive position. This is reversed for a port tack. Daggerboards 157 and 156 are configured to slide within slots that are defined by parallel inner surfaces of the trunks 153 and 152 respectively, said surfaces being directed, as shown, at an angle psi ($\psi$) to the longitudinal axis of the vessel. On each tack of the vessel, the orientation of the centerboard at the angle $\psi$ to the longitudinal axis of the vessel will increase the angle of attack of the appropriate centerboard enabling it to generate additional counter-leeward drift forces while permitting the hull of the vessel to point more directly toward the incident fluid flow or course sailed. Also envisaged are such trunks or slots that are adjustable, permitting the value of angle ψ to be increased or decreased at the discretion of the helm.

In yet other single daggerboard or single centerboard embodiments, the hydrofoils could be fixed and symmetrical front to back when viewed from the top and the daggerboard or centerboard and its holding mechanism designed such that, when the tack of the vessel is reversed, the daggerboard or centerboard can be easily be withdrawn from its active position, reversed and reinserted for the new tack. Combinations of these fixed and adjustable hydrofoil embodiments are also envisaged.

In embodiments having adjustable hydrofoils or flaps, the skilled artisan could readily incorporate known control mechanisms for the daggerboard or centerboard. Further, known interface mechanisms could be placed in an accessible location on a portion of the daggerboard or centerboard exposed to the helmsman, or at some other location inside the vessel and connected to the daggerboard or centerboard by known linkages control systems or circuits As will be appreciated by the skilled artisan, other embodiments of the sliding hydrofoil design described above could be made wherein the hydrofoils have any other fixed hydrodynamic shape. The present invention envisages embodiments where both hydrofoils are easily removable and replaceable, to account for breakage or in order to quickly adapt performance to different sailing conditions.

Further, the shape of hydrofoils utilized in the present invention could be adjustable or modifiable in any manner such as through inflation or deformation of entire surfaces or portions of each hydrofoil, through the use of materials capable of being deformed by air or hydraulic pressure, levers, cams, servomotors, or the like or by adjustable, interconnected rigid sections capable of changing the surface of the hydrofoil.

Such an embodiment is depicted in schematic diagram FIG. 16a showing a sailing vessel on a starboard tack. FIG. 16b shows a top view, taken as section B-B designated in FIG. 16a. FIG. 16c shows a side view, taken as section C-C designated in FIG. 16b. The figures show a keel assembly comprising a frame 164 affixed to hull 5, bearings 165 and 166 affixed to the hull 5 and the tip end of frame 164 respectively, a rotatable shaft 163 mounted in said bearings 165 and 166, a deformable first surface 167 affixed to frame 164 on the starboard side of the keel assembly, a deformable second surface 168 affixed to frame 164 on the port side of the keel assembly, an upper CLD cam 161 locked to shaft 163 and a lower CH cam 162 locked to shaft 163. As shown, the shaft has been rotated to activate the keel assembly for a starboard tack. In this mode, the upper CLD cam pushes against the upper portion of first surface 167 giving the upper section of surface 167 a camber. At the same time, the lower CH cam pushes against the lower portion of second surface 168 giving the lower section of second surface 168 a camber. Thus, the upper portion of surface 167, acting as a CLD hydrofoil generates a force generally in the windward direction of the vessel while the lower section of surface 168 acts as CH hydrofoil generating a force generally in the leeward direction of the vessel. When the tack is reversed to a port tack, the shaft will be rotated 180 degrees to generally reverse the CLD and CH forces. The shapes of the cams could be such and the degree of rotation controllable to permit adjustable shaping of the deformable surfaces in order to vary their lift characteristics as desired.

Other adjustable hydrofoil embodiments would be particularly useful in applications where hydrofoils are disposed on opposite sides of the keel, but are not slidable. In such embodiments, two or more adjustable hydrofoils would be attached to each side of the keel. By way of the mechanisms described above, these hydrofoils could lay flat against the keel until operated. When operated, the appropriate hydrofoils would expand or deform to create the counter heeling or counter-leeward drift forces as needed.

Figure 17:
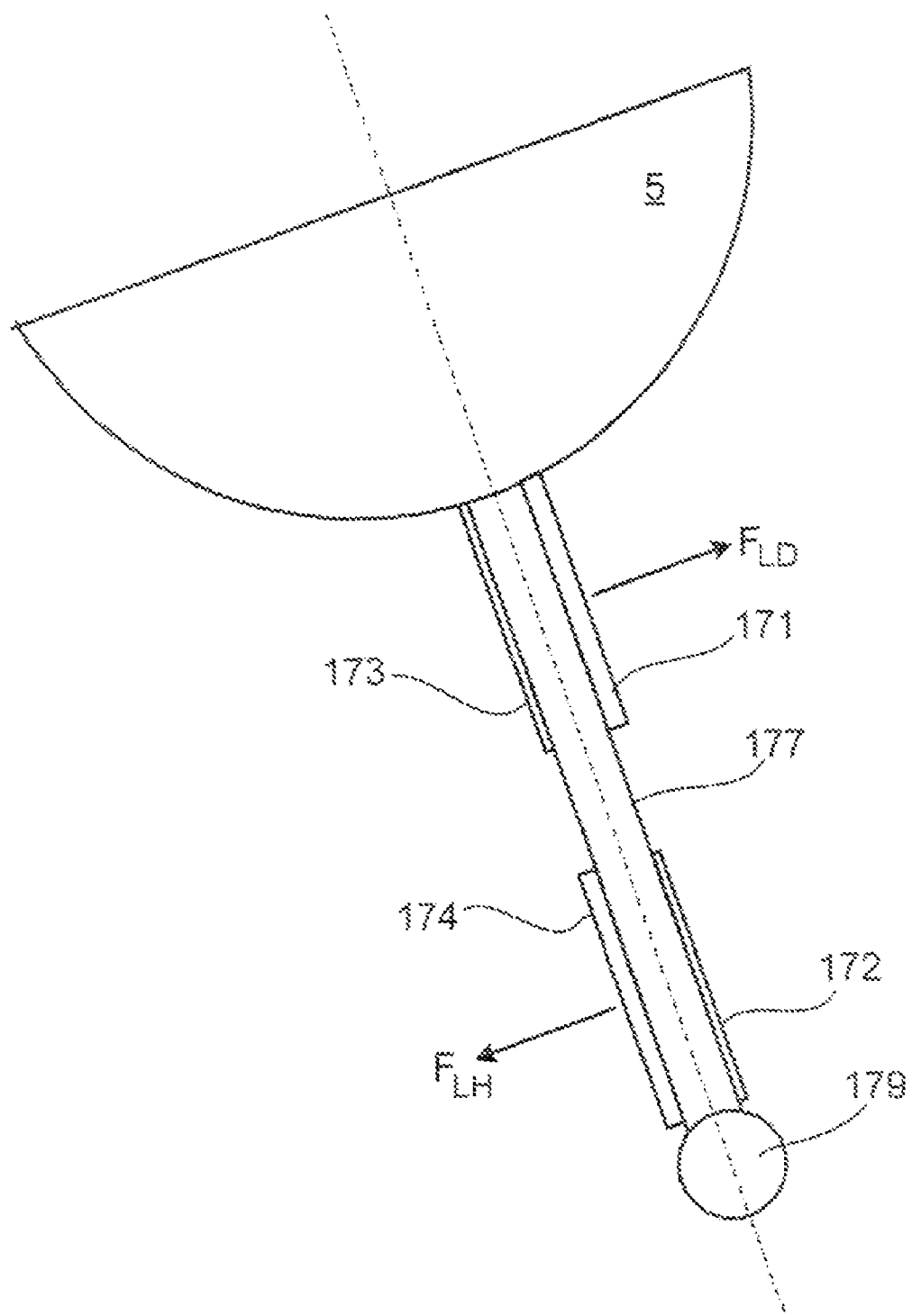
FIG. 17 depicts a sailing vessel on a starboard tack having two CLD hydrofoils, active hydrofoil 171 and inactive hydrofoil 173, disposed at the root end of keel 177 and two CH hydrofoils, active hydrofoil 174 and inactive hydrofoil 172, disposed at the tip end of keel 177.

Such an application is shown in the schematic diagram FIG. 17 which is a stern view, in a plane perpendicular to the course sailed, of a sailing vessel on a starboard tack. This figure depicts a keel 177 attached to the hull 5 of the vessel at its root end and having a ballast bulb 179 attached to its tip end. Also attached proximate to the root end of keel 177 are two inflatable CLD hydrofoils. Since the vessel is shown on a starboard tack, the starboard side CLD hydrofoil 171 is shown inflated to generate a hydrodynamic force $F_{LD}$ generally in the windward direction and the port side CLD hydrofoil 173 is shown deflated, as shown. On a port tack, starboard side CLD hydrofoil 171 would be deflated and port side CLD hydrofoil 173 would be inflated to generate a hydrodynamic force generally toward the new windward direction. Proximate to the tip end of keel 177 are two inflatable CH hydrofoils. When the vessel is on a starboard tack as shown, the port side CH hydrofoil 174 would be inflated to generate a hydrodynamic force $F_{LH}$ generally in the leeward direction and the starboard side CH hydrofoil 172 would be deflated, as shown. On a port tack, the port side CH hydrofoil 174 would be deflated and the starboard side CH hydrofoil 172 would be inflated to generate a hydrodynamic force generally toward the new leeward direction. Thus on either tack, counter-leeward drift (CLD) forces and counter-heeling (CH) forces would be generated simultaneously.

Figure 18:
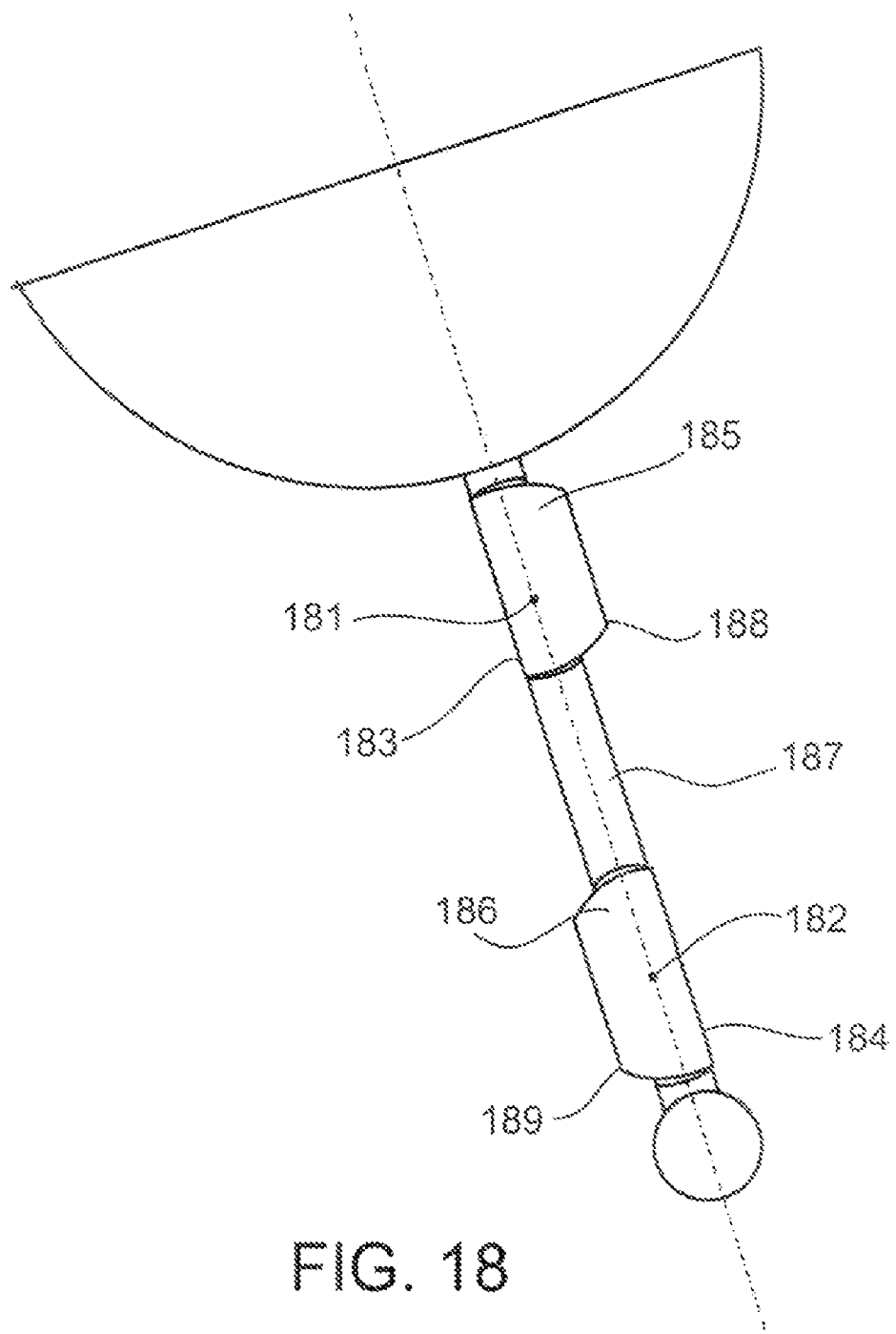
FIG. 18 is a stern view of a sailing vessel on a starboard tack showing two rotatable hydrofoil members 185 and 186 mounted on axes one above the other in parallel disposition to each other and to the longitudinal axis of the vessel. The upper member is shown with a cambered surface directed toward windward and the lower member is shown with a cambered surface directed toward leeward.

Another embodiment of the present invention is shown in FIG. 18 wherein two rotatable hydrofoils 185 and 186 are mounted on an appendage, such as a keel 187 of a sailing vessel, one above the other on axes 181 and 182, each parallel to the chord of the appendage and each having cambered surfaces 188 and 189, respectively, on one side and lesser cambered surfaces 183 and 184, respectively, on the opposite side. When tacking, the upper member, disposed toward the root of the appendage and acting as a CLD hydrofoil 185, would be rotated such that its more cambered surface 188 would be facing toward the windward side of the vessel to generate a hydrodynamic force toward windward, while the lower member, disposed toward the tip end of the appendage and acting as a CH hydrofoil 186, would be rotated such that its more cambered surface 189 would be facing toward leeward to generate a hydrodynamic force toward leeward. The amount of inflation of these hydrofoils could be adjustable to allow control of their individual hydrodynamic shapes.

For sailing vessels generally, the most preferred embodiment is that shown in FIGS. 5-7f and described above.

For sailing vessels following the design strictures of the America's Cup the most preferred embodiment is that shown in FIGS. 9a-9d and described above. Such an embodiment, incorporated on a sailing vessel also having a rudder or other single rotatable appendage would qualify for The America's Cup Class Rule, Version 5.0, dated 15 Dec., 2003, Section D, Rules 17.10 and 17.10 (a).

Finally, as the skilled artisan will readily appreciate, although the embodiments disclosed herein describe the present invention, many other improvements will also occur and should be understood to be within the spirit and scope of this invention, which is only to be limited by the following claims:

What is claimed is:

1. A sailing vessel comprising:
   a hull;
   an appendage extending from said hull and having a leading edge, a trailing edge, two surfaces, and a midplane;
   a first hydrofoil member; and
   a second hydrofoil member;
   a single, rigid, rotatable member having an axis disposed substantially parallel to said midplane;
   wherein said first hydrofoil member and said second hydrofoil member are incorporated in, and integral with, said single, rigid, rotatable member.

2. The sailing vessel of claim 1,
   wherein said first hydrofoil member is disposed proximate to the root end of said appendage and extends from said rotatable member substantially toward said leading edge of said appendage; and
   wherein said second hydrofoil member is disposed at the tip end of said appendage and extends from said rotatable member substantially toward the trailing edge of said appendage.

3. The sailing vessel of claim 1,
   wherein said first hydrofoil member is disposed proximate to the root end of said appendage and extends from said rotatable member substantially toward said trailing edge of said appendage; and
   wherein said second hydrofoil member is disposed at the tip end of said appendage and extends from said rotatable member substantially toward the leading edge of said appendage.

4. The sailing vessel of claim 1,
   wherein said first hydrofoil member and said second hydrofoil member are configured to move toward opposite surfaces of the appendage when said rotatable member is rotated.

5. A sailing vessel comprising:
   a hull;
   an appendage extending from said hull and having a leading edge, a trailing edge, two surfaces, and a midplane;
   a first hydrofoil, with at least one cambered side, slidably attached to said appendage; and
   a second hydrofoil, with at least one cambered side, slidably attached to said appendage.

6. The sailing vessel of claim 5, wherein the cambered surface of at least one of said first hydrofoil and said second hydrofoil is disposed at an angle to said midplane of said appendage.

7. The sailing vessel of claim 5, wherein said first hydrofoil or said second hydrofoil slide in a track that is substantially parallel to said leading edge or said trailing edge of said appendage.

8. The sailing vessel of claims 5, wherein said surfaces flare outward from the midplane of the appendage proximate to the root end of said appendage such that each hydrofoil may be parked on the flared section when moved to root end of said appendage.

9. A sailing vessel comprising:
   a hull;
   an appendage extending from said hull and having a leading edge, a trailing edge, two sides, and a midplane; and
   a first deformable member, disposed on a first side of said appendage and comprising a flexible surface;
   a second deformable member, disposed on a second side of said appendage and comprising a flexible surface;
   an upper cam configured to
      deform a portion of said first deformable member at a first rotational position and
      deform a portion of said second deformable member at a second rotational position; and
   a lower cam configured to
      deform a portion of said first deformable member at a first rotatianal position and deform a portion of a said second deformable member at a second rotational position.

10. A sailing vessel comprising:
    a hull having a midplane and a design longitudinal axis;
    an appendage having a root end and a tip end;
    a first reversible member (1) having a cambered side and a substantially flat side, (2) mounted on said appendage, and (3) having an axis substantially parallel to said design longitudinal axis; and
    a second reversible member (1) having a cambered side and a substantially flat side, (2) mounted on said appendage, and (3) having an axis substantially parallel to said design longitudinal axis;
    wherein said first reversible member is disposed proximate to said root end of said appendage and said second reversible member is disposed proximate to said tip end of said appendage.

* * * * *